US006968364B1

(12) United States Patent
Wong et al.

(10) Patent No.: US 6,968,364 B1
(45) Date of Patent: Nov. 22, 2005

(54) SYSTEM AND METHOD TO FACILITATE SELECTION AND PROGRAMMING OF AN ASSOCIATED AUDIO/VISUAL SYSTEM

(75) Inventors: Curtis Wong, Bellevue, WA (US); Steven Drucker, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 801 days.

(21) Appl. No.: 09/650,167

(22) Filed: Aug. 29, 2000

Related U.S. Application Data

(60) Provisional application No. 60/193,124, filed on Mar. 30, 2000, provisional application No. 60/224,384, filed on Aug. 9, 2000.

(51) Int. Cl.[7] .......................... G06F 15/16; G06F 7/00; G06F 13/00; H04N 7/16
(52) U.S. Cl. .......................... 709/217; 709/231; 707/3; 725/61; 725/135
(58) Field of Search .................. 707/3, 104.1; 709/217, 208, 231; 348/460; 725/39, 92, 725/46, 61, 43, 135

(56) References Cited

U.S. PATENT DOCUMENTS

| 5,226,079 | A | * | 7/1993 | Holloway ................. 713/177 |
| 5,528,759 | A | * | 6/1996 | Moore ..................... 709/224 |
| 5,873,076 | A | * | 2/1999 | Barr et al. ................. 707/3 |
| 5,963,264 | A | * | 10/1999 | Jackson .................. 348/460 |
| 5,990,883 | A | | 11/1999 | Byrne et al. |
| 6,016,497 | A | | 1/2000 | Suver |
| 6,023,585 | A | | 2/2000 | Perlman et al. |
| 6,034,689 | A | | 3/2000 | White et al. |
| 6,243,713 | B1 | * | 6/2001 | Nelson et al. ........... 707/104.1 |
| 6,252,629 | B1 | * | 6/2001 | Takatori .................. 348/460 |
| 6,252,630 | B1 | * | 6/2001 | Kusumi et al. ........... 348/460 |
| 6,317,779 | B1 | * | 11/2001 | Gile et al. ............... 709/217 |
| 6,366,907 | B1 | * | 4/2002 | Fanning et al. ............. 707/3 |
| 6,393,430 | B1 | * | 5/2002 | Van Ryzin ............. 707/104.1 |
| 6,397,261 | B1 | * | 5/2002 | Eldridge et al. .......... 713/171 |
| 6,473,751 | B1 | * | 10/2002 | Nikolovska et al. .......... 707/3 |
| 6,721,954 | B1 | * | 4/2004 | Nickum ................... 725/46 |
| 6,732,158 | B1 | * | 5/2004 | Hesselink et al. ......... 709/208 |
| 2002/0042923 | A1 | * | 4/2002 | Asmussen et al. ......... 725/92 |
| 2002/0100044 | A1 | * | 7/2002 | Daniels ................... 725/39 |
| 2002/0138840 | A1 | * | 9/2002 | Schein et al. .............. 725/61 |
| 2004/0210932 | A1 | * | 10/2004 | Mori et al. ............... 725/39 |

OTHER PUBLICATIONS

"Press Release." ReplayTV, Inc. http://www.replaytv.com/news/pressrelease18htm (Aug. 10, 2000).
Hause, Kevin. "Digital Video Recorders: The Next Big Thing?" *Abstract, International Data Corporation.* Report No. 19588. Jul. 1999.
"Press Release." *TiVo Inc.* http://www.tivo.com/about/061400.html (Jul. 20, 2000).

(Continued)

*Primary Examiner*—Nabil El-Hady
*Assistant Examiner*—Kenny Lin
(74) *Attorney, Agent, or Firm*—Amin & Turocy, LLP

(57) ABSTRACT

A system and method to facilitate selection and programming of at least one of audio and visual program are disclosed. A first computer is operative to connect to a second computer for filtering through a plurality of audio and/or visual programs based on selection criteria to provide a filtered representation of programs. A program from the filtered representation of programs may be selected at the first computer so as to cause a token indicative of the selected program to be assigned to a recipient operative to receive the token. The recipient may be a user at the first computer, a third computer, or an entertainment appliance. The token represents the selected program with sufficient particularity to program an entertainment system based on the token to record the program represented by the token.

34 Claims, 27 Drawing Sheets

OTHER PUBLICATIONS

"Press Room." *Replay TV.* http://www.replaytv.com/news/pressroom.htm (Jul. 20, 2000).

"MbTV Your Thumbprint on TV." *MetaByte TV.* http://www.mbtv.com/index.htm (Jul. 20, 2000).

"NDS The Company." *Website Home Page.* http://www.nds.com/thecompany/ndsthecompany.htm (Jul. 20, 2000).

Lewis, Michael. "Boom Box." http://www.nytimes.com/library/magazine/home/20000813mag-boombox.html (Aug. 14, 2000).

Morris, John and Josh Taylor. "ZDNet: Hits & Hype." *ZDNet Reviews.* http://www.zdnet.com/products/stories/reviews/0,4161,2619461,00.html (Oct. 9, 2000).

* cited by examiner

SYSTEM AND METHOD TO FACILITATE SELECTION AND PROGRAMMING OF AN ASSOCIATED AUDIO/VISUAL SYSTEM

REFERENCE TO RELATED APPLICATION

This application claims the benefit of U.S. Provisional Patent Application Ser. No. 60/193,124, which was filed Mar. 30, 2000, entitled SYSTEM AND METHOD TO FACILITATE PROGRAMMING OF AN ASSOCIATED RECORDING SYSTEM and the benefit of U.S. Provisional Patent Application Ser. No. 60/224,384, which was filed Aug. 9, 2000, entitled SYSTEM AND METHOD TO FACILITATE PROGRAMMING OF AN ASSOCIATED RECORDING SYSTEM.

TECHNICAL FIELD

The present invention relates to a system and method to facilitate selection of an audio and/or visual program having a token that may be employed to program operation of an associated audio/visual system.

BACKGROUND OF THE INVENTION

In order to see a list of currently scheduled programs and to select which programs to watch, television viewers may employ printed television guides, such as appear in daily newspapers or weekly magazines. Cable television systems often include a channel with a video broadcast corresponding to the printed program guide. The cable channel displays listings of programs appearing on the different available channels over a fixed number of time slots. The listings are commonly arranged in a grid, in which the various scheduled programs or shows are arranged within rows and columns, indicating the channels and times at which they can be found. The grid is continuously scrolled vertically so that a viewer may scan a continuously refreshing set of programs within the displayed time slots.

Users of conventional television and cable systems often employ video tape recorder ("VTR") systems to implement a non-commercial time-shifting function of desired programs. In this way, an individual is able to record a program that the individual is unable to view as it is being broadcast and watch the recorded program at a more convenient time. The VTR system includes a user interface through which the individual enters programming information defining the time, channel, and duration corresponding to a selected program that is to be recorded.

One type of VTR system employs a feature (known as "VCR Plus") that enables a user to record a pre-selected program by entering a unique program identification number associated with a specific program. The program identification number, which may be found in a printed television listing, corresponds to programming information (e.g., channel, time, duration) that is set by the VTR to record the particular program when it is broadcast.

More recently, satellite, Direct TV, or cable distribution systems are employing interactive electronic program guides ("EPGs") which function somewhat similarly to the broadcast program listing channels described above. Rather than scrolling automatically, however, an EPG allows a viewer to employ a remote control device to scroll, as desired, through an interactive program grid. The EPG is typically implemented in software, which runs on a set-top box connected to a TV and a system input. When scrolling through the EPG, the set-top box inserts the appropriate programming information into each new row or column. The programming information is typically cached at the set-top box, and is updated by the system's headend by employing an appropriate communications path. The updating of program information may be implemented, for example, utilizing two-way communications capabilities of interactive cable or satellite systems or another communications path, such as by employing a modem to communicate over a conventional telecommunications network.

In order to remain competitive in the home entertainment industry, manufacturers and service providers are increasing efforts to develop improved entertainment systems. A rapidly evolving type of entertainment system relates to a personal video recorder ("PVR") system. A PVR system includes a large digital data storage device, such as a hard disk drive, for storing recorded audio and/or video programming in a digital format (without a video tape). The storage device enables a viewer to efficiently implement a time-shifting function so that the view can watch the recorded program at a more convenient time. The PVR system receives broadcast programs from a service provider, such as in the form of cable television, satellite, or another source of programming. The PVR system also may employ a video compression system (e.g., an MPEG-2 format) in combination with an analog-to-digital converter for converting analog broadcast signals into a suitable digital format. Alternatively or additionally, the PVR system may receive broadcast signals in a digital format.

A PVR typically records a program based on program criteria selected from an interactive on-screen listing, such as provided by an associated interactive EPG. An EPG is typically implemented in software, which runs on a set-top box connected to a television and a system input. When scrolling through the EPG, the set-top box inserts the appropriate programming information into each new row or column. The programming information is typically cached at the set-top box, and is periodically updated by the system's headend over an appropriate communications path. The updating of program information may be implemented, for example, utilizing two-way communications capabilities of interactive cable or satellite systems or another communications path, such as by employing a modem to communicate over a conventional telecommunications network. However, the programming only provides programming choices according to the information downloaded to the PVR system.

A PVR system further may provide enhanced recording capabilities and enhanced television functionality. By way of example, a PVR system may include a virtual pausing function, such that a user may pause a live broadcast for a period of time while the PVR continues to record the live broadcast. The user may then continue watching from the point that the pause was initiated while the PVR continues to record the live broadcast. Other available features may include fast-forwarding through recorded programming, rewinding parts of recorded programming, skipping ahead through the recorded programming, as well as other enhanced television functionality.

Another feature of a PVR system relates to intelligent recording of programming. One example of intelligent recording enables a user to program one or more keywords that are searched for on the EPG program listings stored at the PVR. The PVR, in turn, automatically records shows that match the search criteria. Another recording method enables a user to select a particular program to record all future broadcast episodes of that program. Commercially available PVR systems include, for example, TiVo™, ReplayTV™, and WebTV™.

By way of example, a WebTV-based system employs a standard television set as a display device for browsing the World Wide Web (the "Web") and is able to connect to the Internet using a standard telephone, DSL (Digital Subscriber Line), Cable Modem, wireless data communications (e.g., satellite or fixed wireless), or another similar communication path. A user of a WebTV system employs a client system that includes a set-top box having hardware and software for providing a graphical user interface (GUI), such as including an EPG, by which the user can browse the Web, send email, and access other Internet services. The client system utilizes a television set as both a display device and an audio output device. The set-top box is coupled to the television set by a link for communicating audio and/or visual information to the television. The client system also includes a remote control (e.g., an infrared remote control device) that a user employs to control the system to, for example, browse the Web and perform other functions, such as to provide enhanced television or satellite capabilities. A WebTV-based (or other similar) client system may also include a digital recording device to enable a user to record selected programs and provide other enhanced features while viewing a program, such as described above.

As the available bandwidth for broadcast program continues to increase, service providers are continuing to increase the number of programming channels from which to choose. As a result, a conventional EPG running on a PVR system may not provide a completely satisfactory mechanism to sort through and select programs.

SUMMARY OF THE INVENTION

The present invention provides a system and method to facilitate selection and programming operation of an audio/visual system, such as to record a predetermined audio/visual program when it is broadcast. The system includes a local computer (e.g., a PC, a PDA, etc.) that may connect to a server system through a network infrastructure, such as the World Wide Web (the "Web"). The server system, for example, includes a searchable database, which may be accessed as a website, including information about numerous audio and/or visual programs (e.g., sports programs, movies, situation comedies, news shows, educational programs, etc.). The local computer is programmed to connect to the server system for searching and/or filtering through the program information of the database.

A user may employ the local computer to select one or more programs and have a token assigned to one or more recipients (who also may include the user) representing program criteria for each selected program. Each recipient may obtain the assigned token. For example, a recipient may employ the local computer to obtain the token. The token may be provided to the local computer, such as part of an electronic mail ("email") message or it may be downloaded to the local computer from the server. Alternatively or additionally, a token may be received at the local computer from another remote computer by any data communications mechanism. Each token includes program criteria representing a specific audio and/or visual program in a known format that may be employed to program a recording system to record a corresponding broadcast program based on the corresponding token.

Another aspect of the present invention provides a system to facilitate selection of at least one of audio and visual program. The system includes a first computer operative to connect to a second computer for filtering through a plurality audio and/or visual programs based on selection criteria to provide a filtered representation of one or more programs. A program from the filtered representation of programs is selectable at the first computer so as to cause a token indicative of the selected program to be assigned to a recipient. The token represents the selected program with sufficient particularity to program a recording system to record the program represented by the token based on the associated token.

Still another aspect of the present invention provides a system to facilitate selection of at least one of audio and visual program. The system includes a first computer programmed provide a first signal to a second computer for instructing the second computer to sort through information related to a plurality audio and/or visual programs. The first computer receives a second signal from the second computer indicative of a filtered representation of programs, the first computer being operative to provide a third signal to the second computer for causing a message having an associated token to be assigned to a recipient. The assigned token represents at least one of an audio and visual program of the filtered representation of programs so as to enable the recipient thereof to program a recording system based on the associated token to record the program represented by the token.

Still another aspect of the present invention provides a computer-readable medium having computer-executable instructions for filtering through information at a server system in response to a request from a remote computer to provide a filtered representation of one or more audio and/or visual programs. A message is assigned to a recipient having an associated token based on the filtered representation, which token includes program criteria sufficient to program a recording system to record a predetermined program represented by the token based on the token.

Another aspect of the present invention provides a method for facilitating programming of an associated device. The method includes selecting at a remote computer a program from program information provided by a server system identifying one or more audio and/or visual programs. A message is assigned to a recipient, the message having a token that represents the selected program with sufficient particularity to program a recording system to record the program represented by the token based on the token.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF THE INVENTION

The present invention relates to a system and method to facilitate selection of audio and/or visual programs that, in turn, may be employed to program an associated recording system. Briefly stated, the system includes a local computer operative to connect to a server system through a network infrastructure, such as the World Wide Web (the "Web"). The local computer is programmed to search and/or filter through audio and/or visual program information in the searchable database. A token representing a specific one of the programs may be obtained (e.g., received as email or downloaded or obtained by other data communication means) based on selecting one or more programs from the filtered information.

In the following description, for purposes of explanation, numerous specific details are set forth in order to provide a thorough understanding of the present invention. It will be evident to one skilled in the art, however, that the present invention may be practiced without these specific details. In other instances, well-known structures and devices are shown in block diagram form in order to facilitate description of the present invention.

Figure 1A:
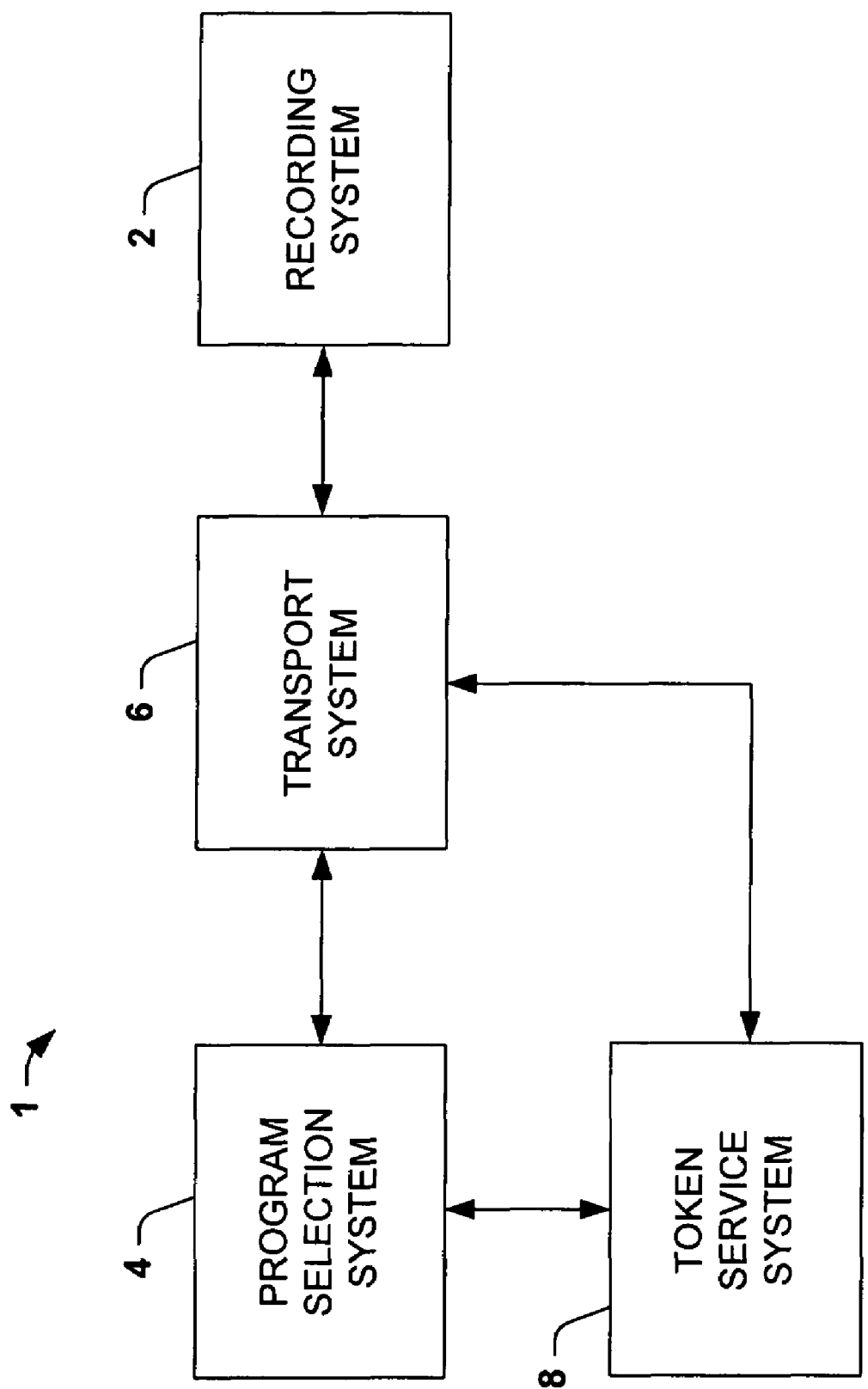
FIG. 1A is functional block diagram of a system to facilitate programming of a recording system in accordance with the present invention.

Turning now to FIG. 1A, a functional block diagram of a system 1 to facilitate programming of a recording system 2, in accordance with an aspect of the present invention, is illustrated. The system 1 includes a program selection system 4 for selecting one or more audio and/or visual programs. The program selection system 4 may communicate information identifying the selected program to the recording system 2 through a transport system 6. The system also may include a token service system 8 for, if needed, processing program information, which may be a token, into a more appropriate form to program the recording system to record each selected audio/visual program. The token service system 8 may receive program information from the program selection system 4 directly, from the transport system 6 during transport to the recording system 2, and/or from the recording system 2 via the transport system.

The program selection system 4 may include a resource or service for selecting audio and/or visual programs that may be recorded at one or more recording systems 2 in accordance with an aspect of the present invention. By way of example, the program selection system 4 may include an EPG, which may be local or remote relative to the recording system 2. One or more Website services also may operate as program selection systems 4, such as may be provided by any third party, including network broadcasters, MSOs, telephone service providers, publishers, etc.

The program selection system 4 may be implemented in conjunction with an electronic appliance operable to communicate with a Web-based service, such as, for example, a telephone (wired or wireless), a personal computer (PC) (e.g., handheld, desktop, portable, etc.), a roaming PC, a PDA, the recording system 2, or any other suitable electronic appliance.

In addition to a user selecting programming, such as with an EPG or Web-based service, the program selection system 4 also may include a subscription service that automatically sends to the recording system 2 information identifying program selections made by the subscription service. The subscription service could be an individual, a group of persons, or an organization to which a user has subscribed and provided sufficient information to enable the subscription to send program information to the subscriber and/or directly to the recording system 2 identified by the subscriber, such as through the transport system 6.

Program information identifying one or more selected programs, such as in the form of tokens, also may be communicated via email or any other data transport mechanism. The message containing a token may be sent to a user or directly to an address associated with the recording system 2, such as through the transport system 6. The message and/or tokens further may communicated to any other address, such as from the recording system 2 or another device (e.g., a remote computer or PDA).

As just described, the transport system 6 facilitates communication of selected programming information to and/or from the recording system 2. Advantageously, the transport system 6 may include any type of transport medium or communications infrastructure to effect programming of the recording system 2 in accordance with an aspect of the present invention. By way of example, the transport system 6 may utilize email, TCP/IP, universal plug-n-play (UPNP), phone dial-up to and/or from the recording system 2, addressability through a satellite and/or cable service provider (MSO), or any other type of communication capable of communicating a token and/or other information to the recording system 2.

The token service system 8 is operable to convert (or translate) program information into a useable format, which may be employed to program the recording system 2 to record a selected program in the tuning space associated with the recording system based on the program information. The program information, for example, may include a universal program identifier (UPID) that identifies a specific program that is scheduled to be broadcast (which broadcast particulars may differ according to the local tuning space). Alternatively or additionally, the selected program information provided to the token service system 8 may include a general purpose program identifier (GPID). A GPID may be utilized to identify a program, such as by identifying attributes indicative of the program. The program attributes, for example, may include a title, director, producer, actors and/or actresses, plot, genre, category, year, etc.

As mentioned above, the program selection system 4 and/or the recording system 2 may provide the program information to the token service system 8. The token service system 8 may convert the received program information, such as may include a UPID, a GPID, and/or any other identifying information for a program into scheduling data (e.g., date, time, and channel) sufficient to program the recording system 2 to record the identified program. The translation at the token services system 8, for example, may be based on stored profile data for the recording system 2 or, alternatively, the program information or associated information (e.g., zip code and service provider information or other data identifying configuration requirements for a recording system) may provide sufficient details about the recording system 2 and local tuning space to enable retrieval of appropriate details for programming the recording system to record the selected program. Desired local tuning space and scheduling data may be stored in one or more scheduling databases that may be associated with the token service system 8.

Various types of services also may be associated with the token service system 8. One related service, for example, may include links to related types of media or events. Another type of related service may store program selections (e.g., made with the program selection system) corresponding to programs not yet scheduled to be broadcast. An associated token service could be programmed to provide the appropriate local programming information to each respective recording system 2 after the program has been scheduled to be broadcast and corresponding scheduling information has been stored in the corresponding scheduling database. Moreover, a token service associated with the token service system might enable dynamic broadcast programming. That is, a broadcaster or network might adjust its broadcast schedule to include a particular program in response to receiving a sufficient number of program selection requests for the program even though it was otherwise not scheduled. Advantageously, the broadcast may occur at off-peak times so as not to interrupt regularly scheduled programming, as the recording system 2 provides an efficient means to time shift broadcast programming.

The token service system 8 further may be employed to monitor token translations and store corresponding demographic and/or marketing information. This information may, in turn, enable a variety of other associated services, such as rating systems, subscription services identifying or sending tokens to recording systems 2, indicative of the most watched (or recorded) programs, etc.

The recording system 2 may include any type of recording device, analog or digital, and a communications link for receiving tokens and/or program information based on which the recording system may be programmed to record one or more identified audio and/or visual programs. For example, the recording system 2 may include a digital video recorder (DVR) for selectively storing broadcast audio and/or visual programs. The recording system 2 also may include more than one tuner to help avoid programming conflicts that might occur, such as being capable of recording more than one program concurrently. Moreover, the recording system may be capable of recording programs from one or more broadcast medium (e.g., cable television, satellite, HDTV, conventional broadcast, radio, etc.). The recording system 2 may be addressable for receiving program information via the transport system 6, which program information may be provided by the program selection system 4 and/or the token service system 8, such as described above.

It is to be understood and appreciated that the translation of the received program information into the appropriate local program information could be implemented at the recording system 2 or at a system local to the recording. For example, the recording system 2 may regularly (periodically or intermittently) receive local tuning space data, which data may be stored locally in a tuning space database. The local tuning space database may, in turn, be accessed to convert received program information into more specific scheduling information based on the source(s) of programming and configuration at the recording system 2.

Moreover, the recording system 2 may be programmable to employ storage management to facilitate storage of programs. For example, the storage medium of the recording system may be partitioned, with each partition being separately addressable via the transport system 6. In this way, the recording system 2 may provide separate storage space for different individuals and/or different types of programming.

By way of example, a user may access a Website by employing a computer, such as a PDA (Personal Digital Assistant), a portable PC, a desktop PC, etc., and see an interesting article for an upcoming movie. The user may obtain a token corresponding to the movie. The token may include a GPID and/or a UPID or other data identifying the movie. The user may employ the computer to, in turn, effect programming of a recording system and/or send the token to one or more individuals that the user believes may be interested in recording the movie.

The token service system may translate the token to the appropriate local tuning space based on identifying information associated with the user, such as may be stored in a cookie or another user ID. The associated scheduling information may be communicated to the recording system identified by the user. However, in the event that program has not yet been schedule in the local tuning space for the identified recording system, appropriate data may be stored for subsequent communication of the scheduling data to the recording system after the scheduling information becomes available. Each individual receiving a token further may utilize the token to program an authorized recording system and/or forward the token to other people.

Figure 1B:
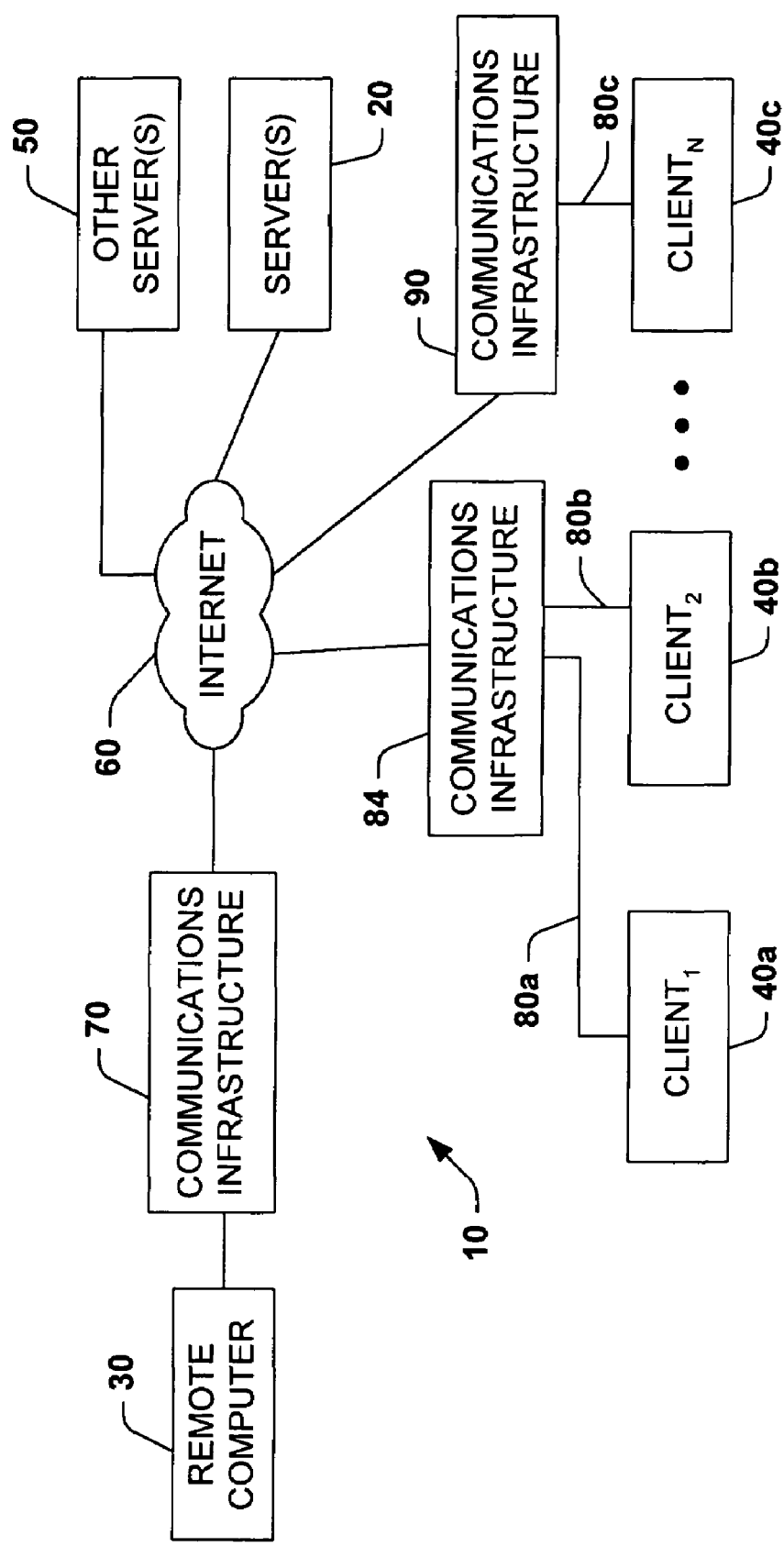
FIG. 1B is an example of a system to facilitate programming of a recording system in accordance with the present invention.

FIG. 1B illustrates a block diagram of an infrastructure or system 10 according to one aspect of the present invention. By way of example, the system 10 includes one or more servers 20 that provide a portal to program criteria that may be selectively obtained and, in turn, employed to program operation of a recording system. The server 20 may provide network services, such as storing information, including program characteristics, links to program-related information, tokens, etc., for numerous audio and/or visual programs. The services provided by the server 20 may be used in conjunction with software running in the remote computer 30 and/or each of a plurality of client systems 40a, 40b, and 40c. The services enable a user thereof, for example, to browse the Web, search and obtain information content contained on the server, send and/or receive electronic mail, and to make use of the Internet in various other known ways. The system 10 also may include one or more other servers 50, which also may provide electronic mail or other Internet-based services, as is known in the art.

By way of example, one or more of the other servers 50 may be a third party service provider that cooperates with the server 20 to facilitate remote programming of a client system 40 (e.g., the user's own or another individual's PVR) in accordance with an aspect of the present invention. A user may access services, such as may be associated with a Website, provided by the server 50 and select one or more desired audio and/or visual programs, such as by clicking on an associated icon with a user input device.

The server 50 may, in turn, send a corresponding request to the server 20 or another of the servers 50, which request may include a token identifying the selected show and user information. The user information, for example, may include a user ID and/or other data (e.g., a cookie) from which the server 20 may determine more specific identifying information associated with the user's client system (e.g., information about the broadcast services—cable, satellite, broadcast television, etc.) and/or the user. By way of example, the user ID information further may include a global identifier for the user, similar to the Passport™ and Wallet™ services provided by the Microsoft Corporation of Redmond, Wash. That is, another of the servers 50 may correspond to a server (e.g., a passport server) that provides a Wallet™/Passport™ type of service, which facilitates roaming. For example, the server 50 can communicate to the server 20 desired information about the user's (or another person's) client system 40a, such as a PVR ID, zip code, service provider information, etc. in response to the request to the user's selection. Alternatively, the server 50 that provides the service where the user made the selection may send information to the server 20 via the Internet 60 or another communications link sufficient to identify the user and/or a client system associated with the user. In response to the identifying data from the server 50, the server 20 may locate local programming information, such as may be stored in a broadcast content database for each selected program. The server 20, in turn, may pass the programming information directly to the user's client system 40, which automatically programs itself to record each audio and/or visual program selected by the user.

Each of the client systems 40a, 40b, and 40c (hereinafter collectively referred to as "client systems 40") is located remotely from each server 20 and 50. While, in the example of FIG. 1B, the remote computer 30 is illustrated as being separate from each client system 40, it is to be understood and appreciated that the remote computer may be integrated into or operatively connected to an associated one of the client systems 40a, 40b, and 40c. For purposes of brevity, FIG. 1B illustrates three client systems 40a, 40b, and 40c and one remote computer 30, although it is to be appreciated that a greater number of client systems and remote computers may be in the system 10.

The remote computer 30 is connectable to a conventional network infrastructure, such as the Internet 60, through an associated communications infrastructure 70. The communications infrastructure 70, for example, is a modem bank associated with an ISP (Internet Service Provider). As mentioned above, the remote computer 30 may be employed to browse a website and/or search for programs matching selection criteria provided by a user or by a service provider. The servers 20 and/or 50 may comprise multiple physical and logical devices connected in a distributed architecture. Each client system 40 and the remote computer 30 further may connect to the servers 50 and 60 either through a direct data connection (not shown) (e.g., telephone, DSL, Cable Modem, wireless data communications, ISDN, etc.) or through the Internet 60 via its associated communications path.

Each client system 40, for example, is an entertainment appliance programmed and/or configured to receive audio and/or visual programs content in a predetermined format. Examples of signal formats include analog television (cable, satellite, etc.), digital television, or other formats. Examples of systems employing such standard formats that may be implemented in a system, in accordance with the present invention, include Direct Satellite Systems ("DSS"), Advanced Television ("ATV") systems, Digital Television ("DTV") systems, Video-on-Demand, MPEG over ATM Networks, High Definition Television ("HDTV"), cable (e.g., DVB-C) etc. audio and visual programming from a source of programming.

Each client system 40 also may be programmed and/or configured to connect to connect to the Internet 60 and employ a standard television set as a device for browsing the World Wide Web ("the Web"). The connection between each client system 40a, 40b, 40c and the Internet 60 is made through a respective communications link or data connection 80a, 80b, 80c. A communications link may be, for example, a standard telephone, DSL, ISDN (Integrated Services Digital Network), or other similar communications path. In the example of FIG. 1B, communications links 80a and 80b connect the client systems 40a and 40b, respectively, to the Internet 60 through a common communications infrastructure 84, such as a modem pool at an Internet Service Provider ("ISP"). The communications link 80c connects the client system 40c to the Internet 60 through another communications infrastructure 90 such as, for example, another ISP or a private Internet server.

Each client system 40 may have one or more email addresses associated therewith. As a result, a remote device, such as the remote computer 30, having email capabilities may, in turn, communicate with any of the client systems 40 via email in a conventional manner. For example, each person in a given family may have a different email address associated with a common client system 40a for receiving email. A component or subsystem (e.g., a digital audio/video recording system) of the client system 40a also may be provided with its own email address (or addresses) for receiving program instructions or other pertinent control information via email, such as in the form of an attachment or an object embedded in the email. The remote computer 30 may be located remotely from the client systems 40, although it may be located in generally the same physical location (e.g., an individual's home) as one of the client systems.

Figure 2:
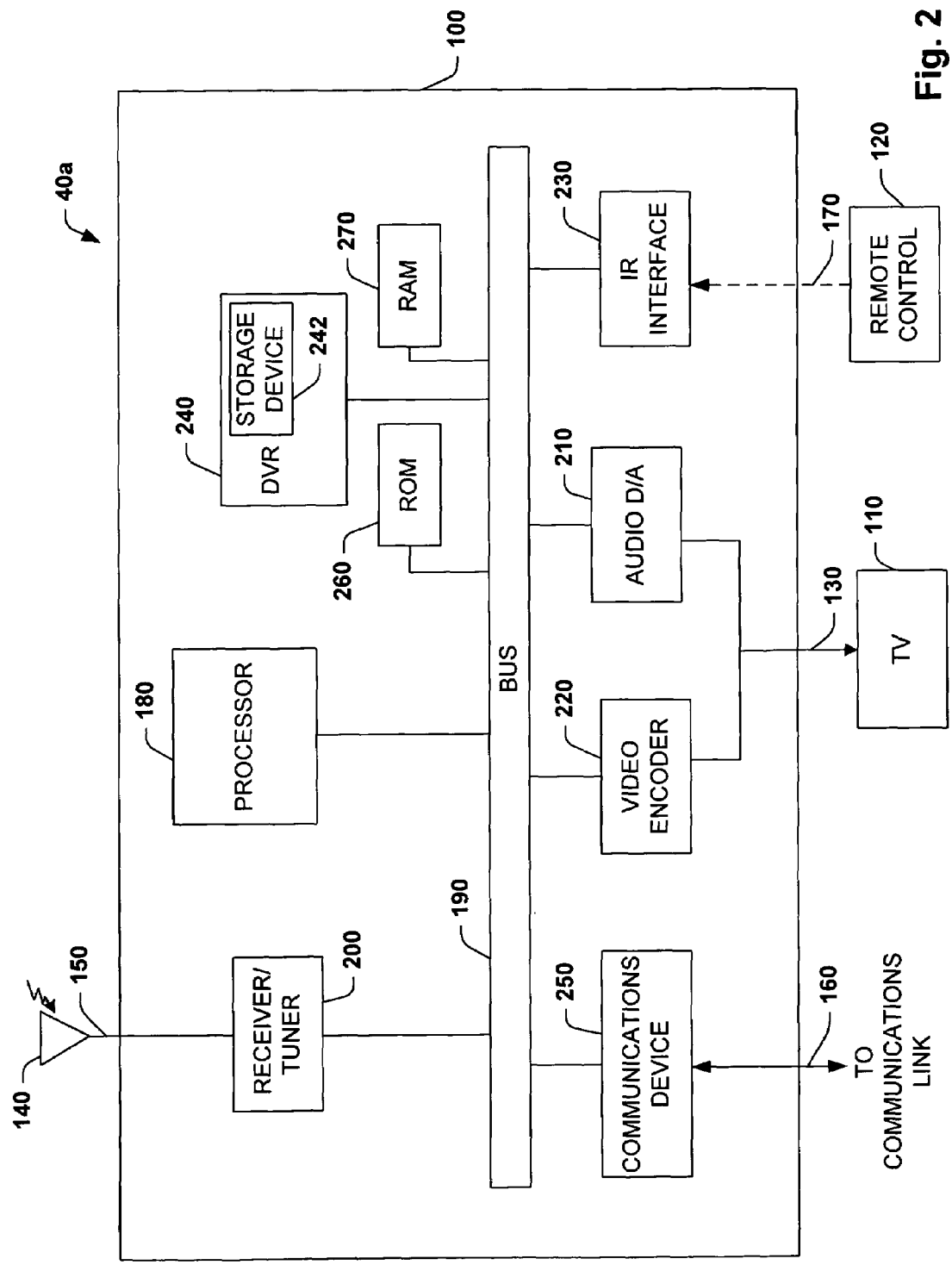
FIG. 2 is block diagram of a client system in accordance with the present invention.

FIG. 2 illustrates a block diagram of an illustrative client system 40a in accordance with an aspect of the present invention. By way of example, the system 40a includes a set-top box 100. The box 100 includes hardware and software for providing the user with a graphical user interface ("GUI") by which the user can browse the Web, send email, access other Internet services, and control other functions of the system 40a. The client system 40a also includes an ordinary television set 110 (or other type of display device) and a remote control device 120, which may be used to control the set-top box and/or the television. Alternatively, the box 100 may be built into the television set 110 to form an integral unit.

The client system 40a may employ the television set 110 as both a display device and an audio output device, although a supplemental audio system may be operatively connected to the box or the television for providing an additional audio source. The box 100 is coupled to the television set 110 by a link 130. The link 130 includes an audio channel (digital and/or analog) for generating sound from the television's speaker and a video channel, such as an RF (radio frequency), fiber optic, S-video, composite video, component video, or other suitable form of video channel.

The box 100 also is coupled to one or more sources of audio and/or visual broadcast programming 140 by a connection 150. In the example of FIG. 2, the broadcast programming source is illustrated as an antenna for receiving programming signals transmitted through free space, such as in the form of satellite, conventional broadcast television, or high definition television signals (analog or digital). It is to be appreciated that the box 100 may be programmed and/or configured to receive audio and/or visual programs from other types of programming sources, such as cable television or Internet audio/visual streaming, such as in accordance with any broadcasting format. Moreover, different programming sources also may be combined to provide a broader programming selection. The audiovisual source 140 provides a signal to the set-top box 100 via a connection 150. The signal may be digital or analog, with the set-top box 100 being appropriately programmed and/or configured for processing the signal received via the connection 150.

The set-top box 100 also is connectable to a communications link 42 or 44 (FIG. 1B) via a bi-directional connection (or data link 80a) 160. The connection 160 may be in the form of a conventional telephone network (POTS, i.e., Plain Old Telephone Service), ISDN, DSL, Cable Modem or other suitable data connection. The extent of the connection 160 may be intermittent, continuous and/or user defined. The box 100 also may be connected to a power supply (not shown) for receiving an appropriate electrical energy.

A user employs the remote control 120 in order to control the client system 40a, such as to browse the Web and perform other functions. The box 100 receives commands from remote control 120 via a wireless communications link 170. The communications link between the box 100 and the remote control 120, for example, is an infrared ("IR") communication link, although any other suitable type of link may be used, including a wired link (e.g., an electrically conducting or fiber optic cable). A control panel (not shown) also may be built into the set-top box 100 for controlling operation of the client system 40a.

Referring now to the internal contents of the box 100, the box includes a processor 180, which is coupled to a bus 190, for controlling the internal operation of the box and peripheral devices coupled to the box. The functions performed by the box 100 under the control of the processor 180 may result from software instructions executed by the box 100 and/or from operation of hardwired circuitry. In addition, the bus 190 may represent multiple physical buses connected by various bridges and/or adapters, the details of which are not required for an understanding of the present invention.

The box 100 also includes a receiver/tuner 200 (digital or analog) for receiving and decoding the audio and/or visual programs received from the source 140 via connection 150. By way of example, the receiver/tuner 200 may be programmed and/or configured to receive and decode signals in at least one of several data formats (e.g., based on the MPEG standard, the NTSC standard, broadband, etc.). The receiver 200 is coupled to the bus 190, such as for receiving instructions identifying which channel or channels to decode. The receiver also provides a digital output signal to the bus 190 corresponding to the decoded audio and/or visual programs. It is to be understood and appreciated that multiple tuners 200 may be incorporated into the box 100 so as to enable the system to receive, decode, and play or record multiple broadcast and/or stored programs concurrently. Moreover, multiple tuners may be employed to receive broadcast programs from different sources of programming (e.g., cable and satellite).

Also coupled to the bus 190 are an audio digital-to-analog ("D/A") converter 210, which provides audio output to the television set 110, and a video encoder 220, which provides video output to the television 110. The outputs of the audio converter 210 and the video encoder 220 are combined by conventional circuitry (not shown) to provide the link 130 to the television 110. While the audio converter 210 and video encoder 220 have been described as providing analog output signals, it is to be appreciated that corresponding digital components may be employed provided that the television or other associated display and/or audio equipment are capable of demodulating such signals.

An IR interface 230 also is coupled to the bus 190 for detecting IR signals transmitted by remote control 120. In response to the IR signals, the IR interface 230 provides corresponding digital signals to the bus 190 indicative of the IR signals 170. The signals from the IR interface 230 are utilized, for example, to control a GUI displayed on the television 110 (or other display) and/or execute command instructions associated with the IR signals 170. As a result, a user may employ the remote control 120 to send and/or receive email, connect to and navigate the Web, select audio and/or visual programs, program recording of selected programs, etc.

A digital video recorder ("DVR") 240 also is coupled to the bus 190 for recording selected audio and/or visual programs in response to instructions from the processor 180. The DVR 240 stores recorded programming on an associated storage device 242 (e.g., magnetic, optical, magneto-optical, or other equivalent mass storage medium) and may employ appropriate data compression techniques, such as the Motion Picture Experts Group ("MPEG") family of compression/decompression standards (e.g., MPEG-2), although other data storage formats (analog or digital) also may be utilized. A user may, for example, employ the remote control device to retrieve selected programming for playing or sending a selection to an associated peripheral device, such as the television 110. For example, the DVR 240 may maintain in associated memory 242 a data structure, such as a table, indicative of audio and/or visual programs that are to be recorded. Another table may be provided for storing a listing of recorded programs stored in the storage device 242. A user may, for example, employ the remote control 120 to graphically navigate the programming lists, modify or update a programming list, or select to view a recorded program of interest. As set forth in greater detail below, an email message also may contain program criteria based on which the processor 180 may instruct the DVR 240 to add program criteria to the program list for recording corresponding broadcast programming.

A communications device 250 is coupled to the bus 190 to provide bi-directional data communication through the connection 160. The communications device 250 may, for example, communicates with the server 20 and/or the other server(s) 50 (FIG. 1B) through the connection 160. The communication device 250 may be a conventional telephone modem, DSL modem, an ISDN adapter, or any other suitable data communication device. A read-only memory (ROM) 260 and a random access memory (RAM) 270 are also coupled to the bus 190. The RAM 270 provides the main memory into which the operating system and application programs are loaded for controlling operation of the set-top box 100 and associated peripheral equipment. The ROM 260 may include programmable-erasable memory, such as an electrically-erasable programmable ROM ("EEPROM") or flash memory.

Other devices also may be coupled to the bus 190, including an expansion bus (not shown). By way of example, the expansion bus is a high-speed, multiplexed (address and data), parallel data bus that is used to connect various peripheral devices to the set-top box 100. Peripheral devices which may be connected to the box 100 using the expansion bus include devices such as, for example, printers, mass storage devices (e.g., CD-ROM, digital versatile disk ("DVD"), magnetic disk, etc.), microphones, video cameras, video tuners, and additional data communication devices. A client PC also may be directly coupled to the client bus 190 through the expansion bus. It will be recognized that various adapters may be used to interface the expansion bus with bus 190 the details of which are not required for an understanding of the present invention. Additionally, while the DVR 240 is illustrated as being an integrated part of the box 100, it is to be understood that the DVR alternatively may be external to the box, such as coupled to the bus 190 through the expansion bus.

Figure 3:
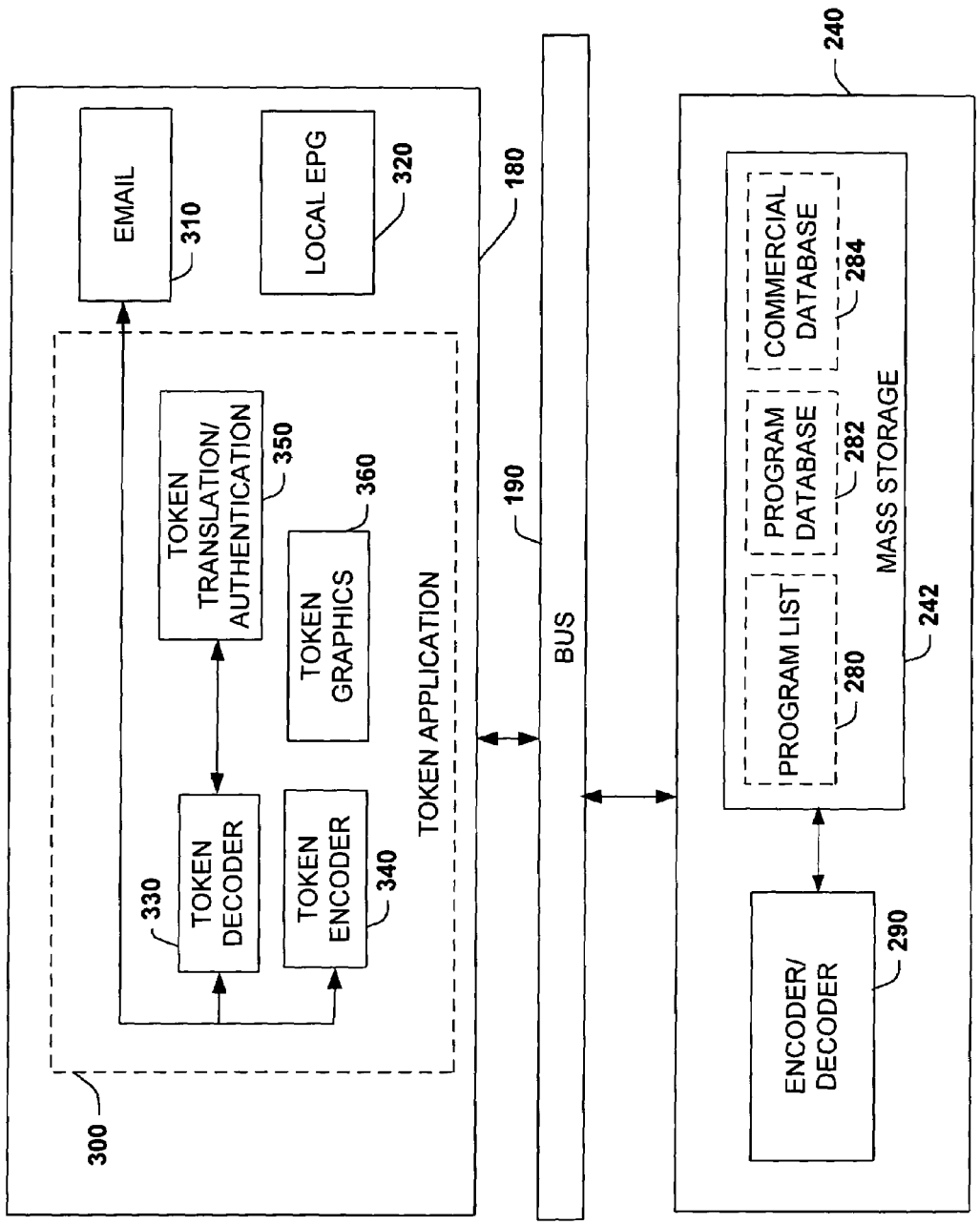
FIG. 3 is a functional block diagram of part of the client system of FIG. 2 in accordance with the present invention.

FIG. 3 illustrates a functional representation of the DVR 240 operating as part of the client system 40a in accordance with an aspect of the present invention. As mentioned above, the DVR 240 includes a mass storage device 242, such as a hard disk drive or other suitable non-volatile data storage device. The storage device 242 includes, among other things, a program list 280 that is indicative of audio and/or visual program content that is to be recorded.

The storage device also includes a program database 282 for storing recorded programs, such as in a compressed data format. As described herein, each program may be formed of a plurality of discrete program segments that are linked together and stored in the program database 282 so that the individual program segments may be combined in a predetermined order, such as may be indicated in the token(s) representing the program segments. The storage device 242 further may include a separate commercial database 284 for storing program segments corresponding to advertisements. It is to be appreciated that, for purposes of practicing the present invention, program segments for shows and advertisements may be employed in a substantially identical manner. As a result, program segments may be selectively combined at the client system in an order, such as may be indicated in a token representing a particular program or as may be programmed by a service provider. By way of example, the client system may be programmed to select commercials from its stored database based on viewing characteristics of the client system, such as, for example, who is watching, the time of day, the particular show being viewed, the type of show, etc. In this way, program segments from the commercial database 284 may be dynamically inserted between adjacent pairs of program segments of a corresponding program from the program database 282 to provide customized advertisements during playback of the corresponding program.

The DVR 240 also includes a decoder/encoder 290, such as according to an MPEG standard format (e.g., MPEG 2) for coding/decoding audio and/or visual data (movies, video, music, etc.) in a digital format. It is to be understood and appreciated that other encoding/decoding schemes may be utilized, and that all such schemes are within the scope of the present invention.

By way of example, the DVR 240 also is programmed (e.g., computer-executable code stored in the storage device 242) to include a token application or API 300 that may run at the client system. The token application 300 enables interactions with tokens, in accordance with an aspect of the present invention, so as to facilitate remote programming of the DVR 240 based on program data contained within a received token. The token application 300, which runs in the processor 180 and associated memory, may be used in conjunction with an email application 310 and/or an EPG 320 also running in the processor 180 of the client system, such as to send and/or receive an email message having one or more associated tokens indicative of preselected audio and/or visual programs.

As used herein, the term "token" refers to transportable data or information that identifies a specific audio and/or visual program or a segment of a specific audio and/or visual program. The token may include an XML formatted packet of data having an agreed upon format (or schema—see FIG. 8) for identifying pertinent program information for a corresponding segment of broadcast audio and/or visual information so as to enable the DVR 240 to add program criteria to the program list 280 for recording the program. A token may include specific tokens requested by the user and/or those provided to the user as part of a subscription.

A token, for example, may be communicated to and from a client system as an attachment to an email message (see, e.g., FIG. 5), as well as by other data communication methods. Other methods for sending tokens to a client system may include other Internet Protocol from a remote server, TCP/IP or other protocol on a local network (e.g., a home network), etc. A client system further may be programmed to call a certain telephone number (e.g., corresponding to a service provider) to connect to the service provider's computer that provides one or more tokens, which previously may have been assigned to the client system, to remotely program a recording device associated with the client system to record each program represented by a token. A token also could be sent to a user as part of a digitally encoded message (or data packet) embedded within a globally broadcast signal (cable, satellite, etc.) that is received at a client system, such as a separate channel or on a subcarrier of a broadcast channel.

Those skilled in the art will appreciate other methods or processes that may be implemented (e.g., as part of the token application 300) at a client system for receiving tokens, in accordance with an aspect of the present invention, based on which a recording device, such as the DVR 240, may be programmed to record a specific program represented by each token. It further will be appreciated that, in accordance with an aspect of the present invention, a given client system may be programmed and/or configured to employ more than one type of data communication protocol for sending and/or receiving such tokens.

Referring back to the example of FIG. 3, the token application 300 includes a token decoder 330 and a token encoder 340 for respectively decoding and encoding token information. Specifically, the token decoder 330 extracts token information from a token. For example, a user may select a token with a user input device (e.g., the remote control 120 of FIG. 2), from which DVR programming may be implemented.

When a client system receives a token having program data, such as may be associated with an email message, for example, the token application 300 may employ a token authorization/translation module 350. It is to be appreciated that the client system may receive the token by other data communication mechanisms (wired or wireless). The token authorization/translation module 350 determines whether the token originated from an authorized source, such as a trusted friend, a website, or other pre-authorized location (e.g., a service provider). When the token is sent associated with an email message, for example, the token authorization/translation module 350 may determine whether the message is from an authorized sender based on the sender's email address and/or an authorization password provided with the email, such as part of the token or another email attachment. If a proper authorization mechanism is provided, the token authorization module may accept the token. Once accepted, a token is utilized to program the DVR 240 for recording the selected audio and/or visual program(s) when broadcast.

In contrast, if no authorization mechanism is provided to permit automatic acceptance, the user may be prompted with a graphical display requesting explicit instructions as to whether the token should be accepted. In order to mitigate the potential of receiving false authorizations via email (or spamming), password protection or other authentication techniques may be employed. The password may be provided (e.g., entered by the sender) as part of the token or it may be in another portion of the email message. Alternatively or additionally, the sender's email address may be examined to determine whether it corresponds to a source that has been pre-authorized by the user.

The token authentication/translation module 350 also may be employed to translate each token into a predetermined format for selectively programming a PVR to record the program(s) represented by the token. The token authentication/translation module 350, for example, may be resident within the client system (e.g., part of the token application 300 (as shown)) and periodically updated to include program criteria for a plurality of programs in the local tuning space associated with the client system. Alternatively, a translation module (or a portion thereof) may be a remote component, such as resident on a server (e.g., the server 20 shown in FIG. 1B). The token authentication/translation module 350 may be implemented, for example, in response to receiving an email message at the client system after the token associated with the message has been authenticated. Alternatively, a remote translation module may be initiated at a server when the token is obtained from the server and/or forwarded to a PVR. Regardless of its implementation, the program criteria provided by the token enables the PVR to be programmed to record selected programs broadcast locally relative to the client system. The discrete nature of having a token associated with a specific program enables other client systems to selectively determine which token (any, all or none) to execute specific instructions to record a specific program.

The token encoder 340 is operative to encode program data in the form of a token, such as may be associated with (e.g., attached to) an outgoing email message based one or more selections of the user. In particular, the token encoder 340 operates to place programming data associated with a selected audio and/or visual program into a predetermined format for a token decoder, such as may be resident at another client system or remote device. For example, a user may select audio and/or visual broadcast programming of interest and send an email message to one or more other persons. The token encoder 340 creates a token corresponding to the programming selected by the user. The token is then attached to an email message, such as with the remote control 120 (FIG. 2). It is to be appreciated that each token may include program information associated with a single program or, alternatively, a token may bundle program information, which is then decoded into individual programming selections by an appropriate token decoder.

The token application 300 also includes a token graphics module 360 that controls the graphical display associated with creating, sending, receiving, and viewing programming information associated with a token. The token graphics module 360 writes a graphical user interface (GUI) to a window address to display selected information to the user. The user interacts with the displayed GUI by employing a user input device, such as the remote control 120 (FIG. 2).

It is to be appreciated that a token application (or portions thereof), in accordance with the present invention, also may be resident in another device, such as the remote computer 30 (FIG. 1B), for attaching tokens to email messages corresponding to audio and/or visual programs selected by the user of such device. In this way, a user may employ the other device to locate and select audio and/or visual programs and to send an email message to one or more selected email addresses having an attached token (or tokens) indicative of the selected programming. For example, a PC-based EPG may be utilized to browse the data-intensive Internet and locate programming content. The token application (including a token encoder thereof), which is associated with the EPG, places the programming information into a predetermined format as token associated with an email message.

Figure 4:
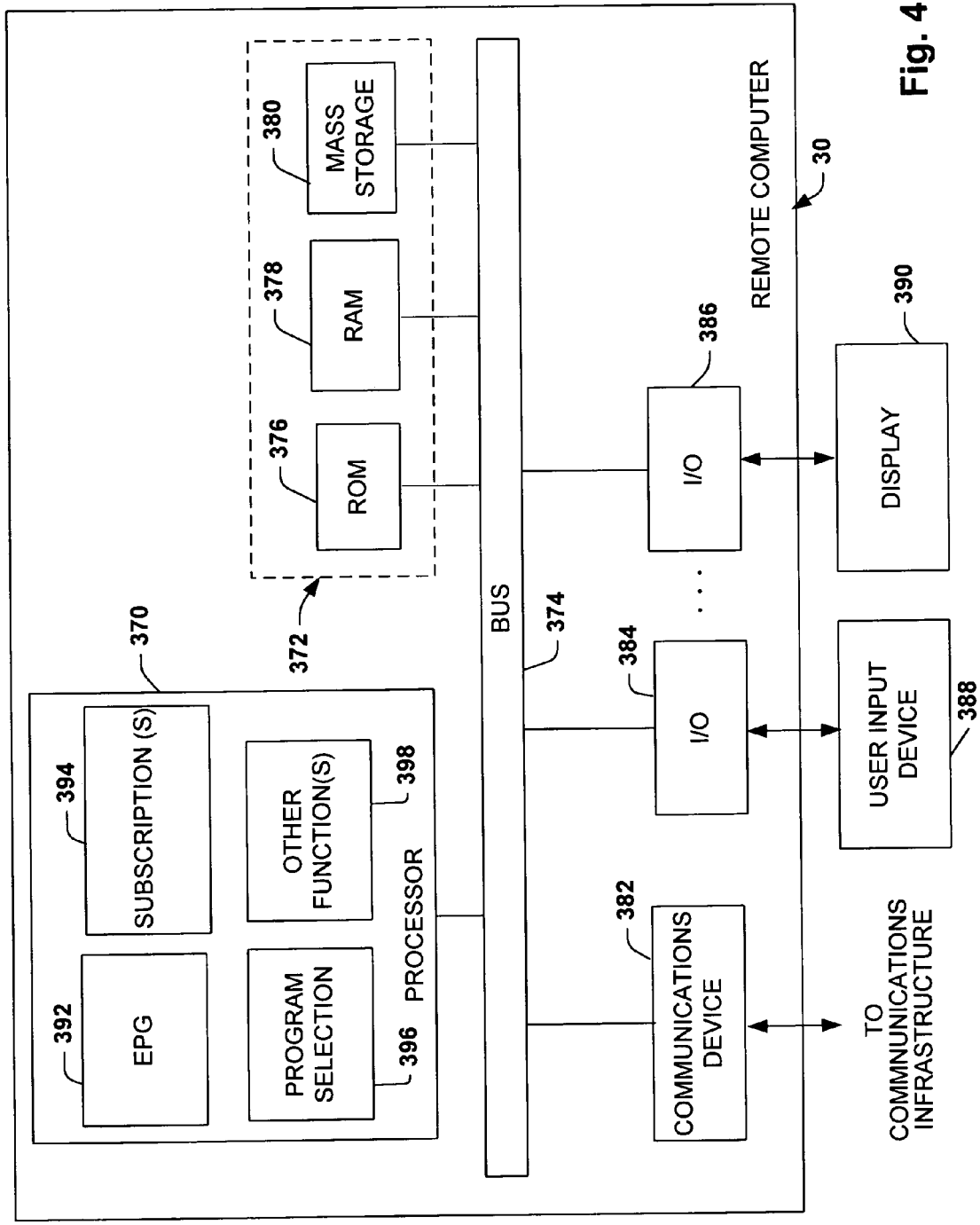
FIG. 4 is a functional block diagram of a remote computer programmed in accordance with an aspect the present invention.

FIG. 4 illustrates a remote computer system 30, which may form part of the system 10 of FIG. 1B, in accordance with an aspect of the present invention. It is to be understood and appreciated that the illustrated computer system 30 is one possible example of architecture; a computer is not restricted to such architecture for purposes of practicing the present invention. The computer system 30 includes a processor 370 and memory 372 operatively coupled to a system bus 374. The bus 374 may represent multiple physical buses connected by various bridges and/or adapters, the details of which are not required for an understanding of the present invention. The memory 372 includes ROM 376, RAM 378, and a mass storage facility 380, each of which may be coupled to the bus 374 via a suitable interface (not shown). The ROM 376 may include programmable and/or programmable-erasable storage. The mass storage facility 380 may include a magnetic, optical, magneto-optical, or other equivalent mass storage medium.

The computer system 30 also includes a communications device 382 and various input/output (I/O) devices 384 and 386, which also may communicate over the bus 374. The I/O devices 384 and 386, for example, may include interfaces that connect to external peripheral devices, such as a user input device (e.g., mouse, keyboard, etc.) 388 and a display device 390, respectively. It is to be understood and appreciated that additional I/O facilities (not shown) also could connect to other peripheral devices or other related computing devices.

The communication device 382 may be a conventional telephone (POTS) modem, a DSL modem, a cable modem, an ISDN adapter, or any other suitable data communication device (wired or wireless). The communication device 382 may be used to communicate data between the computer 30 and another computer (e.g., a remote server or another PC), such as to receive and send email, browse the Web, and implement other queries related to audio and/or visual programs.

While, for purpose of brevity, the computer 30 is illustrated as a single device, it is to be appreciated that it may actually comprise multiple devices connected in a distributed architecture. In distributed system, the communication device 382 (or one of the I/O facilities 384–386) may be used to communicate data between the computer 30 and other physical devices used to implement selected functionality remotely.

By way of example, the computer system 30 is a personal computer (PC), although it also may be a workstation, a hand-held computing device, a wireless web phone, a microprocessor-based or programmable consumer electronic system (wired or wireless), or similar type of device. A PC, generally speaking, is able to navigate the intensive Web content by employing an input device, such as a mouse or other input device. The user input device 388 and PC, facilitate navigation of a variety of resources available on the Web along with displaying high resolution textual information that, in turn, may enhance the program selection process. The remote computer 30 further may be employed to send to one or more client systems (or directly to a recording device) an email message having a token(s) indicative of program criteria selected by the user of the remote PC. The use of specific tokens for each program enables other clients receiving the emails with tokens to selectively determine which of the programs it will record.

The computer system 30 may, in accordance with an aspect of the present invention, be programmed and/or configured to implement a variety of processes or methods with respect to the applications and/or other data stored in the memory 14. It will be recognized that processes described herein as being performed by the computer 30 may result from the processor 12 executing software instructions, from operation of hardwired circuitry, or combination of both. It will be appreciated that in a distributed computing model, for example, part of one or more of the applications, method, or functions also might run on a computer remote relative to the computer 30. The processes also may run on a server computer to which the local computer 30 is connected through a network infrastructure, such as the Internet, with a graphical user interface being displayed on the local computer. As set forth in greater detail below, the processes and/or interfaces may include an EPG 392, subscription(s) 394 from a service provider, a program selection mechanism 396 for obtaining tokens for selected programs, and any other functionality 398 that may be useful in searching for and obtaining information and/or tokens indicative of one or more audio and/or visual programs.

Briefly stated, the EPG 392 may be implemented in connection with one or more databases, such as at one or more remote computers (servers). A user at the local computer may employ the EPG 392 to filter through information content in the database(s) and help locate one or more audio and/or visual programs matching selection criteria entered by the user.

A subscription process 394, for example, may be provided by a website running on a server computer that provides an interface to which a user may connect for sorting through information and program criteria stored in one or more databases in association with the subscription. The subscription 394 employs selection criteria selected by the provider of the subscription service to provide a set of programs from which a subscriber or user may select. A user/subscriber, for example, may access a website for a subscription to receive information about selected programs, access links to related websites, obtain or send program criteria (e.g., tokens) indicative of audio and/or visual programs selected by the service provider, etc. The subscription function 394, which may include passive or active lists maintained on one or more servers accessible via the Internet (e.g., for a trusted television or film critic, an Internet movie database, American Film Institute, etc.).

The program selection process 396 is employed by a user of the local computer to obtain and/or send a token representing a selected program to a recipient, which may be the user, the user's PVR, or another recipient. The user also may select to store tokens remotely, such as at a server, from which a client system may connect to (directly or indirectly via a network infrastructure) to obtain one or more of the stored tokens for programming the user's PVR. The recipient of the token may be the user or one or more other users or a recording system. The program selection process 396 may be part of a website running on a server computer and/or may run on software resident in the local computer 30.

The computer 30 also may utilize other websites and/or functionality 398, such as to provide additional functionality with respect to searching for programs and for obtaining and/or sending tokens related to selected programs. For example, a website may exist that enables a user to create a customized filter (similar to a subscription) based on selection criteria provided by the user. The other functionality 398 may have several programmable levels, similar to the levels of criteria that may be selected with the EPG function 36. The other functionality 398 further may work in conjunction with Internet browsing software and search engines (local and remote) programmed in the remote computer for searching various websites for programs matching the selection criteria programmed in the filter function. The results are provided to the computer 30 as part of an interactive display from which a user may select one or more programs, obtain additional information about programs, and obtain and/or send tokens related to each selected program(s).

It is to be understood and appreciated that the functionality described with respect to the remote computer 30 also may be implemented at the client systems 40 (FIG. 1B). For example, the functionality may be provided at a client system 40 in connection with a television-based Internet service.

Figure 5:
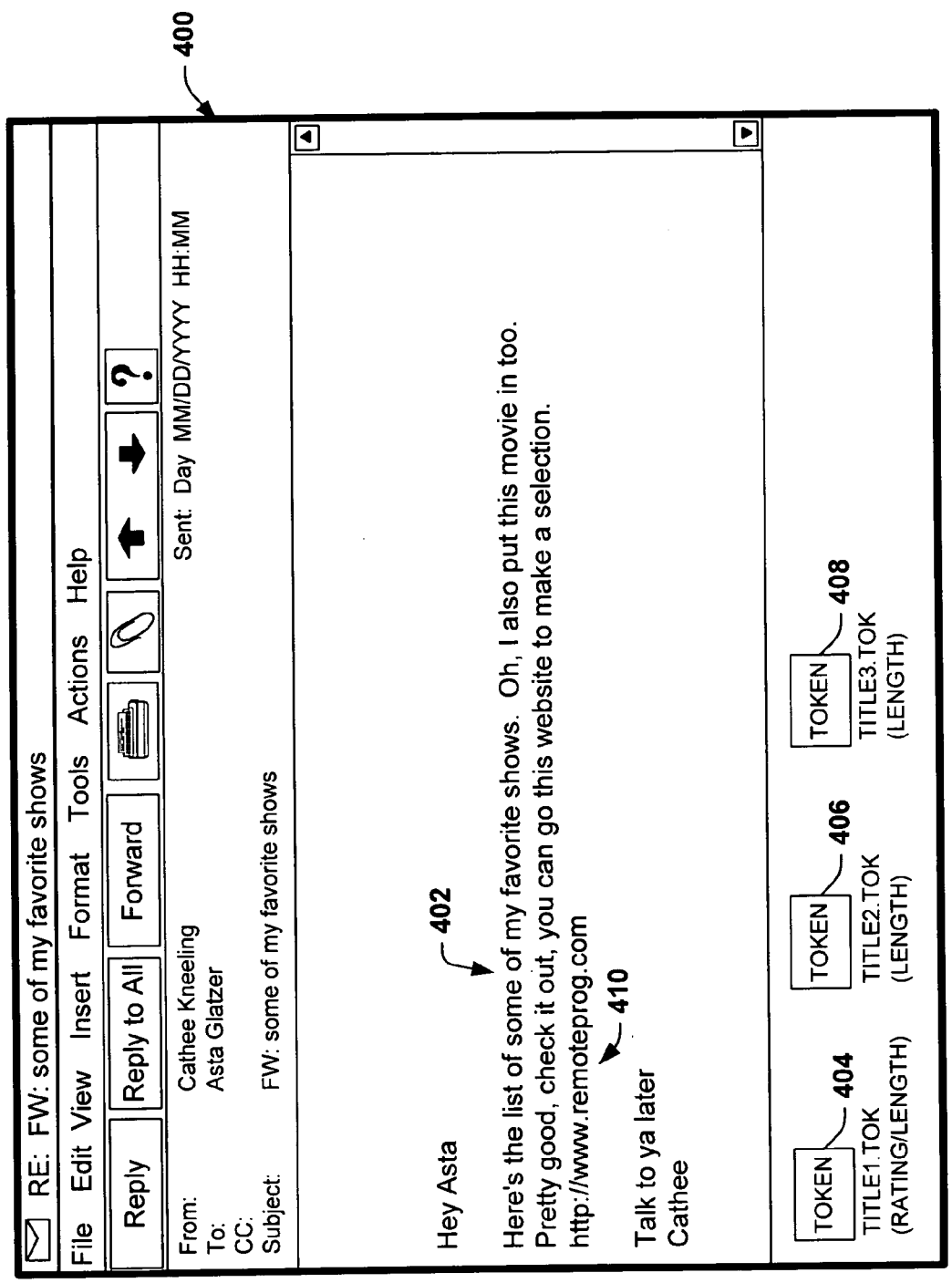
FIG. 5 is an example of a graphical representation of an email GUI having tokens in accordance with the present invention.

FIG. 5 illustrates a graphical representation of an email GUI 400 having a text message 402 and three tokens 404, 406, and 408. In this example, the tokens 404–408 are illustrated as attachments to the email text. It is to be understood and appreciated, however, that a token also may, in accordance with an aspect of the present invention, be associated with an email message in other contexts. For example, a token may be inserted into the text of an email message in the form of a Component Object Model (COM) object or by employing any other embedding or linking technology to associate the token with an email message (e.g., CORBA, etc.). Moreover, a token having audio and/or visual program data may be communicated from a remote computer to a client system via other data communication means.

Each token 404, 406, 408 has an associated filename having a suffix ".TOK" so as to identify each respective token as a token to an appropriate application (or other object). In particular, the token filenames are "TITLE1.TOK", "TITLE2.TOK", AND "TITLE3.TOK", with each filename identifying either a title of a corresponding program or describing the program in a predetermined manner. Associated with each token also may be an indication as to the length of the program and/or its rating. The rating system, for example, may be an established standard. In order to obtain additional information about programming corresponding to a particular token 404, 406, or 408, a user invokes one or more selected tokens, such as by selecting the token with a user input device (e.g., the remote control, a mouse, etc.).

The email message 402 also may include a uniform resource locator ("URL") 410 that identifies a Web site selected by the sender. For example, the sender may direct the email recipient, Steve, to a Web site containing an interesting arrangement of programming selections from which corresponding tokens, in accordance with the present invention, may be derived.

Figure 6:
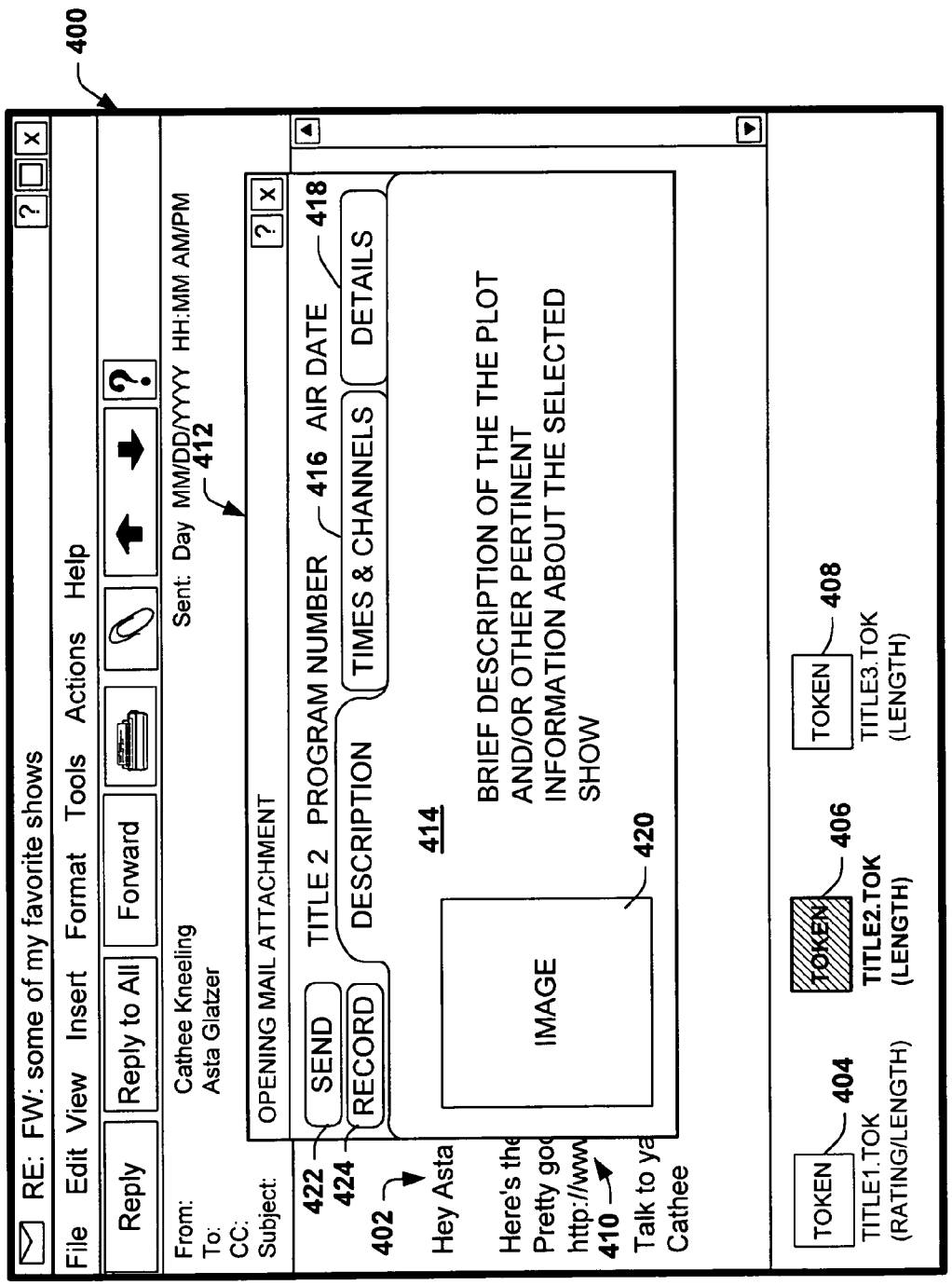
FIG. 6 is an example of a graphical representation of an opened token superimposed on the email GUI of FIG. 5, in accordance with the present invention.

FIG. 6 illustrates a graphical representation of an exemplary pop-up window 412 (or GUI) that might be displayed in response to invoking the token 406 (cross-hatching is used to indicate the token being selected). The GUI 412, for example, provides information indicative of the audio and/or visual program identified by the token 406. By way of example, different aspects of the program information may be separated in individual folders, such as a DESCRIPTION folder 414, a TIMES & CHANNEL folder 416, and a DETAILS folder 418. The DESCRIPTION folder 414 may contain a short summary of the program and an image (or a short preview video) 420 for the selected program. The attachment also identifies the airdate for the program.

Action buttons, namely, a SEND button 422 and a RECORD button 424 also are associated with the pop-up window 412. The SEND button 422 enables the user to send the token to an email address, such as may be located on a distribution list of the email GUI 400. The RECORD button 424 provides a mechanism to enable the user to program an associated device (e.g., a PVR) to record the audio and/or visual broadcast programming identified by the token 406.

By way of example, when the email reader 400 is part of a client system, such as a client system, the RECORD button 424 may be selected to cause program information from the token 406 to be added to a program list of the associated PVR. As a result, the PVR will record the program on its corresponding airdate and time based on the token. Alternatively, when the email reader 400 is part of a remote computer, the RECORD button 424 may cause the token to be sent as part of an email message to an email address of the user's (or another person's) PVR. As mentioned above, a PVR may be programmed to automatically program operation of the PVR in response to receiving an email message having a token from a pre-authorized source. The authorization or authentication, for example, may be determined based on the email address of the sender, a password provided with the email (e.g., as part of the token or another attachment), or another authentication technique.

If the user desires neither to record the program nor to send the token to another email address, the user may simply close the pop-up window 412. The user may then elect to view the other attachments 404 and/or 408, close the email, or take other action relative to the email message 402 or its attachments (e.g., delete, forward, reply, go to the URL 410, etc.).

Figure 7:
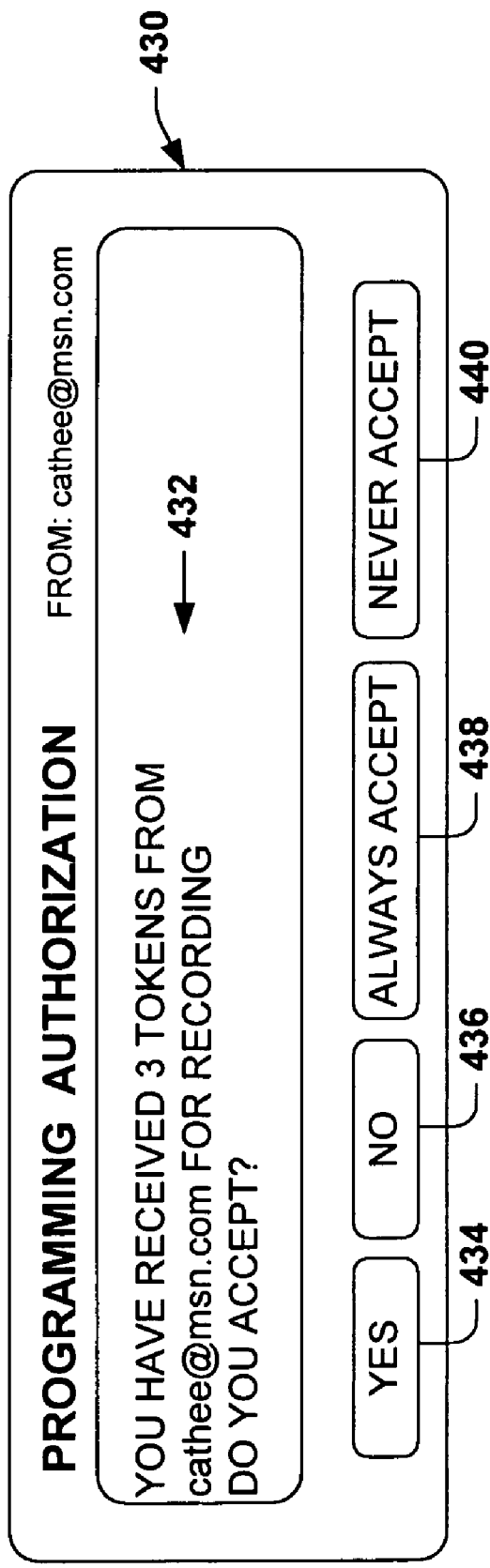
FIG. 7 is an example of a graphical representation of a programming authorization GUI in accordance with the present invention.

FIG. 7 is a graphical representation of an exemplary GUI 430, which might be displayed in order to obtain programming authorization in response to receiving tokens. In this example, the GUI 430 includes a message 432 indicating that three tokens have been received from "curtis@msn.com." The GUI 430 provides the user with options concerning whether to accept the tokens. The options are in the form of action buttons, which may include: a YES button 434; a NO button 436; an ALWAYS ACCEPT button 438 (upon authentication); and a NEVER ACCEPT button 440.

For example, if the user selects the YES button 434, a token application adds the tokens to a program list of the PVR to record each of the shows indicated by the accepted tokens. The NO button 436 is employed to decline the tokens. Selecting the ALWAYS ACCEPT button 438 results in a token application adding the sender's email address to list of pre-authorized sources, which may result in automatic programming of the user's PVR according to tokens received from that source. In contrast, the NEVER ACCEPT button 440 may add the sender's email address to another list or filter, which identifies sender's whose email is to not to trigger a programming authorization request 430.

Figure 8:
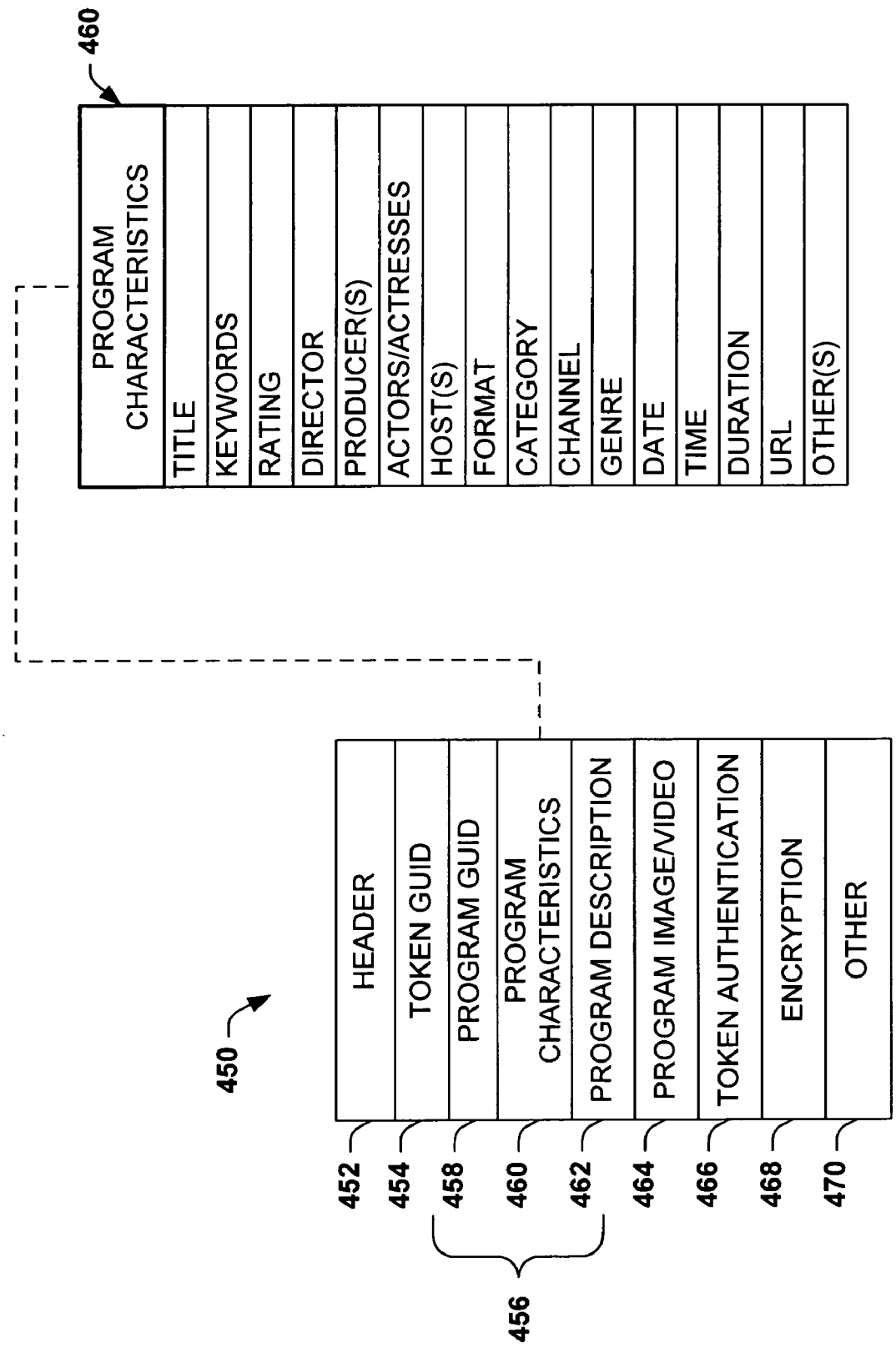
FIG. 8 is an example of a token schema in accordance with the present invention.
Figure 9:
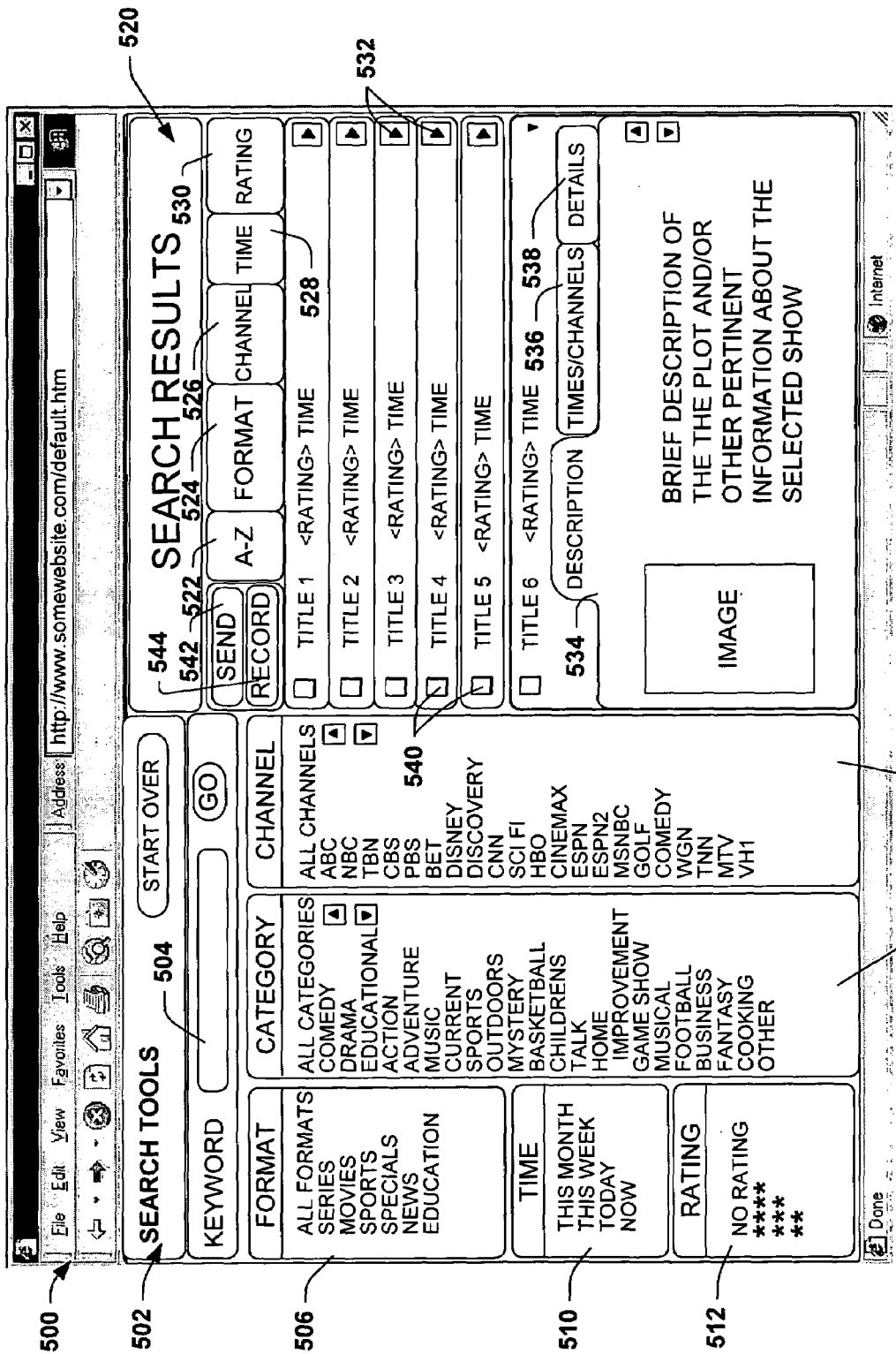
FIG. 9 is an example of a graphical representation of an electronic program guide in accordance with the present invention.
Figure 10:
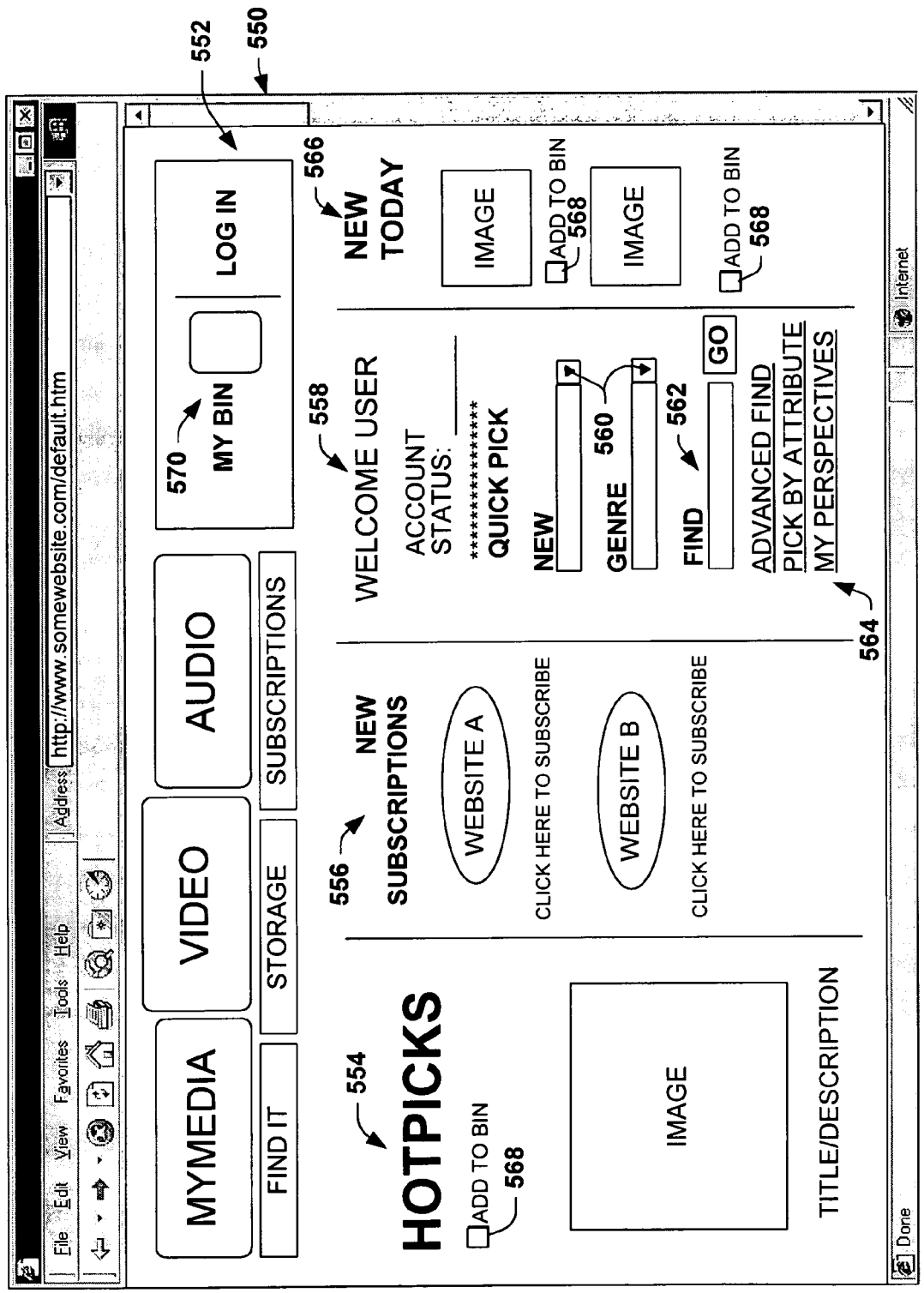
FIG. 10 is an example of a graphical representation of a website that may be employed to select programs in accordance with the present invention.

FIGS. 8–10 are examples of graphical interactive graphical user interfaces, such as may be implemented in connection with one or more websites to help locate programs based on program selection criteria, which may be provided by a user and/or a service provider. The websites, for example, may be accessed from a remote computer or from a client system. A user also may employ the processes and/or interfaces of associated websites to manipulate and/or view a token and its associated information in accordance with an aspect of the present invention. It is to be appreciated that the illustrated graphical representations are for purposes of simplicity of explanation and that any configuration of display and graphical user interface may be implemented in practicing the present invention.

FIG. 8 illustrates an example of a token schema 450 that may be utilized in accordance with an aspect of the present invention. The token schema 450 may be a multi-level data structure that contains a plurality of fields for holding different types of data. Each field also may contain actual data, such as in the form of raw data, an object, a component, a module, etc., or a link to the data associated with the link. By way of example, the schema 450 includes a header 452 that identifies a group of data as a token as well as may define attributes of the token schema and/or the different levels of data.

The token schema 450 may include a globally unique identifier for a token (a "token GUID") 454, which uniquely identifies a respective token obtained from a server 20 (FIG. 1B). A service provider, for example, may employ the token GUID 454, to track a token as it is transmitted from one computer to another as well as to provide a link between a specific token and billing information, such as in situations when a token corresponds to a program that has been purchased or rented from a service provider.

The token schema 450 also includes program criteria 456 for identifying different characteristics of the audio and/or visual program represented by a token. One aspect of the program criteria 456 may be a global unique identifier (GUID) 458 identifying a specific program (hereinafter referred to as a "program GUID"). The program GUID 458, for example, may be a unique program identification number (or series of numbers and other characters) that represents a specific program, such as may be established by a service provider. A program GUID 458 may further include other data that may be employed to uniquely identify a program, either globally or in a local tuning space. The program GUID individually may identify a program with sufficient particularity so that a recording system may be programmed to record the program represented by the token.

The program criteria 456 further may include one or more other program characteristics 460 that may be employed to help identify a program. As illustrated in the example of FIG. 8, the program characteristics 460 may include data identifying different aspects of a program, such as, for example: title, keywords, rating, director, producer(s), actors and/or actresses, host(s), format, category, channel or broadcast network, genre, broadcast date, broadcast time (if known), program duration, a URL link to information (e.g., other program characteristics, a program GUID, local tuning space information, etc.) about the program, and/or any other aspect of a program that could be used to help identify a particular program. It is to be appreciated that each type of program characteristic may not be applicable to all types of programs. Accordingly, a token might not include each type of data element and may further include other agreed upon characteristics.

The token schema 450 further may include program description 462 to provide additional information about a program represented by the token. The description field 462, for example, provides a brief description about the program, such as including its topic or plot, its length, a rating, etc. The description 462 also may form part of the program criteria that may be employed to identify the program. That is, the text of the description 462 may be searched at a server to locate a program based on selection criteria entered by a user. A user may read the text portion of the description 462 so as to make a more informed decision whether to record the corresponding program, such as by invoking (or opening) a corresponding token at a computer displaying the token (see, e.g., FIGS. 5 and 6).

The token schema 450 also includes a program image/video element 464 (e.g., provided in JPEG or MPEG formats) to provide additional information about the program represented by the token. The program image/video element 464 of the schema 450 provides an image and/or an audio/visual clip from the program (e.g., a trailer). For example, a short preview and/or sound effects or a link to such may be provided as part of the token. Biographies of the stars or hosts also may be provided as part of the image element 464 and/or the description element 462. A user may view the image/video associated with a token by invoking the token at the user's computer (see, e.g., FIGS. 5 and 6).

The illustrated example of a token schema 450 also supports a token authentication element 466. The token authentication element 466, for example, may include a password or other authentication data that a PVR may employ to verify that a token is from a trusted source. When appropriate authentication data is included as part of a token, a PVR may automatically accept the token and program the PVR to record the program represented by the token, such as based on the program criteria 460. By way of example, a user may receive an email message at a remote computer having an associated token. If the user desires to record the program represented by the token, the user may forward the token to an email address associated with the user's PVR. When the token is received at the PVR and upon authentication of the message (e.g., based on a user's email address, authentication data, or other authentication techniques), a token programming component running in the PVR may add the program to the program list of the PVR.

The token schema 450 also may include a token encryption element 466, which may include data or other proprietary information for controlling or monitoring operation of a PVR in connection with a token and/or a program represented by the token. By way of example, the encryption element may contain data that enables a PVR to record and/or playback a pay program. The data may contain part of a decryption algorithm for decoding an encrypted broadcast, such as at playback or during recording. The data within the encryption element 468 also may be employed to restrict access to a recorded program to particular times of the day, to limit the number of times that a recorded program may be played, and/or to perform any other monitoring and control functions associated with a particular program. The data within the encryption element 468 may be linked to other data such as the token GUID or a PVR GUID, which may uniquely identify a PVR.

The token schema 450 also may include other elements 470. The other elements 470 may be employed to perform other functions related to the recording or playback of a program and/or related to the sending of a token for a particular program. For example, account information, such as billing, account status, etc. may be implemented within the other element 470. Those skilled in the art will appreciated that part of the other element 470 also may be reserved for future use, such as to accommodate new features.

The token schema 450 may be arranged in an agreed upon format, such as an XML (extensible mark up language) formatted block of data. An example of a schema for a token is illustrated in Table I. It is to be appreciated that, as illustrated in the example of Table I, a token might not include data for each type of element in the token schema 450.

TABLE I

```
<token>
  <token guid>123456abcdef789012<token guid/>
  <program guid>123456789987654321<program guid/>
  <program characteristics>
    <title>title1<title/>
    <format>comedy<format/>
    <actor>bright star<actor/>
    <keyword>word1, word2, word3<keyword/>
  <program characteristics/>
```

TABLE I-continued

```
<token authentication>password12345<token authentication/>
<image>program_image.jpg<image/>
<encryption>2passWORD#%&.001!@^%$4534#%^*0R<encryption/>
<token/>
```

FIG. 9 illustrates a graphical representation of an EPG interface 500 that may be displayed on the remote computer 30 or a client system 40 (FIG. 1B), although the corresponding process may run on the remote computer or as part of a website running on a server 20, 50 to which remote computer is connected (FIG. 1B). The EPG interface 500 provides an interactive EPG 502 that enables a user to select one or more selection criteria to search for programs in which the user may be interested. By way of example, the EPG 502 may include a keyword search tool 504 for receiving one or more keywords (e.g., as part of an Active Server Page ("ASP") request) identifying program characteristics about which a user desires to locate one or more programs. The EPG 502 further may include a plurality of other search tools having a plurality of selectable parameters that may be employed to search for programs meeting selected parameters. In the illustrated example, the additional search tools include a format list 506, a category list 508, a time list 510, a rating selection mechanism 512, and a channel selection list 514. Each list 506–514 may include one or more selectable parameters (or selection criteria) that a user may employ to narrow the search for a program or a type of program.

Search results matching (or substantially matching) the selection criteria are returned to the remote computer and displayed on an associated graphical user interface 520, such as displayed adjacent to the EPG 502 (as shown). It is to be appreciated that the EPG 502 and adjacent interface 520 also could be implemented in association with separate webpages provided to the user. The interactive display provides additional functionality to enable a user to sort through the search results, such as according to one or more characteristics of the programs. For example, action buttons 522–530 may be provided so that a user may organize the search results in a desired format, such as alphabetically, by format, by channel, by time, or by rating, respectively.

Each program in the displayed search results, for example, may include its title (e.g., TITLE 1–TITLE 6) and/or other pertinent information (e.g., ratings, duration, etc.). Additional information also may be associated with each program that a user may access by selecting a corresponding arrow 532 with a user input device (e.g., a mouse). By selecting an arrow 532 of a corresponding program (TITLE 6), for example, one or more pop-up windows 534–538 may be displayed. The pop-up windows may include a window 534 for providing a brief description of the program, a window 536 listing the times and channels when the program is to be broadcast, and a window 538 indicating other related program details.

A selection box 540 also is associated with each program, which a user may select and deselect in order to add and remove programs from an associated storage bin. A storage bin, for example, provides a link between each program selected by a user so that program criteria associated with each program (e.g., a token and other related program information) may be sent to one or more recipients. As mentioned above, a token is a formatted program identifier that identifies a program with sufficient detail so that a recording system may employ the token to record the program represented by the token. In certain circumstances, it further may be necessary to translate a token to obtain program information for a particular local tuning space before a recording system is able to record the corresponding program. As described herein, the translation may occur locally at the recording system and/or at a server. Additional information, such as the information contained in the pop-up windows 534–538, also may be operatively associated with each token.

The program criteria may be sent to a recipient (the user, another individual, a PVR, etc.), such as in response to a user selecting a SEND button 542 or RECORD button 544 displayed on the interface 520. Each of the SEND button 542 and the RECORD button 544 associates or attaches a token for each program that has been selected from returned search results on the interface 520. The SEND button 542, for example, enables a user to send a token(s) for each selected program to an email address (or addresses), such as may be selected by the user from an email distribution list. The RECORD button 544 provides a mechanism to enable the user to program an associated device (e.g., a PVR) to record the audio and/or visual broadcast program identified by each selected token.

Each button 542 and 544 may be associated with an email application or process implemented at a server 20 or 50. Alternatively, the email process alternatively could be implemented locally at the remote computer 30 or the client system 40 (FIG. 1B), such as after the token(s) for each selected program has been downloaded. By way of example, the user may employ the SEND button 542 to send a token(s) for each selected program to one or more email addresses provided. The RECORD button 544 may be selected to cause a token(s) for each selected program to be sent as an email attachment to one or more predetermined email addresses, such as may be associated with the user's (or another person's) PVR. It is to be appreciated that tokens may be provided to the PVR using data transfer mechanisms other than email. The PVR may, in turn, employ each token to add program information based on the token to a program list of the associated PVR (which program information may be based on an appropriate translation of the token). As a result, the PVR will record each program on its corresponding airdate and time.

FIG. 10 is an example of a homepage 550 for a website (e.g., somewebsite.com) that may be employed to provide an interactive graphical user interface to facilitate program selection by a user. The website 550 may be associated with one or more databases that may run on one or more computers, such as the servers 20 and 50 (FIG. 1B).

It is to be appreciated that, in accordance with an aspect of the present invention, one or more servers 20 or 50 may operate as a central clearing house for storing the information necessary for recording audio and/or visual programs. Accordingly, one or more webpage service providers may, in turn, subscribe to and utilize the central clearing house for providing their own users with programming data (e.g., tokens) for programs selected by the user. Appropriate programming data for a user's local tuning space may be obtained for selected programs based on identifying data (e.g., zip code, broadcast service provider(s), etc.) provided by the user.

As discussed above, the identifying data, for example, may be provided when a user logs into a service, such as a website. The identifying data also may accompany a user as the user navigates the Web, such as may be incorporated into a suitable identification scheme.

By way of example, the local tuning space and location information for a PVR may be incorporated into a Microsoft Passport™ service and/or part of a Microsoft Wallet™ service, developed by Microsoft Corporation of Redmond, Wash., or a similar type of service. The Microsoft Passport™ and/or Microsoft Wallet™ services store pertinent user information in association with a login ID and a password provided by the user. Accordingly, participating Passport™ sites may utilize PVR-related data associated with the user (e.g., part of their Passport or Wallet services) to provide a user with local program criteria for each selected program. The user identification information further may be utilized by the central clearing house server and/or sites accessing the central server to collect information, such as demographic data, about each user and the programs selected to be recorded by each user.

Referring back to FIG. 10, the homepage 550 may include a tool bar or panel 552 having a plurality of selectable buttons associated with each page thereof. By way of example, a brief description of each button in the tool bar 552 is contained in TABLE II. In addition to the functionality provided by the tool bar 552, the website homepage 550 may include a listing of one or more hot picks 554 and links 556 to related websites (website A and website B) to which a user may subscribe.

TABLE II

| BUTTON | DESCRIPTION |
| --- | --- |
| MY MEDIA | LINK TO POPULAR PROGRAMMING (SEE FIG. 10C) |
| VIDEO | LINK TO VIDEO RELATED WEBPAGES |
| AUDIO | LINK TO AUDIO RELATED WEBPAGES |
| MY BIN | LINK TO DISPLAY PROGRAMS SELECTED BY THE USER (SEE FIG. 11) |
| LOG IN | LINK TO A LOG IN PAGE |
| FIND IT | LINK TO SEE OTHER SUBSCRIBER'S SELECTIONS (SEE FIG. 10C) |
| STORAGE | LINK TO DISPLAY ITEMS STORED IN A STORAGE BIN (SEE FIG. 11) |
| SUBSCRIPTIONS | LINK TO SUBSCRIPTIONS TO WHICH A USER BELONGS (SEE FIG. 10A) |

The homepage 550 further may include a user-configured section 558 for displaying pertinent account information to a user who is logged in to the website. The user-configured section 558, for example, may include one or more drop down menus 560 for different program subjects, such as new releases and a listing by genre. A keyword searching mechanism 562 also may be located within the user-configured section 558, along with links 564 to additional searching tools. The homepage 550 further may include a listing (or section) 566 for displaying new programs.

Figure 11:
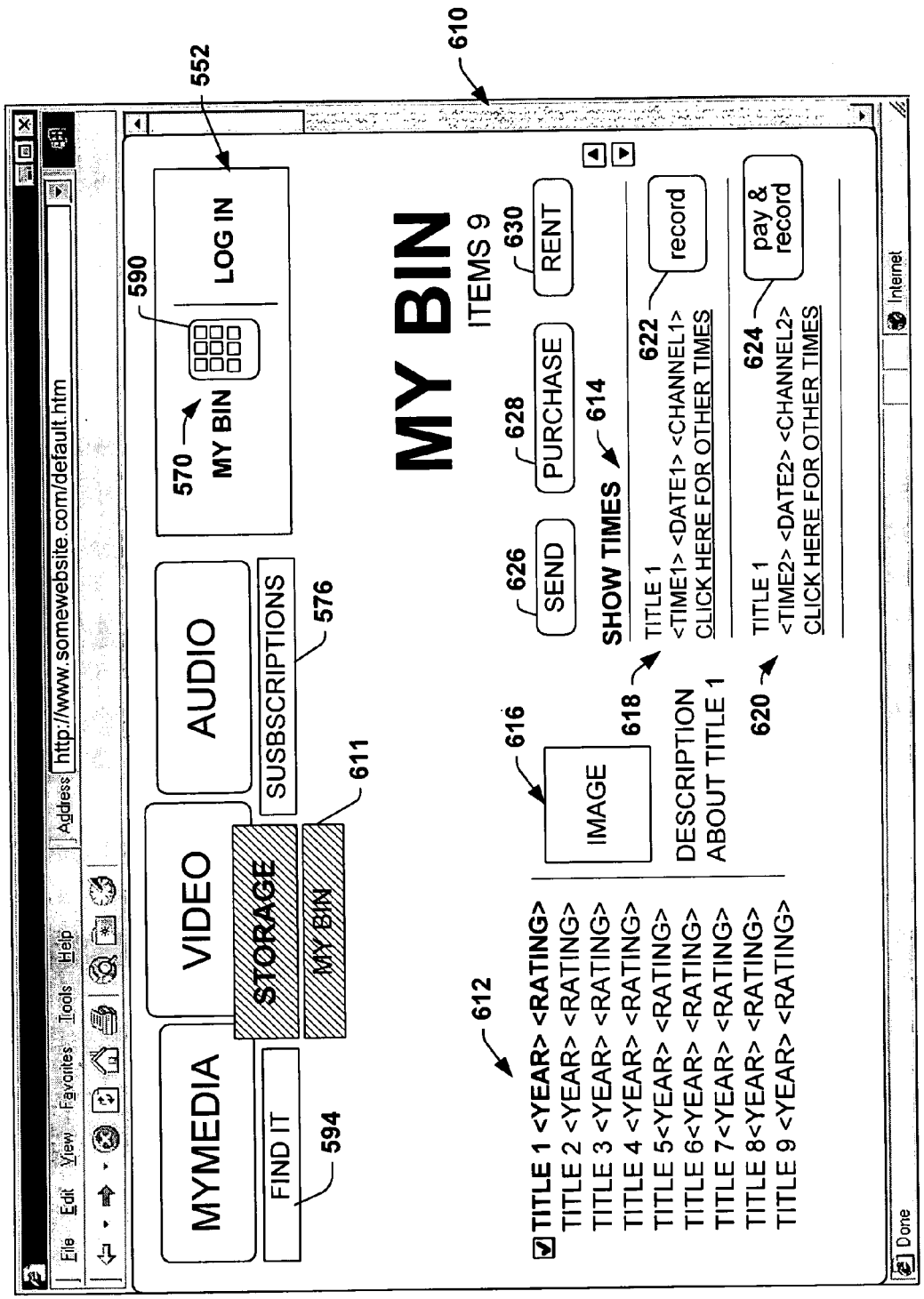
FIG. 11 is a graphical representation of a user bin, such as may be associated with a website, in accordance with the present invention.

Each of the hot picks section 554 and the new selections section 566 includes one or more selectable boxes 568 associated with an identified program. The selectable box 568 may be selected to add a corresponding program to a "MY BIN" storage area associated with the website. When a user selects a MY BIN button 570 of the toolbar 552, for example, the user is provided an interactive graphical display, such as shown in FIG. 11.

Figure 10A:
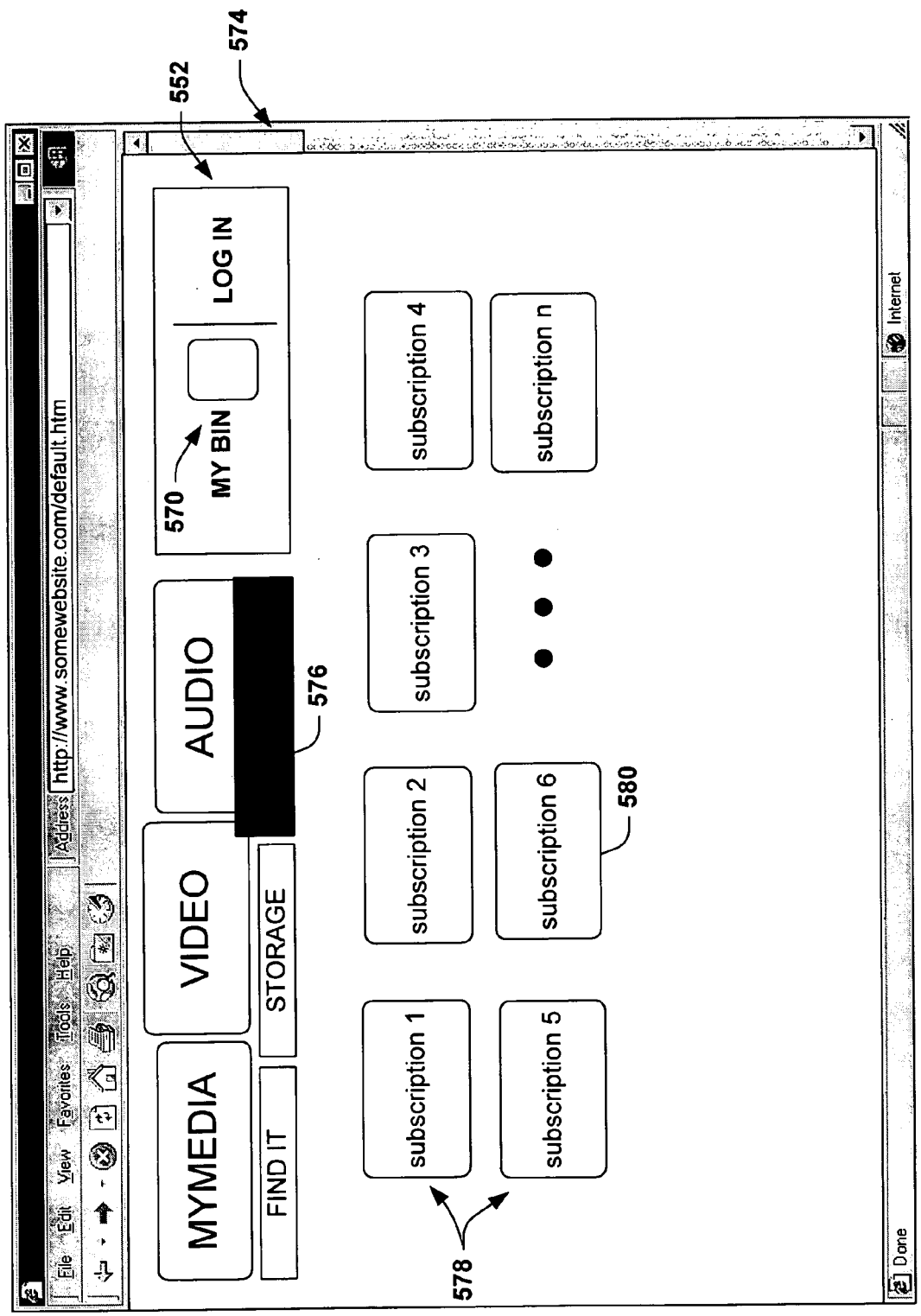
FIG. 10A is another example of a graphical representation of a website that may be employed to select programs in accordance with the present invention.

FIG. 10A illustrates a graphical representation of a subscriptions webpage 574, which may be accessed in response to a user selecting the subscriptions button 576 from the toolbar 552 (FIG. 10). For sake of brevity, identical reference numbers refer to identical components previously described in FIG. 10. The subscriptions webpage 576 contains a list of all subscriptions 578 to which a user belongs. The subscriptions 578, for example, may be links (URLs) to other websites or different pages within the website of FIG. 10 for providing program related information.

Figure 10B:
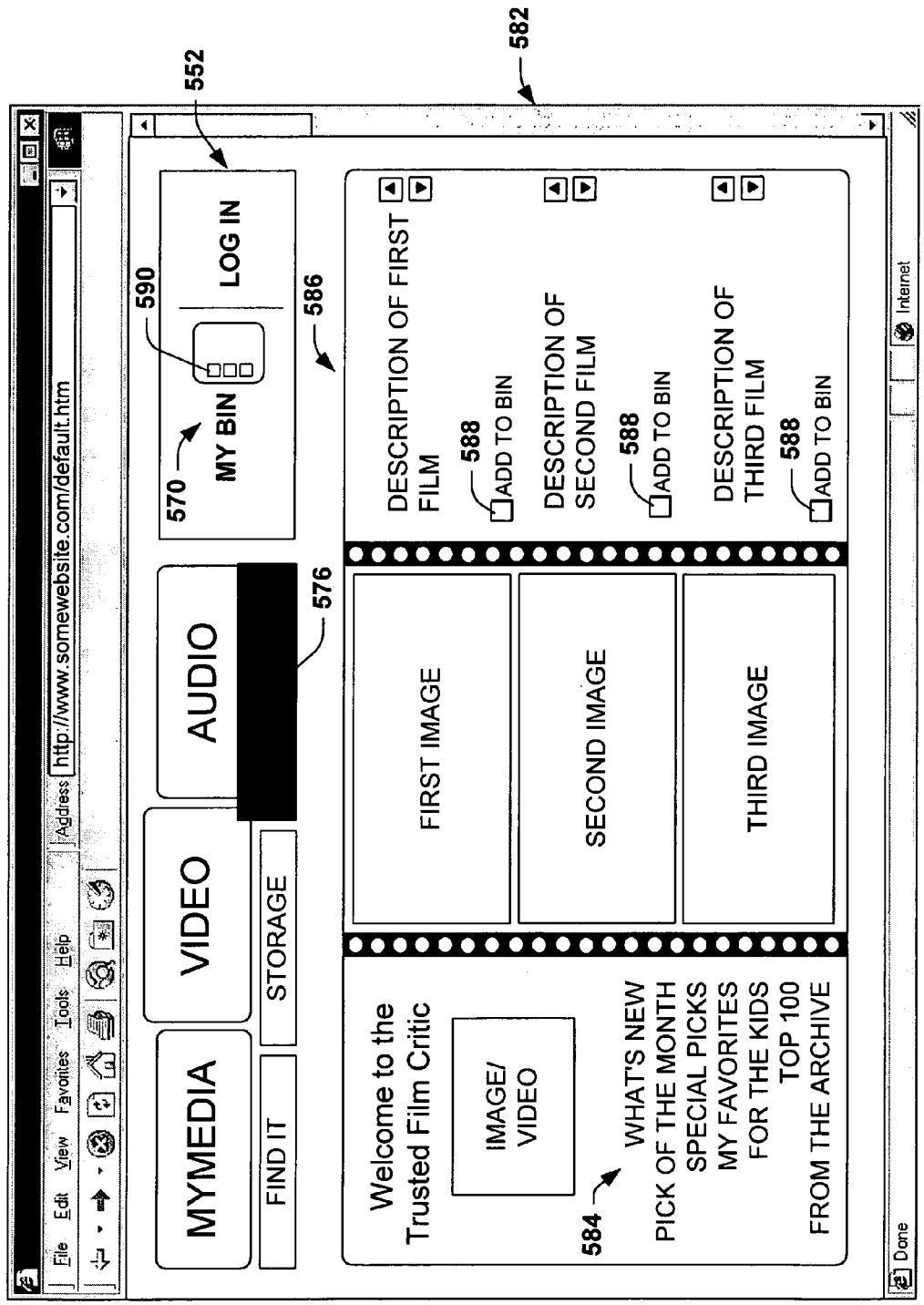
FIG. 10B is another example of a graphical representation of a website that a user may subscribe to for selecting programs in accordance with the present invention.

One subscription ("subscription 6") 580, for example, may provide a link (URL) to a website for a trusted film critic, which may provided within the graphical interface of the website so that the tool bar 552 is displayed. An example of a graphical representation for a subscription website 582 for the Trusted Film Critic is illustrated in FIG. 10B, in which identical reference numbers refer to parts previously identified with respect to FIG. 10A. The subscription website 582 may include links to program selections and program-related information selected by the Trusted Film Critic, which may be a person(s) or an organization. By way of example, the website 582 may include selectable buttons or hypertext links 584 to display: an interactive of list of new programs selected by the critic (WHAT'S NEW); the critic's favorite movie of the month (PICK OF THE MONTH); special programs that are dear to the critic (SPECIAL PICKS); a list of the critic's all time favorite programs (MY FAVORITES); children's programs selected by the critic (FOR THE KIDS); the critic's top 100 rated movies (TOP 100); and a historical list of selected programs (FROM THE ARCHIVE).

An interactive graphical program list 586 of the programs associated with a particular one of the links is displayed on the webpage adjacent to the links. The graphical list 586, for example, may include an image (or audio/visual clip) and brief description associated with each program in the displayed list 586. Each displayed film in the graphical program list 586 also has an associated selectable box 588, which may be selected (and deselected) to add (and remove) the associated program to (and from) the programs contained in the MY BIN 570. The MY BIN button 570 also may include a graphical (and/or audible) indicator 590 to indicate the number of selected programs that are in a user's storage bin.

Figure 10C:
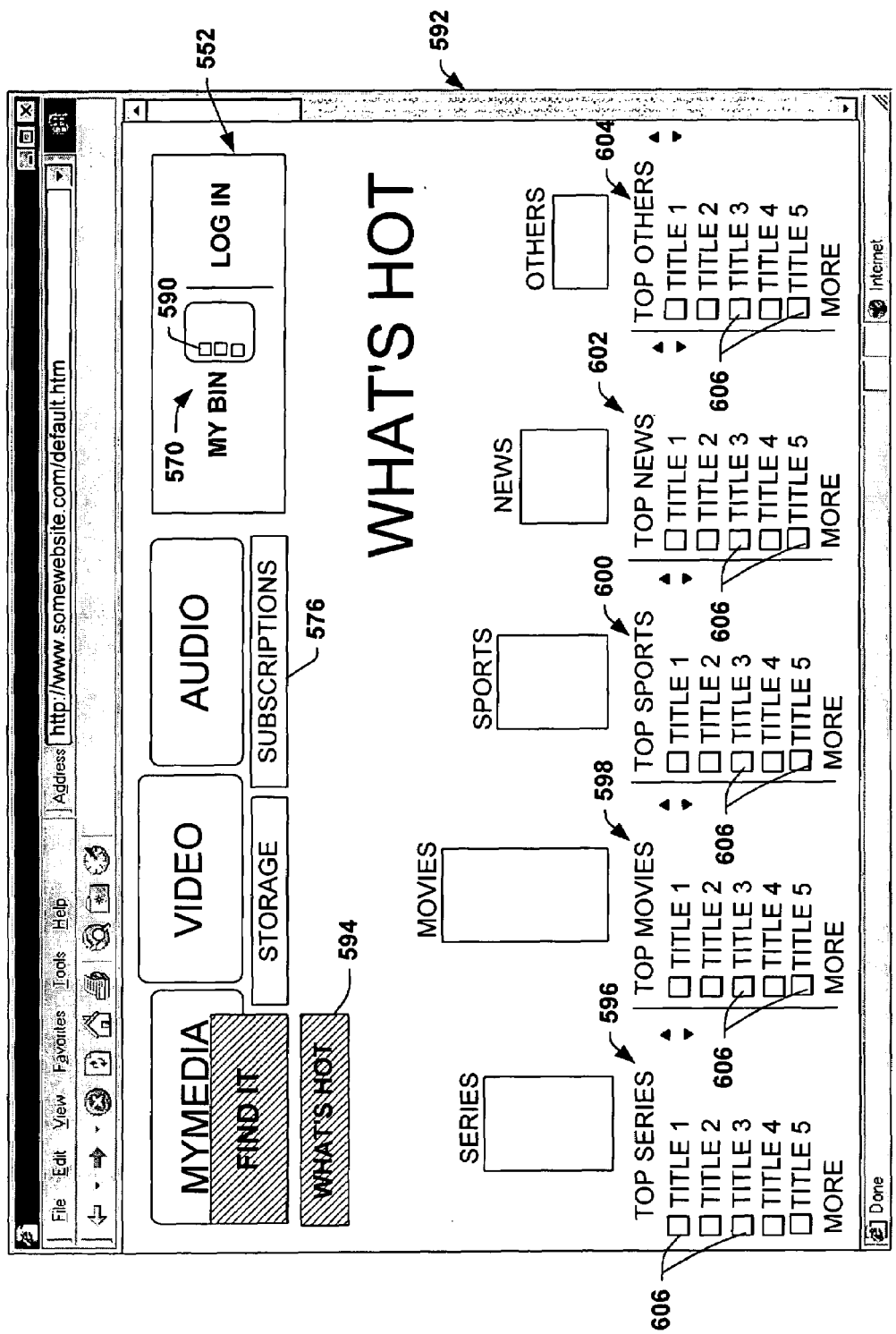
FIG. 10C is yet another example of a graphical representation of a website that may be employed to select programs in accordance with the present invention.

FIG. 10C illustrates a graphical representation of a WHAT'S HOT webpage 592, in which identical reference numbers refer to corresponding components previously identified with respect to FIG. 10B. The WHAT'S HOT webpage 592 may be accessed in response to a user selecting the FIND IT, WHAT'S HOT button 594 from the toolbar 552 (e.g., FIG. 10), The WHAT'S HOT webpage 592, for example, identifies the most recorded programs arranged by program categories, which may include may include series, movies, sports, news, and an others category. Each category may include a corresponding list of programs 596, 598, 600, 602, 604, with the programs in each list being arranged in order of popularity. The popularity, for example, may be based on the number users requesting tokens or the number of users recording a particular program. The number of users recording a program may be determined by a server computer, such as by compiling each token translation request or in response to program information obtained from each recording system.

Each program listed has an associated selectable box 606, which may be selected (and deselected) by a user to add (and remove) the corresponding program to (and from) the programs contained in the MY BIN 570. Accordingly, the WHAT'S HOT webpage 592 provides a useful tool that enables a user to select the most popular programs. The user may then send and/or receive tokens (together with other related information) for each selected program. For example, the user may select the user's MY BIN button 570 and then send a message having a token(s) for each selected program to an email address of a recipient(s), such as disclosed with respect to FIG. 11.

FIG. 11 illustrates an example of a webpage 610 for a user's storage bin in which identical reference numbers refer to corresponding components previously identified with respect to FIG. 10C. The storage bin webpage 610 may be accessed, for example, in response to a user selecting a storage button 611 or by selecting the MY BIN button 570. The webpage 610 includes a selectable list 612 for each program that has been selected by the user, which may include the title and other program related information. The webpage 610 also may include a list of show times 614 and other information 616 (an image, video, description, etc.) for each program (TITLE 1) that has been selected from the list 612. For example, one or more program listings 618 and 620 may be provided within the show times list 614 for the selected program (TITLE 1). Each program listing 618, 620 may identify the time, date and channel that the selected program (TITLE 1) is to broadcast within a given window of time. Each listing 618, 620 also may have an associated action button 622, 624, which a user may employ to record the corresponding program. In the illustrated example, the button 622 corresponds to a pay version of the program and the action button 624 corresponds to a "free" version ("free" meaning there is no additional charge provided that the user receives the associated channel). The pay version, for example, may have an earlier broadcast date and time than the "free" version.

The storage bin webpage 610 also may include a SEND button 626, a PURCHASE button 628, and a RENT button 630. Each button may be selected by a user (with an appropriate user input device) to initiate the function associated with each button. By way of example, the SEND button 626 may be employed to send a recipient a token(s) for each program selected by a user. The recipient may be identified by the user (e.g., by email address), such as described above with respect to FIG. 9. Briefly stated, when the SEND button 626 is activated, a function or method associates or attaches to an email message a token for each selected program. The user may send the message to one or more individuals, such as to an email address provided by the user or a predetermined email address stored at the server.

The PURCHASE button 628 provides a mechanism to enable the user to record a pay program in a format that, for example, permits substantially unlimited viewing of the recorded at an identified PVR that recorded the program. In contrast, if a user may only desire to watch a pay program a limited number of times (typically for a smaller fee), the user may select the RENT button 630. The RENT button 630, for example, enables a recording system to record a selected program in a format that only permits limited playback of the recorded program, such as over a predetermined time period or for predetermined number of playbacks.

Similar to the SEND button 626, activation of each of the PURCHASE button 628 or the RENT button 630 may result in a token for each selected program being sent to a recipient. The token is sent, for example, as an attachment to or embedded in an email message. The message is addressed to the email address of the recipient, which may be an email address of a PVR or another address(es) selected by the user and/or a service provider. As mentioned above, a token may include encryption/decryption data, such as for a pay program, and/or other authentication data to permit and control the recording and playback of a corresponding program.

While the send, record, and purchase buttons 626, 628, and 630 have been described as triggering mechanisms for sending tokens to a client system, it is to be appreciated that a client system may receive tokens by other data communication mechanisms. For example, activation of the buttons may result in program data assigned to one or more recipients being stored at a remote computer (e.g., server 20) for each selected program. A client system to which the program data is assigned may, in turn, connect to (directly or indirectly) the server 20 to receive (download) tokens corresponding to the data for the selected programs. Alternatively, tokens corresponding to the stored program data may be periodically sent by the server to each assigned client system, such as in email messages, by a direct connection (e.g., a modem) to the client system, or any other data communication mechanism.

It is to be appreciated that information and functionality of the user interfaces associated with FIGS. 9–11 are for purpose of illustration and that any format and configuration may be employed by to provide a selectable resource for programs in accordance with an aspect of the present invention. Moreover, it is to be appreciated that one or more service providers may provide websites similar to the illustrated examples. Some or all of such service providers may utilize a common central clearing house, in accordance with an aspect of the present invention, that stores the programming data, although some may employ their own databases.

Figure 12:
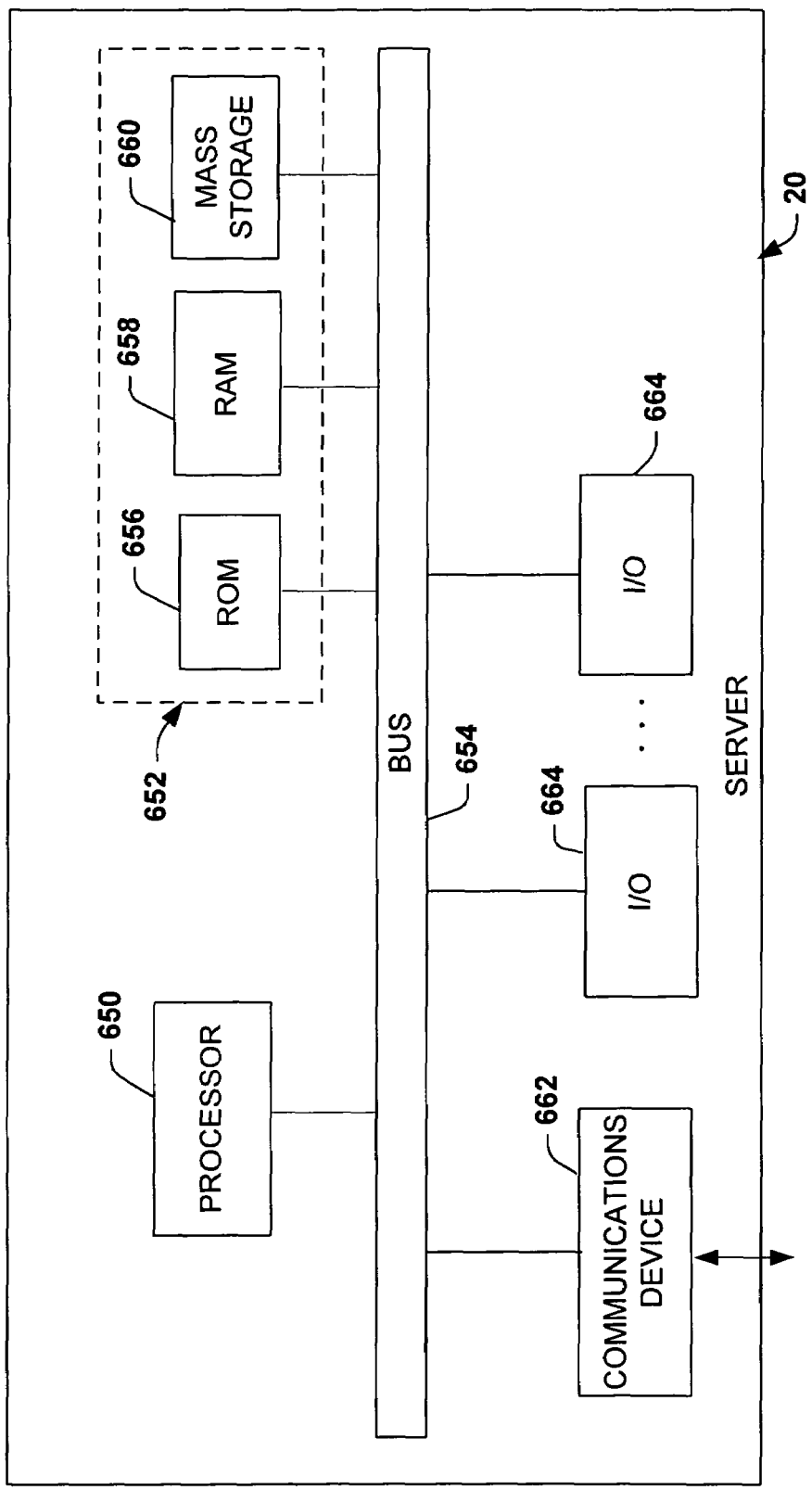
FIG. 12 is a block diagram of a server system in accordance with the present invention.

FIG. 12 is block diagram of a remote server architecture, such as the server 20 shown in FIG. 1B. It is to be understood and appreciated that the illustrated architecture is one possible architecture; a server 20 is not restricted to such architecture for purposes of practicing the present invention. The server 20 includes a processor 650 and memory 652 operatively coupled to a system bus 654. The bus 654 may represent multiple physical buses connected by various bridges and/or adapters, the details of which are not required for an understanding of the present invention. The memory 652 includes ROM 656, RAM 658, and a mass storage facility 660, each of which may be coupled to the bus 654 via a suitable interface (not shown). The ROM 656 may include programmable and/or programmable-erasable storage. The mass storage facility 660 may include a magnetic, optical, magneto-optical, or other equivalent mass storage medium.

The server 20 also includes a communication device 662 and various input/output (I/O) facilities 664, which also may communicate over the bus 654. The I/O facilities 664 may include an interface for a monitor, a keyboard, a pointing device, and/or other similar devices. The communication device 662 may be a conventional telephone (POTS) modem, an ISDN adapter, or any other suitable data communication device (wired or wireless). The communication device 662 may be used to communicate data between the server 20 and another computer (e.g., the server 50, remote computer 30, or client system 40 of FIG. 1B), such as to receive input requests for program information and/or updates for the information stored in memory 652. It will be recognized that functions described herein as being performed by the server 20 may result from the processor 650 of the server executing software instructions, from operation of hardwired circuitry, or combination of both.

While, for purpose of brevity, the server 20 is illustrated as a single device, it is to be appreciated that it may actually comprise multiple devices connected in a distributed architecture. In distributed system, the communication device 662 (or another I/O facility 664) may be used to communicate data between the server 20 and other physical devices used to implement server functionality. The server 20 may also include a network interface or other similar device for communicating with other physical devices that provide desired server functions. The server system 20 may, in accordance with an aspect of the present invention, be programmed and/or configured to implement a variety of selectable processes with respect to the program criteria stored in the memory 652.

Figure 13:
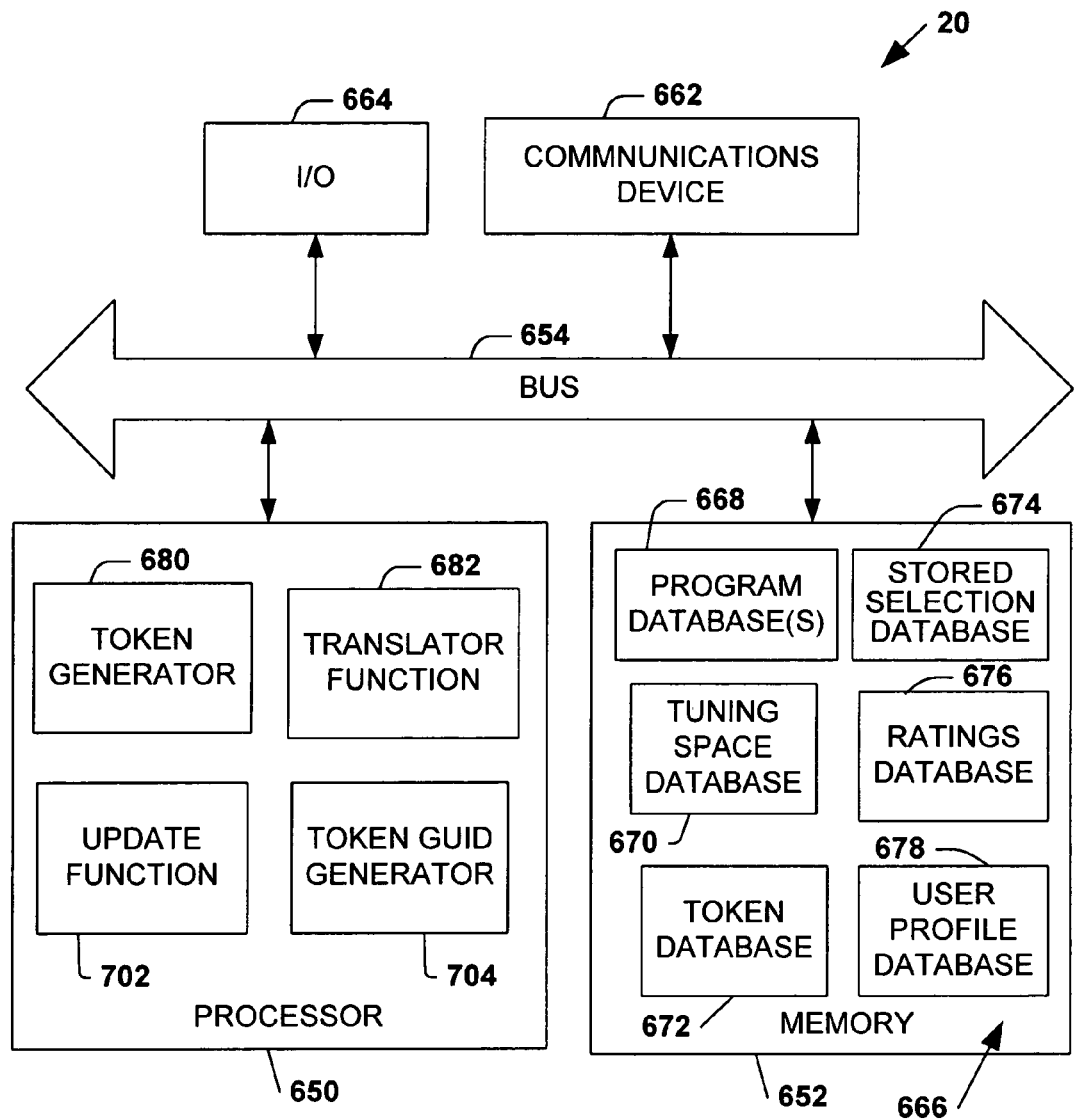
FIG. 13 is a functional block representation of parts of the server system of FIG. 12 in accordance with the present invention.

With reference to FIG. 13, the server memory 652 (e.g., ROM 656, RAM 658 and/or mass storage 660) contains a data structure 666 for storing program criteria representing a plurality of audio and/or visual programs and other related information. The data structure 666 may be organized as one or more relational databases, object-oriented databases, and/or object-relational databases, although other types of databases also may be implemented at a server, in accordance with the present invention, to store and access program data and related information. For example, a commercially available database engine may be employed in conjunction with a computer software database program to facilitate storage and access of program and system related data.

The data structure 666 may include one or more program databases 668 that include program information identifying various aspects of a plurality of audio and/or visual programs. The program criteria associated with the program database 668 may include the program GUID (e.g., a unique program identification number) and/or other descriptive information indicative of program characteristics for a corresponding program. The other information may include, for example, title, actors, directors, producer, category, genre, ratings, keywords, relevant web links, a brief description of the program, an image or video clip for the program, etc. The program GUID and/or other related program information for a specific program may be utilized, in accordance with an aspect of the present invention, to form a token for the respective program.

As set forth in greater detail below, the data structure 666 also may include a tuning space database 670, a token database 672, a stored selection database 674, a ratings database 676, and a user profile database 678. Those skilled in the art will understand and appreciate that other databases (alternatively or additionally) may be used to store and access pertinent information at the server 20.

By way of example, the processor 650 may run a token generator 680, which may be an application, function, or method, for accessing the program database 668 and providing a program GUID according to selection criteria. The server 20 may receive selection criteria, for example, based on a query entered remotely by a user, such as at a client system 40 or remote computer 30 (FIG. 1B). Remotely entered selection criteria may be received at the server 20 via the communications device 662 or via a user input device coupled to one of its I/O devices 664. Such selection criteria may originate, for example, at a remote computer or from another remote server, such as may be associated with a particular website. The selection criteria also may be internally stored and accessed at the server 20, such as may be associated with program characteristics of a service provider (e.g., the Trusted Film Critic Website of FIG. 10B). The selection criteria may be stored as part of a preprogrammed user profile (e.g., stored in the user profile database 678) or stored in response to selection criteria that did not yield satisfactory results (e.g., stored in the stored selection criteria database 674).

The selection criteria, for example, describes details concerning an audio and/or visual program about which a user may desire additional information and/or wish to record. The selection criteria may indicate any of a variety of characteristics about a program, such as title, descriptive aspects of the program, actors, release date, episode, producer, category, genre, rating information, etc. The server 20 may process the criteria as a query from a search engine, program criteria from a remote EPG system, or any other type of request. The selection criteria may be packaged and sent to the server following a predetermined schema (e.g., as part of an ASP page request) having agreed upon elements and attributes for identifying the program characteristics. Additionally or alternatively, keywords, or natural language searching capabilities may be employed at the server 20 to search for program content based on selection criteria.

The token generator 680 employs the selection criteria to search the program database 668 and determine whether one or more audio and/or visual programs contained in the program database (or other parts of the memory 652) match the criteria. The token generator 680 returns a token, which may include a unique program GUID, for each program substantially matching the selection criteria. By way of example, the token generator 680 may select a program GUID from the program database 668 for each program exactly matching the selection criteria. Additionally, the token generator 680 may select program GUIDs for relatively close matches, such as based on a statistical evaluation of available programs as compared to the selection criteria. The server 20 may present search results to the user in the form of a token(s), such as through the communications device 662 or an input device associated with an I/O facility 664. The user may, in turn, select one or more tokens, as desired. Each token further may include or have associated attributes (or elements), which characterize details concerning the program, such as in the form of a description of the program, image(s), audio, etc. Any number of program GUIDs may be obtained from the server 20 based on the selection criteria.

When no program(s) matches the selection criteria, the selection criteria and information identifying the user making the request may be stored in an associated database, such as the stored selection database 674. The storing of selection criteria may be implemented automatically or at the request of the user. The stored selection database 674 may store pertinent selection criteria in association with information identifying the user or the computer of the user (e.g., an email address or other information identifying the user's PVR) who implemented the request. As a result, a notification and/or one or more tokens (e.g., containing a program GUID(s) or other program characteristics) corresponding to the selection criteria may subsequently be provided to the user, such as via email or other data communication mechanisms. The notification or subsequent sending of a token, for example, may be triggered in response to the program criteria being updated at the server 20 to include one or more programs better matching the stored selection criteria.

The server 20 also may include a translation function 682 for translating or converting a token into program instructions that identify a specific program as it is broadcast in a particular local tuning space (or headend). The translation function 682, for example, interfaces with each of the program database 668 and the tuning space database 670 to provide localized program information in a particular tuning space. The translation function 682 provides a mechanism that enables a recording system to be programmed to record a specific broadcast program identified by a token or program GUID for a particular tuning space in which the recording system is situated for receiving the broadcast. The translation function 682 may be programmed to, based on a token and/or program GUID, query the program database 668 and the tuning space database 670. The translation function 682 may also add, extract, and provide specific tuning information, such as the local time, frequency or satellite transponder on which a corresponding program will be broadcast.

Each tuning space, for example, has a unique channel line-up for all networks and service providers that broadcast in its tuning space. A tuning space, for example, may include cable, satellite (analog or digital), traditional television broadcast (UHF, VHF), traditional radio broadcast (AM radio, FM radio), HDTV, audio and/or video streaming, etc. A client system may be operative to receive audio and/or visual programs via one or more such tuning spaces, as is known in the art.

Figure 14:
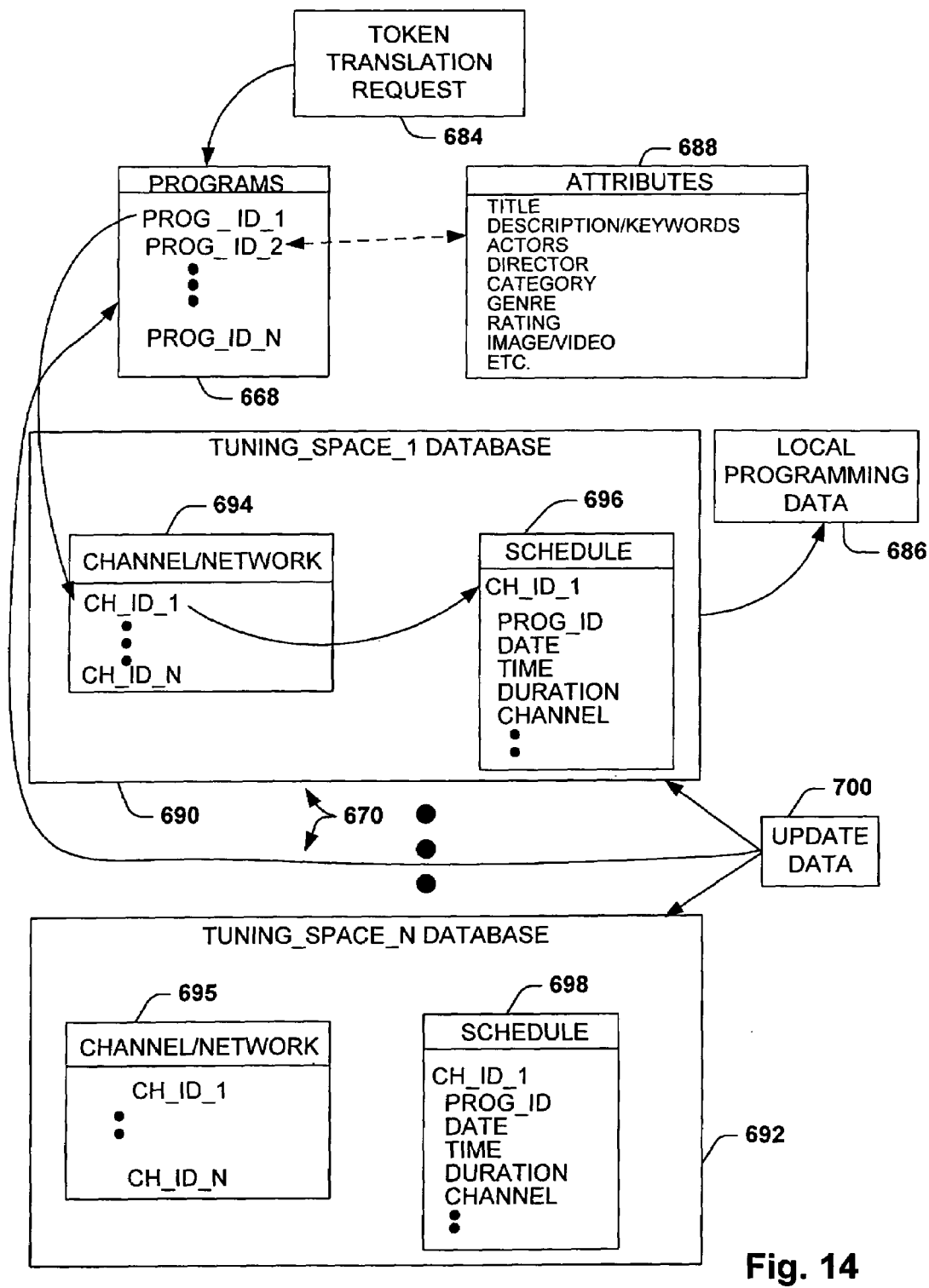
FIG. 14 is a functional example of a data structure that may be implemented at a server system for storing programming information in accordance with the present invention.

FIG. 14 illustrates a functional example of implementing a token translation request 684 (e.g., implemented by the translation function 682) within a database system formed of the program database 668 and tuning space database 670. The token translation function 682 returns local programming data 686 in response to the translation request 684. The translation request 684, for example, includes information sufficient to identify the PVR that is utilizing the local programming data. The local programming data 686, for example, includes data (which may be a token) identifying the date, time, duration, and channel that a specific program is to be broadcast in a particular tuning space. The translation request 684, for example, may be implemented in response to a request to record a program and/or a more general inquiry concerning local program specifics, such as the date, time, duration, and channel associated with a particular program in a particular tuning space. Once the translation function 682 accesses the local programming information for a program (or program segments) identified in the translation request 684, the local programming data 686 is provided in a useable format. The programming data 686 may be provided to recording system directly (via email or a direct connection) and/or to another remote device (e.g., remote computer 30 of FIG. 1B), which initiated the translation request 684.

The token translation function 682 employs the translation request 384 by locating a corresponding unique program ID in the program database(s) 668 for the audio and/or visual program represented by the request. Each program ID in the program database 668 may include (or be linked to) an associated database of one or more attributes 688 that provide information about each respective program. As mentioned above, the attributes 688 may include: a program GUID for the program; the title of the program; a brief description about the program; keywords associated with the program; a list of the actors and/or actresses; the director; information identifying the category of the program; the genre of the program; a rating for the program (e.g., a popularity rating and/or a classification rating); etc. The attributes 688 also may include an image, a video clip, a URL for a related website(s), and other data or objects that may provide useful information about the program represented by a program ID. The attributes and other associated program information 688 also may be returned with the local programming data 686 so that a user may obtain additional information about the program, if desired.

The translation request 684 and corresponding program ID are employed to locate an appropriate local tuning space and other local programming data so as to enable a recording system to be programmed to record the program represented by the request. In the example illustrated in FIG. 14, each tuning space includes a separate tuning space database 690, 692. Each tuning space database 690, 692 further includes a channel/network database 694, 695 and a schedule database 696, 698, respectively. Each channel/network database 694, 695 provides a channel line-up for the respective tuning space. Each schedule database 696, 698 stores the programming specifics for each program ID on each channel in the tuning space. For example, each schedule database 696, 698 may include elements or attributes identifying each program as it is broadcast in the corresponding tuning space, such as including its program ID, channel ID, date, time, duration, and channel.

It is to be appreciated that each of the time and duration fields may correspond to another database or list identifying the time and/or duration for each program segment associated with some or all programs. As set forth in greater detail below, a time list and duration list may be employed to selectively combine program segments to form a composite program, which may be an aggregation of different programs segments arranged in a selected order. A broadcast network may globally determine which particular program segments to combine for a particular program or, alternatively, a translation request 684 may contain an individual reference (e.g., a token) identifying each program segment and the order in which they are to be combined. For example, the composite program may include a combination of a network program segments and commercials customized for an individual user or a group of users in a particular tuning space.

In order to determine which tuning space database to access, additional information identifying a user and/or a local tuning space(s) associated therewith may be provided to the server 20. For example, a PVR GUID associated with a recording system may be submitted to the server 20 and incorporated into the translation request 684. A PVR GUID uniquely identifies each PVR, such as may be registered with the server 20 and stored in a user profile database 678. The translation function 682 may employ the PVR GUID to search the user profile database(s) 678 (FIG. 13) to locate an appropriate tuning space database associated with a PVR so that corresponding local programming data 686 may be provided for each translation request 684.

While, for sake of brevity, two tuning space databases 690 and 692 are illustrated in FIG. 14, it is to be understood and appreciated that a corresponding database may be provided for each tuning space in which audio and/or visual programs may be broadcast. Those skilled in the art will understand and appreciate that other mechanisms may be employed to associate one or more local tuning spaces with each program GUID (or other programming information) so as to enable recording of a corresponding program in a proper tuning space. All such mechanisms are considered to be the within the scope of the present invention.

Data in each database 668, 690, 692 may receive update data 700 as needed. Referring between FIGS. 13 and 14, the processor 650 may include an update function or method 702 responsive to updates or modifications in the program database 668 and/or the tuning space databases 690–692. The update function 702 receives updated program information, such as from another computer via the communications device 662 or via an input device through one of its I/O facilities 664. The update information may add to, modify, or replace existing program characteristics of the program database 668. Alternatively, part or the entire program database 668 may be replaced with an updated version of the database. Occasionally, a regularly scheduled program may be interrupted or its broadcast delayed, such as due to a presidential speech or a broadcast event running longer than originally expected. The update function 702 thus may employ update data 700 to accommodate such changes in program scheduling and/or to add to the appropriate tuning space databases 690 and 692 new and/or modified program characteristics that are being scheduled for broadcast.

The update function 702 also may be employed to notify one or more users (e.g., by a text email message) that program criteria for one or more programs have been updated. The update function 702 further may provide an updated version of local programming data for some or all tokens that were previously translated from the server. For example, each time an update is received at the server 20, the update function 702 may determine whether the update has modified any characteristics of tokens that were previously sent. The update function may then send (via email) a notification and/or an updated token to each recipient requiring an update. A modification or update may, for example, correspond to a change in program criteria, such as the time, date, channel, etc. at which a particular program is to be broadcast. By notifying an individual of the change, the individual may make an informed decision concerning whether to record the program. Alternatively, the updated tokens may be sent directly to the recording system at each client system to automatically accommodate any programming changes, such as based on an address stored in the user profile database and/or token database.

The update function 702 also may determine whether the update includes any new tokens and whether the new program criteria corresponds to any selection criteria in the stored selection database 674. As mentioned above, selection criteria may be stored in the stored selection database 674 if a search is unable to locate a program based on the selection criteria. If the new program criteria corresponds to stored selection criteria, a notification or corresponding token(s) may be sent to each individual that requested an update or, alternatively, the notification may automatically be sent to each individual for which corresponding selection criteria was stored in the stored selection database 674.

As mentioned above, the server 20 may include a user profile database 678 for storing information about a user and/or a recording system (e.g., a PVR) associated with the user. The user may register the PVR with the server 20. As part of a system registration procedure, for example, a user may connect to the server 20 (via a website or other connection) and provide information about the user's client system, such as location (address, zip code, etc.), the headend(s) that provides program content to the client system, and information about the client system (type of system, model number, etc.). The user profile database 678, for example, may include a PVR GUID and data identifying the tuning space(s) for each user/recording system. The user profile database 678 enables the server applications and functions to determine sufficient details about the local tuning space(s) for each client system and, in turn, disseminate appropriate local programming data 686 for each translation request 684.

Each time a token is translated, pertinent information also may be collected and stored at the server 20, such as part of the ratings database 676. The ratings database 676, for example, may store information about the viewership of each program, about the viewing history of each individual or recording system, the viewing history within a local tuning space, etc. The server 20 may compile and evaluate information stored in the ratings database 676 to provide a better understanding about a viewing audience and/or popularity of a particular program.

Because a token typically is translated for a program prior to the program being broadcast, valuable information may be collected in advance of the program being broadcast. The server 20, for example, may employ predictive filtering techniques to estimate the size and/or demographics of a viewing audience for a particular show prior to the broadcast time of the show based on the data stored in the ratings database 676. As a result, advertisers and networks may better determine which advertising to utilize in connection with a particular program. As more is known about the size and demographics of an audience for a particular program, more accurate rates also may be charged for such advertising broadcast with each program.

Broadcasters and/or advertisers also may select demographically pertinent advertisements (broadcast as program segments) according to a stored profile of users that request tokens and/or token translations for a specific program. The advertisements may be implemented by providing local program data 686 for a program that includes time, date, and channel data for program segments corresponding to the program segments requested by a user and to program segments corresponding to advertisements selected by the network or advertisers. The process of combining program segments may be implemented at the server 20 in conjunction with the local programming data 686 and used to create a composite program. Part of (or the entire) process also may be implemented locally at a recording system by dynamically combining program segments in a preselected manner during playback.

The user profile database 678 also may be employed to track program selections and/or token translation requests associated with each client system (or user thereof), such as based on a PVR GUID, as described above. The user profile database 678, for example, may correlate token-related information of the database (token requests, translation requests, etc.) with user-provided information associated with a particular PVR. The user-provided information, for example, may include general information about the user, such as: the location (address) of the PVR; the user's occupation, hobbies and other interests; programming likes and dislikes; etc. Such user information, for example, may be collected during a previous registration online, such as when a user registers a system on the server 20 or from other service providers, or offline (such as by telephone or mailing a corresponding product registration form). Once registered, the server 20 may track program selection criteria, tokens and other program-related information requested or obtained by the user of a particular PVR.

Advertising may, in turn, be customized for each PVR (or a group of PVRs) based on the program selections stored in the user profile database 678 and other information that may have been gathered about each user and/or associated with each PVR GUID. As advertisements become more interesting or incentives are provided for watching commercials, there is less motivation for a user to skip commercials between program segments. For example, an incentive may be in the form of providing commercials for products of services in which a user has expressed interest. The incentives also may be in the form of a reward, such as redeemable (online or offline) coupons, a reduction in a monthly service fee associated with the user's entertainment system in exchange for watching a certain amount of commercials, or other compensation for feedback provided by a user (e.g., via email) in response to watching a commercial or infomercial for a particular product or service. Additionally or alternatively, incentives may be provided to a user that permits a server to track programs (e.g., advertisements and other shows) watched and listened to at the user's client system. A database of customized commercials also may be stored at each user's client system, which commercials are selected based on the user profile associated with the user's client system and dynamically inserted between program segments in a predefined manner. Those skilled in the art will appreciate other arrangements that may, in accordance with the present invention, be employed to entice an individual to watch commercials on free (or discounted) programming channels.

Program information from the ratings database 676 also may be compiled and shared with users in a format to facilitate user selection of programs, such as part of WHAT'S HOT webpage (FIG. 10C). The server 20 may collect and store program information (e.g., in the program database 668 and/or the ratings database 676) that tracks each token translation so as to provide an indication of shows being recorded. Alternatively or additionally, each request for a token or program GUID may be stored in the token database 672 to provide more generalized information about the popularity of programs about which one or more viewers may be interested, such as based on a user obtaining a token for a particular program. The information, for example, may be compiled into a format to highlight popular shows, such as based on the number of persons requesting tokens and/or translating a particular token into programming instructions for its corresponding tuning space. The token-related information may be made accessible at a website associated with the server 20. A user may browse through a visual representation of the database at a website displaying the popular program selections from which the user may obtain one or more tokens for selected programs.

The server 20 also may employ collaborative filtering techniques to highlight shows that may be of interest to one or more users. A user, for example, may subscribe to an email list for receiving tokens for programs meeting criteria identified in connection with an email list to which the user subscribed. An email message may be provided to selected users (from a server or another computer), which message includes one or more tokens identifying popular shows and/or shows meeting selection criteria associated with a particular list to which the user belongs. A user also may create a customized filter at a server (e.g., server 20 or 50 of FIG. 1B) or at their client system to sort through available programs and, in turn, provide tokens meeting selection criteria specified by the user. The tokens, for example, may be sent to subscribers as attachments to (or objects embedded in) email messages.

The processor 650 also may include a token GUID generator 704 that generates a token GUID for each token sent by or obtained from the server 20. A token GUID uniquely identifies each respective token obtained from the server 20. The token GUID generator 704 may store a token GUID in the token database 672 for each token, such as in response to a request for a token and/or when a token is translated. Other information may be linked or associated with the stored token GUID, such as information about individual (e.g., a PVR GUID) that requested the token or token translation. The token GUID further may be tracked each time a corresponding token is sent from one computer to another computer, such as to provide an indication as to how many recipients are sent the token. This information further may be linked with the ratings database 676 to further provide an indication of the popularity of a particular program. Additionally, a token GUID may be employed to provide a link between a specific token and billing information, such as in situations when the token corresponds to a paid-for broadcast program. The token GUID also may be utilized as a public key for an encrypted broadcast transmission. Those skilled in the art will understand and appreciate other uses for which a unique ID associated with each token may be implemented, all of which are contemplated as falling within the scope of the present invention.

Figure 15:
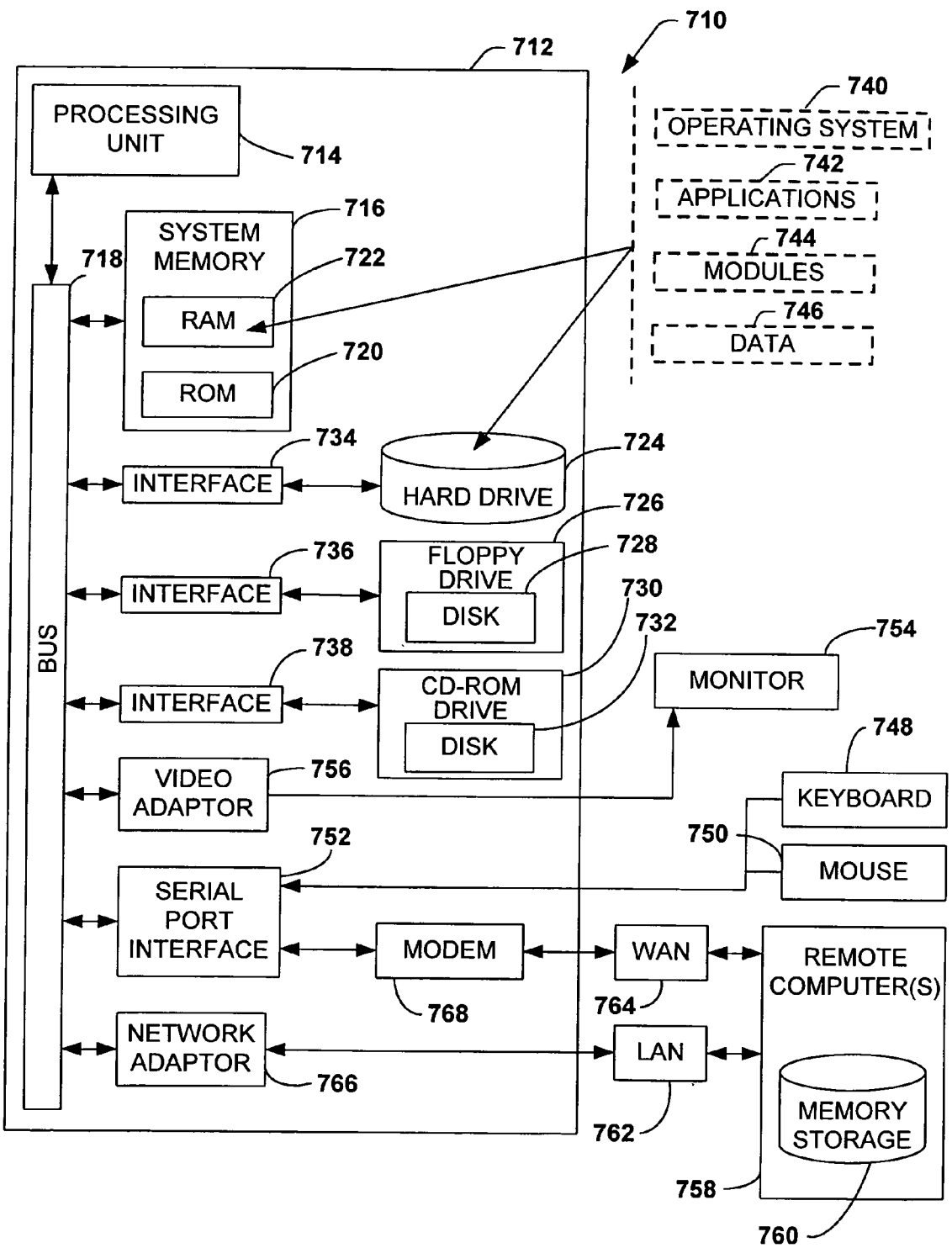
FIG. 15 is a block diagram of an exemplary operating environment for a system configured in accordance with the present invention.

In order to provide additional context for various aspects of the present invention, FIG. 15 and the following discussion are intended to provide a brief, general description of a suitable computing environment 710 in which the various aspects of the present invention may be implemented. While the invention has been described above in the general context of computer-executable instructions that may run on one or more computers, those skilled in the art will recognize that the invention also may be implemented in combination with other program modules and/or as a combination of hardware and software. Generally, program modules include routines, programs, components, data structures, etc. that perform particular tasks or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. In a distributed computing environment, program modules may be located in both local and remote memory storage devices.

With reference to FIG. 15, an exemplary environment 710 for implementing various aspects of the invention includes a computer 712, including a processing unit 714, a system memory 716, and a system bus 718 that couples various system components including the system memory to the processing unit 714. The processing unit 714 may be any of various commercially available processors, including but not limited to Intel x86, Pentium and compatible microprocessors from Intel and others, including Cyrix, AMD and Nexgen; Alpha from Digital; MIPS from MIPS Technology, NEC, IDT, Siemens, and others; and the PowerPC from IBM and Motorola. Dual microprocessors and other multi-processor architectures also can be used as the processing unit 714.

The system bus 718 may be any of several types of bus structure including a memory bus or memory controller, a peripheral bus, and a local bus using any of a variety of conventional bus architectures such as PCI, VESA, Microchannel, ISA, and EISA, to name a few. The computer 712 memory includes read only memory (ROM) 720 and random access memory (RAM) 722. A basic input/output system (BIOS), containing the basic routines that help to transfer information between elements within the computer 712, such as during start-up, is stored in ROM 720.

The computer 712 further includes a hard disk drive 724, a magnetic disk drive 726, e.g., to read from or write to a removable disk 728, and an optical disk drive 730, e.g., for reading a CD-ROM disk 732 or to read from or write to other optical media. The hard disk drive 724, magnetic disk drive 726, and optical disk drive 730 are connected to the system bus 718 by a hard disk drive interface 734, a magnetic disk drive interface 736, and an optical drive interface 738, respectively. The drives and their associated computer-readable media provide nonvolatile storage of data, data structures, computer-executable instructions, etc. for the computer 712, including for the storage of broadcast programming in a suitable digital format. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment, and further that any such media may contain computer-executable instructions for performing the methods of the present invention.

A number of program modules may be stored in the drives and RAM 722, including an operating system 740, one or more application programs 742, other program modules 744, and program data 746. The operating system 740 in the illustrated computer is, for example, the "Microsoft Windows NT" operating system, although it is to be appreciated that the present invention may be implemented with other operating systems or combinations of operating systems, such as UNIX, LINUX, etc.

A user may enter commands and information into the computer 712 through a keyboard 748 and a pointing device, such as a mouse 750. Other input devices (not shown) may include a microphone, an IR remote control, a joystick, a game pad, a satellite dish, a scanner, or the like. These and other input devices are often connected to the processing unit 714 through a serial port interface 752 that is coupled to the system bus 718, but may be connected by other interfaces, such as a parallel port, a game port, a universal serial bus ("USB"), an IR interface, etc. A monitor 754 or other type of display device is also connected to the system bus 718 via an interface, such as a video adapter 756. In addition to the monitor, a computer typically includes other peripheral output devices (not shown), such as speakers, printers etc.

The computer 712 may operate in a networked environment using logical connections to one or more remote computers, such as a remote computer(s) 758. The remote computer(s) 758 may be a workstation, a server computer, a router, a personal computer, microprocessor based entertainment appliance (e.g., a client system), a peer device or other common network node, and typically includes many or all of the elements described relative to the computer 712, although, for purposes of brevity, only a memory storage device 760 is illustrated in FIG. 15. The logical connections depicted in FIG. 15 include a local area network (LAN) 762 and a wide area network (WAN) 764. Such networking environments are commonplace in offices, enterprise-wide computer networks, intranets and the Internet.

When used in a LAN networking environment, the computer 712 is connected to the local network 762 through a network interface or adapter 766. When used in a WAN networking environment, the computer 712 typically includes a modem 768, or is connected to a communications server on the LAN, or has other means for establishing communications over the WAN 764, such as the Internet. The modem 768, which may be internal or external, is connected to the system bus 718 via the serial port interface 752. In a networked environment, program modules depicted relative to the computer 712, or portions thereof, may be stored in the remote memory storage device 760. It will be appreciated that the network connections shown are exemplary and other means of establishing a communications link between the computers may be used.

In accordance with the practices of persons skilled in the art of computer programming, the present invention has been described with reference to acts and symbolic representations of operations that are performed by a computer, such as the computer 712 or remote computer(s) 758, unless otherwise indicated. Such acts and operations are sometimes referred to as being computer-executed. It will be appreciated that the acts and symbolically represented operations include the manipulation by the processing unit 604 of electrical signals representing data bits which causes a resulting transformation or reduction of the electrical signal representation, and the maintenance of data bits at memory locations in the memory system (including the system memory 716, hard drive 724, floppy disks 728, CD-ROM 732) to thereby reconfigure or otherwise alter the computer system's operation, as well as other processing of signals. The memory locations where such data bits are maintained are physical locations that have particular electrical, magnetic, or optical properties corresponding to the data bits.

In view of the foregoing structural, functional, and graphical features described above, methodologies in accordance with various aspects of the present invention will be better appreciated with reference to FIGS. 16–22. While, for purposes of simplicity of explanation, the methodologies of FIGS. 16–22 are shown and described as a series of steps, it is to be understood and appreciated that the present invention is not limited by the order of steps, as some steps may, in accordance with the present invention, occur in different orders and/or concurrently with other steps from that shown and described herein. Moreover, not all illustrated steps may be required to implement a methodology in accordance with an aspect the present invention.

Figure 16:
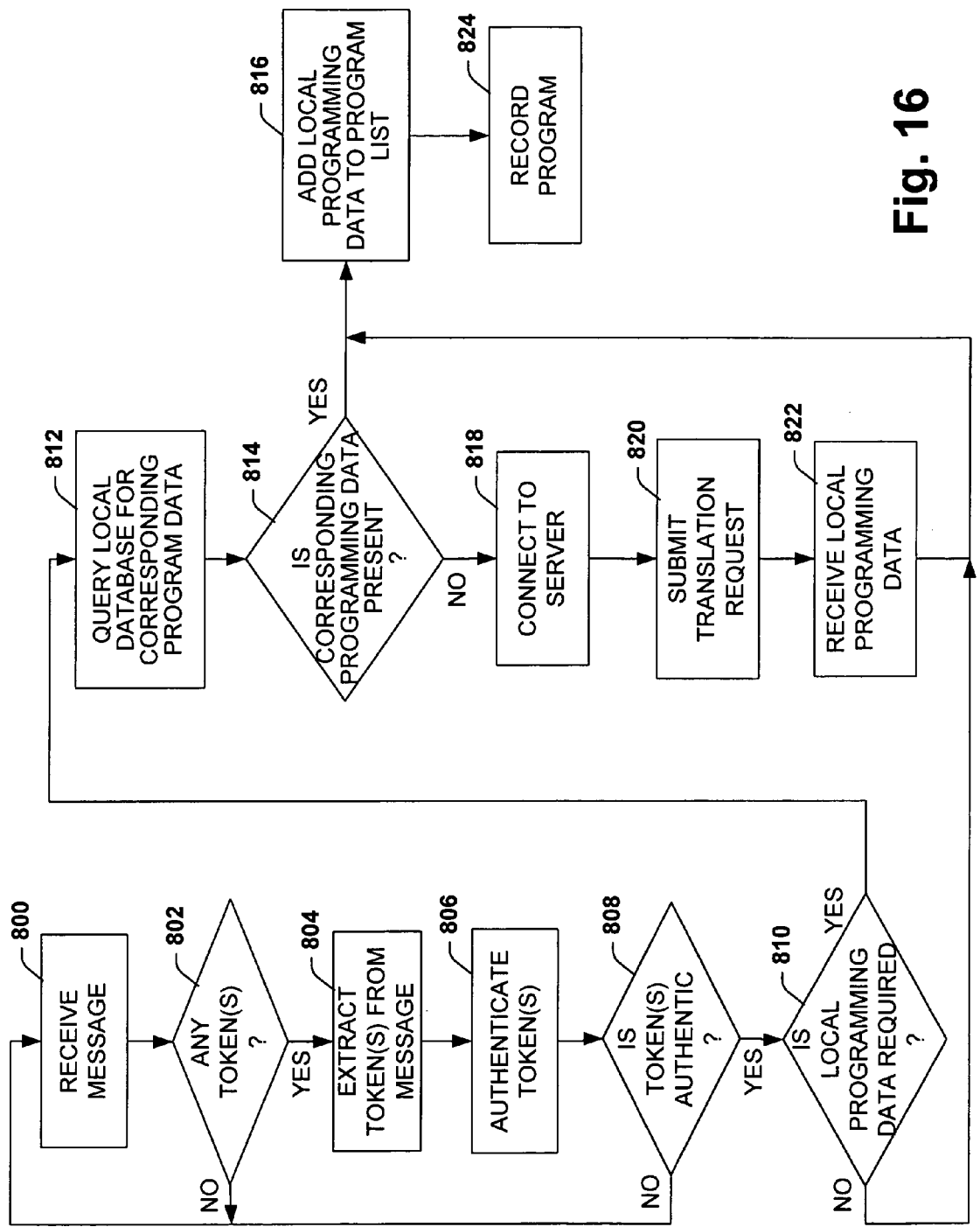
FIG. 16 is a flow diagram illustrating a methodology for receiving an email token at a client system in accordance with the present invention.

FIG. 16 is a flow diagram illustrating an example of a methodology for programming a device, such as a PVR, based on a token. The process begins at step 800, in which a message is received. This may correspond to, for example, receiving an email message at the PVR, at another email address, such as a remote PC associated with the PVR, or receiving a message by another data communications mechanism. The process proceeds to step 802, in which a determination is made as to whether the received message includes any program data (e.g., tokens). If the determination is negative, indicating that no tokens are associated with the message, the process returns to step 800 to receive additional messages and no action is taken with respect to the received message without user interaction. If the determination at step 802 is affirmative, indicating that one or more tokens are associated with the received message, the process proceeds to step 804.

At step 804, each token is extracted from the message for further processing. Each extracted token is then authenticated (step 806), such as by evaluating authentication data contained in the token. Next, at step 808, a determination is made as to whether the token(s) is authentic. Each PVR may be programmed and/or configured to accept tokens from one or more authorized sources, such as based on the sender's email address, a password, or other authentication techniques. If the token(s) is not authenticated, the process returns to step 800. A non-authenticated token may subsequently be authenticated manually by a user, such as based on a predefined programming authorization process (e.g., a method or function) in which the user accepts a token. The programming authorization may include a GUI, such as shown and described with respect to FIG. 7. If the token(s) is determined to be authentic, the process proceeds to step 810.

At step 810, a determination is made as to whether a token requires local programming data to record the program represented by the token. Local programming data may be required when the token itself does not identify all program criteria (e.g., time, date, channel, duration) needed to record the program in a particular local tuning space. If the determination is affirmative, indicating that at least some local programming data may be required, the process proceeds to step 812. At step 812, a local database is queried for corresponding program data necessary to program the recording system to record the program represented by the token. From step 812, the process proceeds to step 814.

At step 814, a determination is made as to whether corresponding program data is present in the local database. If the local programming data is present in the local database, the process proceeds to step 816. At step 816, local programming data for the program represented by the token is added to the program list of the client system for recording the program when broadcast in the local tuning space. Additional information also may be stored in connection with the local programming data so that a user may obtain information about the programs that are to be recorded. If the determination at step 814 is negative, indicating that at least some programming data is absent from the local database, the process proceeds to step 818.

At step 818, the client system connects to a server for accessing a database from which it may obtain local programming data. Next, at step 820, a translation request is submitted, such as described above with respect to FIG. 14. At step 822, local programming data is received at the client system in response to the translation request. From step 822, the process proceeds to step 816 in which the local programming data is added to the program list. Additionally, if the determination back at step 810 is negative, indicating that the token itself includes local programming data for programming the associated recording system to record the program in the local tuning space, the process advances to step 816. From step 816, the process proceeds to step 824, in which the program represented by the token is recorded as it is broadcast in the local tuning space based on the stored local programming data in the program list. As a result, the program is recorded and stored in a storage device associated with the PVR by storing audio and/or visual data associated with the selected program based on the program criteria of the token. The recorded programs are, in turn, available for viewing at a more convenient time.

Figure 17:
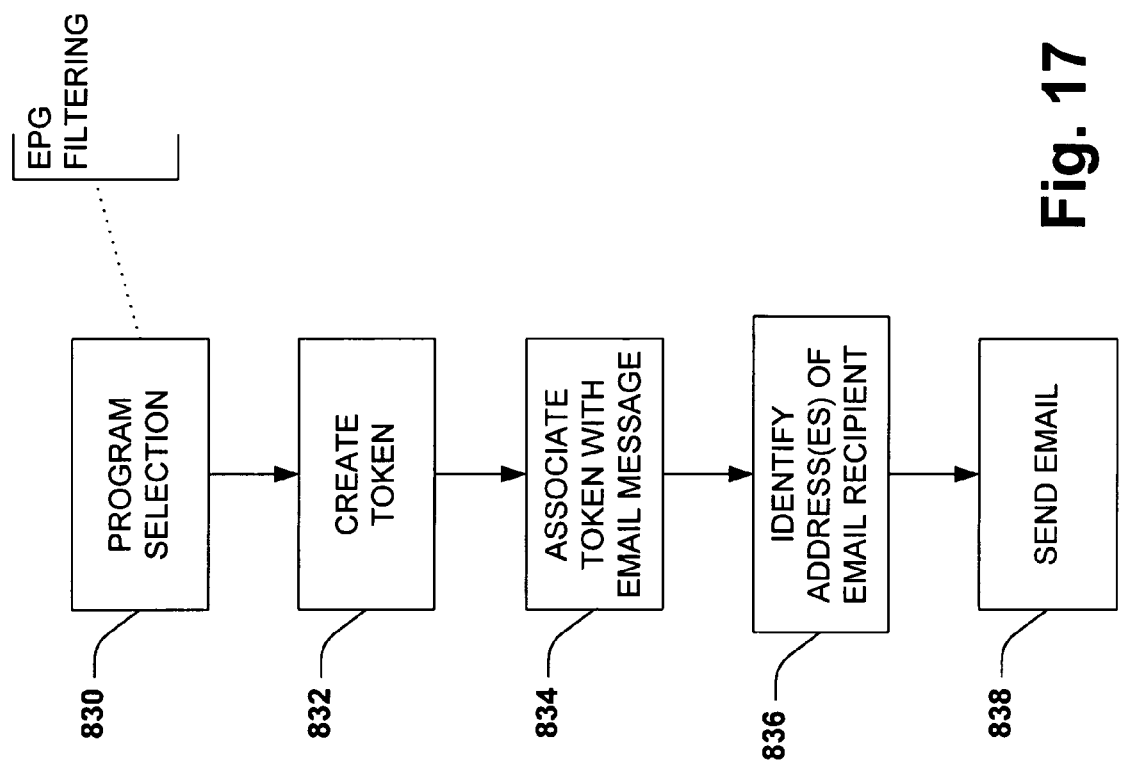
FIG. 17 is a flow diagram illustrating a methodology for sending a token in accordance with the present invention.

In addition to receiving messages having tokens indicative of audio and/or visual broadcast programs, another aspect of the present invention relates to sending tokens, such as by email, such as according to the methodology illustrated in FIG. 17. Tokens may be sent to any email address, such as an email address associated with a PVR or a selected individual.

The process of FIG. 17 begins at step 830, in which a user makes an appropriate program selection of one or more audio and/or visual programs. By way of example, the program selection is performed at a client system employing an EPG, such as TV-based EPG or a simplified enhanced power EPG. The user may employ the remote control 120 (FIG. 2) to navigate the EPG and make program selections. The user also may navigate the Web at the client station, such as with the remote control 120 (FIG. 2), and make programming selections.

Alternatively, the program selection(s) may be performed using a Web-based EPG and/or program selector, such as at a remote computer (e.g., remote computer 30 of FIG. 1B) programmed and/or configured for performing enhanced Web programming. The program selector, for example, may employ a sophisticated Web-based intelligent program selector, such as in the form of a user-defined GUI, to provide enhanced Web content selection. The program selector also may employ various types of program filtering, such as collaborative filtering and editorial filtering (e.g., American Film Institute ("AFI") filters or filters from other service provider). The program selector also may employ historical program selection analysis and/or other Web related content enhancements to facilitate program selection from the content-intensive Web according to the program interests of the user. Based on the user-defined filters and selections made by the user, program selections may be made from the filtered programming selections presented by the program selector.

Referring back to FIG. 17, the process proceeds to step 832 in which a token is generated based on the program selections. As mentioned above, the token includes program criteria, such as in the form of an XML formatted block of information, having an appropriate schema for identifying pertinent program information for a corresponding segment of audio and/or visual information so as to enable a PVR to record the program. If more than one program has been selected (step 830), each program may be provided a corresponding token for identifying the respective program selection. Additionally, separate tokens may be provided for different program segments and, if needed, for advertisements that are to be inserted between program segments. From step 832 the process proceeds to step 834, in which each token is associated with a message, such as an attachment of a text email message. It is to be appreciated that this step may occur contemporaneously with or separately from the program selection (step 830).

Next, the process proceeds to step 836 in which each intended recipient of the message and token(s) are identified. The identification of recipients, for example, may be based on a distribution list of an email GUI or by entering the email address manually. A text and/or audio message also may be provided as part of the message to advise the intended recipient(s) about the token(s) and/or the program represented by the token as well as to provide information about any other topic (see, e.g., FIG. 5).

From step 836, the process proceeds to step 838, in which the message and associated token(s) are sent to the recipient(s) to which the message is addressed. For example, the user may send an email message that includes one or more tokens identifying the selected broadcast program to an email address corresponding to the user's own PVR. Alternatively or additionally, the user may send an email message to another recipient having a PVR client system, such as a colleague or friend or relative, containing one or more tokens identifying programming content selected by the user. The email messages and associated tokens may be sent from the computer where the program selection criteria is entered, such as the remote computer 30 or client system 40, or from another computer, such as the server 20 or server 50 (FIG. 1B).

As mentioned above, a translator may be employed to translate each token into a predetermined format corresponding to the recipient's local tuning space. The translator may be employed, for example, when the token is created, when it is opened by the recipient, or at another time. The translation may be performed at the client system, at a remote server, or a combination of both.

Each recipient of the message sent at step 838, for example, employs an email reader (e.g., the email GUI 400 of FIG. 5) programmed and/or configured to read the email and view information related to the tokens provided by the user. The email reader also may be capable of initiating programming of a PVR by forwarding a token, such as by one or more corresponding tokens being sent directly to a PVR and, upon authentication, added to the program list. As a result, programs identified by tokens may be recorded by a PVR as they are broadcast over a local tuning space associated with the client system. The recorded programs are maintained in memory for viewing at a convenient time selected by the user.

While the example of FIG. 17 relates to email-based token communications, those skilled in the art will understand and appreciate that tokens also may be communicated by other means of data communication in accordance with an aspect of the present invention.

Figure 18:
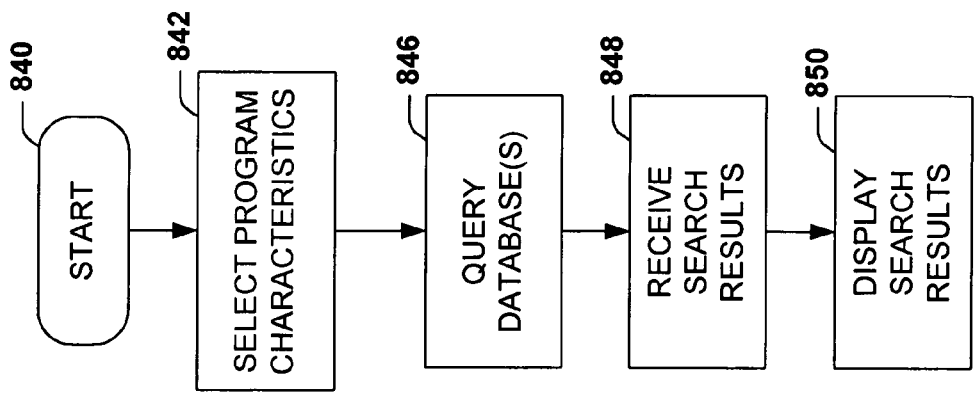
FIG. 18 is a flow diagram illustrating a methodology for providing selection criteria for searching for programs in accordance with the present invention.

FIG. 18 illustrates a methodology for locating programs based on selection criteria, such as may be entered in connection with an EPG or another program selection/searching process or method. The process begins at step 840 in which an EPG function or other program selection mechanism is activated, such as by selecting an EPG or accessing a suitable website with an appropriate user interface device. From step 840, the process proceeds to step 842 in which program characteristics are selected. The program characteristics, for example, may include those set forth with respect to FIG. 9 or other characteristics, such as may be selected by a service provider. The selected program characteristics provide selection criteria that may be employed by an appropriate search engine. From step 842 the process proceeds to step 846.

At step 846, a database(s) is queried based on the program characteristics selected at step 842. The database may be part of or associated with the server on which the EPG front end is running or, alternatively, it may form part of or be associated with another server. At step 848, the search results are returned in response to the query (step 846). The search results may include one or more programs corresponding to the program characteristics that were selected at step 842. The search results may include information about each program meeting the selection criteria and/or other related information, such as links to related URLs, tokens, images or video clips related to the program, and/or other information that may prove useful to a user. At step 850, the search results are displayed in connection with the EPG or other corresponding display so that a user may view the results.

Figure 19:
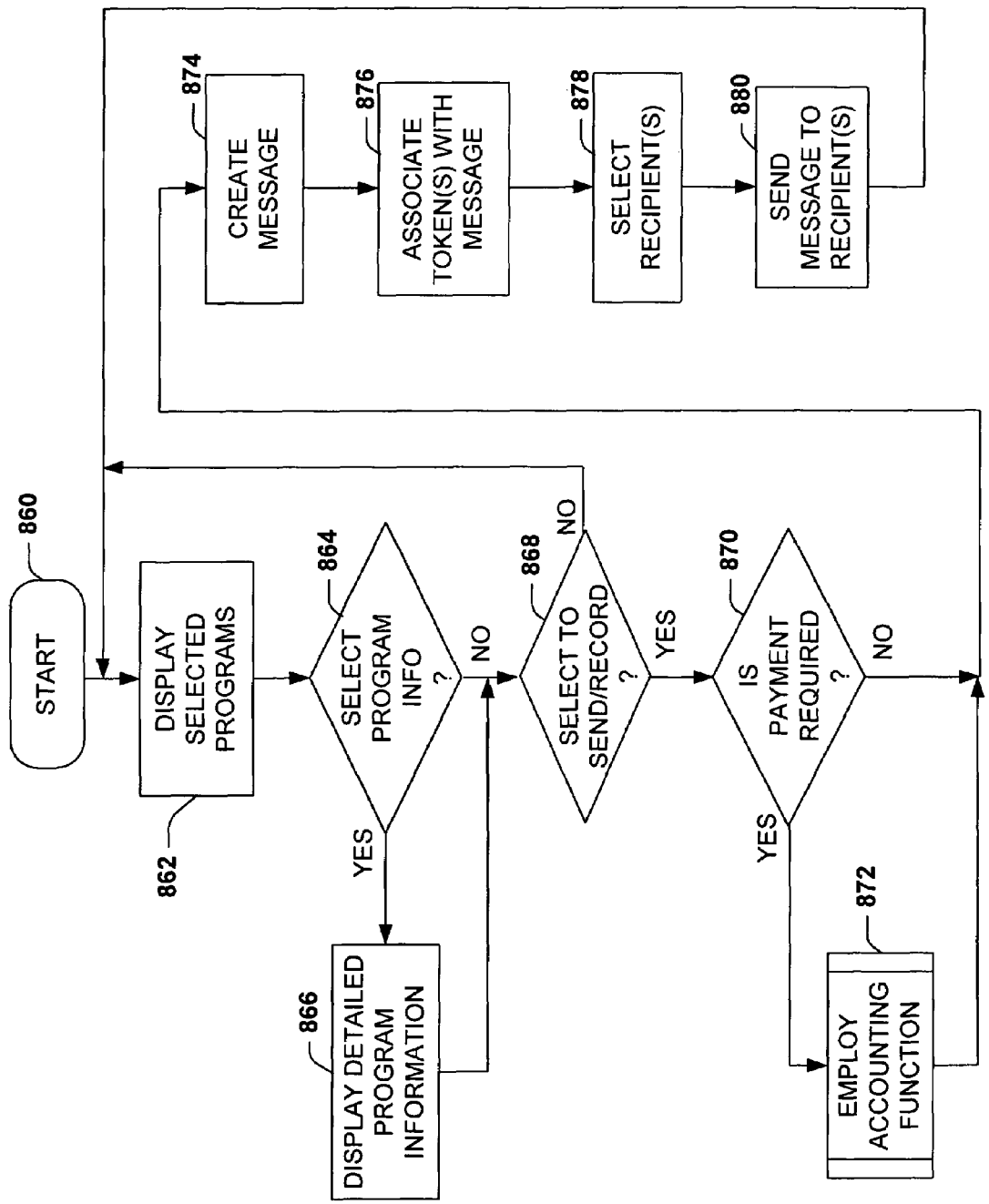
FIG. 19 is a flow diagram illustrating a methodology for selecting program data to a recipient in accordance with the present invention.

FIG. 19 illustrates an exemplary methodology for providing one or more tokens for selected programs in accordance with an aspect of the present invention. The process begins at step 860 in which program information is provided to a user, such as may be selected by the user at a remote computer or a service provider. The process proceeds to step 862 in which the selected programs are displayed. For example, the selected programs may be displayed in connection with a user's personal storage bin (see, e.g., FIG. 11) or an EPG (see, e.g., FIG. 9). From step 862 the process proceeds to step 864.

At step 864, a determination is made as to whether a user has selected a displayed program. If a program is selected, the process proceeds to step 866 in which detailed program information is displayed. The detailed information may include, for example, information about the time, channel, duration, and cost (if any) associated with the selected program, a description of the program, etc. Additional information related to the selected program also may be provided, such as URLs to related links, audio and/or video clips related to the program, etc. From step 866 the process proceeds to step 868. If the determination at step 864 is negative, indicating a user has not selected a program, the process also proceeds to step 868.

At step 868, a determination is made as to whether a program has been selected to be sent or to be recorded. The selection may be made in response to a user employing a user input device to select an appropriate button (a SEND button, a RECORD button, a PURCHASE button, a RENT button, etc.) associated with the interactive display (see, e.g., FIGS. 9 and 11). If a selection is made to send or record a program, the process proceeds to step 870. At step 870 a determination is made as to whether the selected program requires payment to view (e.g., Is it a pay program?). If the determination at step 870 is affirmative, the process proceeds to step 872 in which appropriate financial accounting steps are taken to ensure proper payment for the pay program. This may include, for example, obtaining credit card information from the user or referring to preapproved credit information for the user. From step 872, the process proceeds to step 874. If the determination at step 870 is negative (indicating no payment is required for the program), the process also proceeds to step 874.

At step 874, a message is created. The message may be an email message created at a server or at the user's computer, although a message (data packet) may be created in another form for sending via another means of data communication. Next, at step 876, a token(s) for each selected program is associated with the message, such as an email attachment to or a component or object embedded within the text of the email message. At step 878, one or more recipients for the message are selected. The user may select a recipient at this time, such as by entering an email address. Alternatively, a service provider may provide an appropriate email address. By way of example, when the user logs onto the system, the user may include a user ID and password operatively linked to the address information, although other user identification techniques also could be used (e.g., a cookie associated with a user). This information may be employed to access pertinent user-related data, which may be stored in a database (e.g., a user profile database). The user-related data may be employed to address the message, such as with an address of the user's PVR.

From step 878, the process proceeds to step 880, in which the message (including the token(s) and other program related information) is sent to each recipient selected at step 878. Prior to sending the message, however, a user may enter a personalized message or, alternatively, a default message may be provided indicating that the message and token(s) were sent at the request of the user. The process then returns to step 862.

Figure 20:
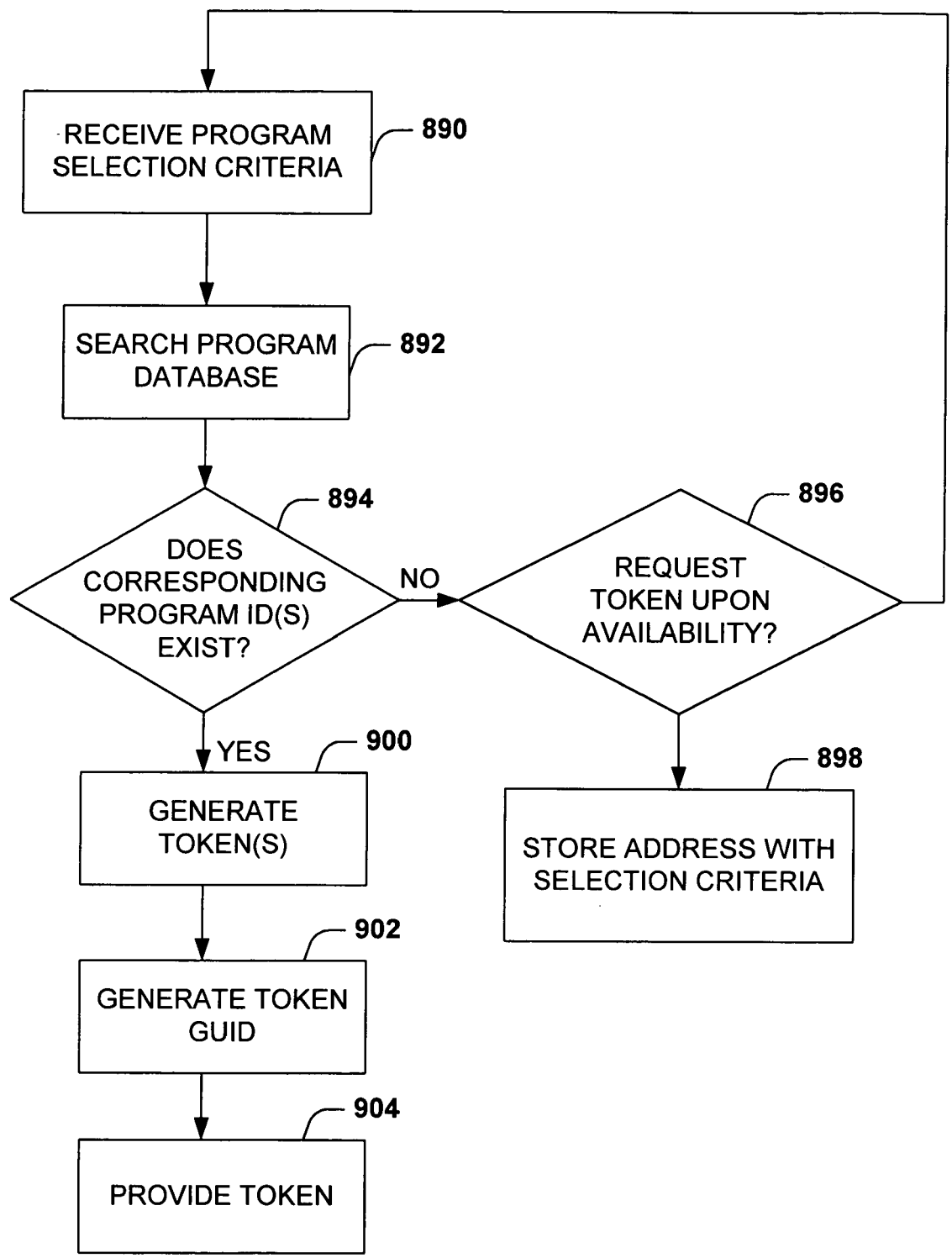
FIG. 20 is a flow diagram illustrating a methodology for receiving program selection criteria at a server computer in accordance with the present invention.

FIG. 20 illustrates a methodology, which may be implemented at a server 20 (FIG. 1B), for providing a token in response to selection criteria. The process begins at step 890 upon selection criteria being received or cached into memory. As mentioned above, the selection criteria may be entered from a remote computer or it may be internally stored in the server 20. The process proceeds to step 892 in which the program database is searched based on the selection criteria. Those skilled in the art will understand and appreciate that other databases (in the server or other computers) also could be searched and that other searching methodologies could be employed, in accordance with an aspect of the present invention, to locate one or more programs matching the selection criteria.

Next, the process proceeds to step 894 in which a determination is made as to whether a corresponding program ID based on the selection criteria. A program ID may exist, for example, when the program database includes programming data for a scheduled program broadcast. If the determination at step 894 is negative, the process proceeds to step 896. At step 896, another determination is made as to whether a corresponding token should be sent when it becomes available. This procedure may be implemented in response to a user request or automatically, such as in response to a user entering a request for a token corresponding to the selection criteria. If it is determined that no token has been requested to be sent when it becomes available, the process returns to step 890. Alternatively, if a token is to be sent, the process proceeds to step 898, in which an email address or other appropriate identifying information is stored in connection with the selection criteria. As a result, one or more tokens may subsequently be sent to the stored address(es), such as after the program database has been updated to include one or more programs better matching the selection criteria. Other data also may be stored in connection with the selection criteria and user-identifying information, such as may be employed to set a time limit during which the selection criteria may be stored.

If the determination at step 894 is affirmative, the process proceeds to step 900 in which a token is generated. As mentioned above, the token may include a program GUID and/or other attributes or characteristics related to or identifying a specific program. Next, at step 902, a corresponding token GUID is generated for the token. The token GUID uniquely identifies the token so that the token may be tracked and/or corresponding transaction information may be linked back to a token request and the individual making the request. The process then proceeds to step 904 in which the token is provided to another computer, such as via email or download or other means of data communication.

Figure 21:
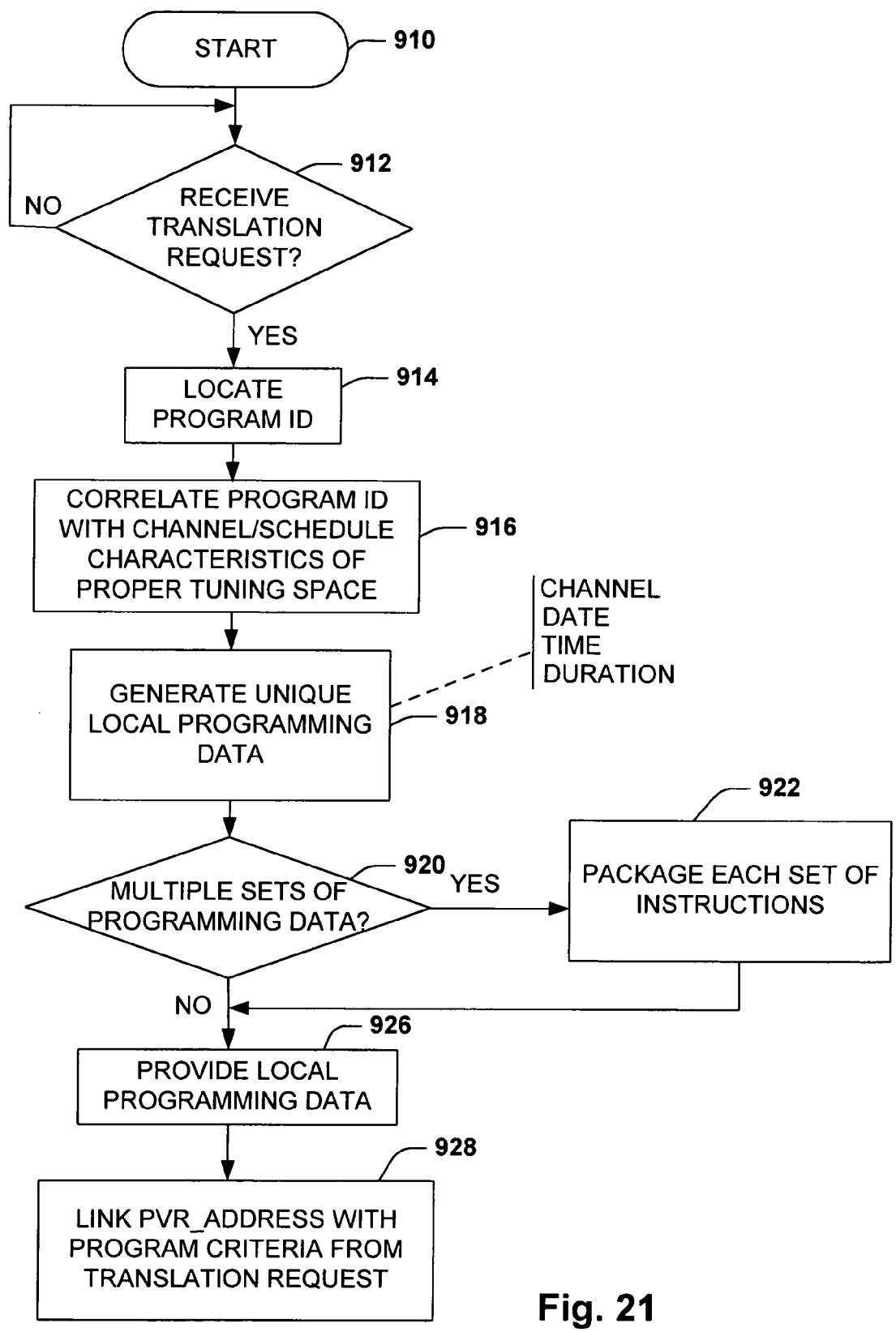
FIG. 21 is a flow diagram illustrating a methodology for translating a token at a server computer in accordance with the present invention.

FIG. 21 illustrates a methodology for translating a token, such as by a translation function running on a server in accordance with an aspect of the present invention. The process begins at step 910 in which data is received at the server and evaluated. The process then proceeds to step 912 in which a determination is made as to whether the data is a translation request, such as may be implemented by a translation function. If the data is not a translation request the process returns to step 912 to await another request. A proper translation request, for example, includes sufficient information (e.g., a token) to identify a specific audio and/or visual program. If the request is a translation request, the process proceeds to step 914.

At step 914, one or more of the databases at the server are queried to locate a program ID matching the program criteria contained in the translation request. The program criteria in the translation request may include a program ID or other data identifying a specific program. After one or more program IDs are located based on the selection criteria, the process proceeds to step 916.

A step 916, each program ID is correlated with the channel and schedule characteristics of a proper tuning space. Included within step 916 is a determination of an appropriate local tuning space, which may be identified from part of the translation request, such as based on a PVR GUID or other identifying data. The tuning space(s) associated with a translation request determines which tuning space database(s) to employ in order to determine the channel and scheduling details associated with the program represented by the program ID. The process proceeds to step 918.

At step 918, local programming data is generated according to the program ID and local tuning space information. The local programming data, for example, may include the date, time, duration, channel, and other associated broadcast characteristics of the program as it is broadcast in the local tuning space. As indicated above, the time and duration fields may correspond to another database (or list) identifying the time and/or duration for several program segments that comprise the intended program.

The process then proceeds to step 920, in which a determination is made as to whether there are multiple sets of local programming data, such as in response to plural translation requests or when a program is defined as an aggregate of program segments. When multiple sets of programming data exist, the process proceeds to step 922. At step 922, each respective set of programming data or instructions is packaged in a manner to facilitate programming of a recording system. The packaging, for example, may include providing computer executable instruction indicating the order at which individual program segments are to be combined and/or arranging each set of programming data with appropriate header information. The process then proceeds to step 926. If the determination at step 920 is negative, the process also proceeds to step 926.

At step 926, the local programming data is provided, such as by email or other communication mechanisms to a computer, such as may be identified in the translation request and/or to the computer initiating the request. From step 926, the process proceeds to step 928 in which a PVR address is linked with the program criteria of the translation request. This provides a mechanism to enable the server to notify or provide an updated version of local programming data to each recipient and/or recording system.

Figure 22:
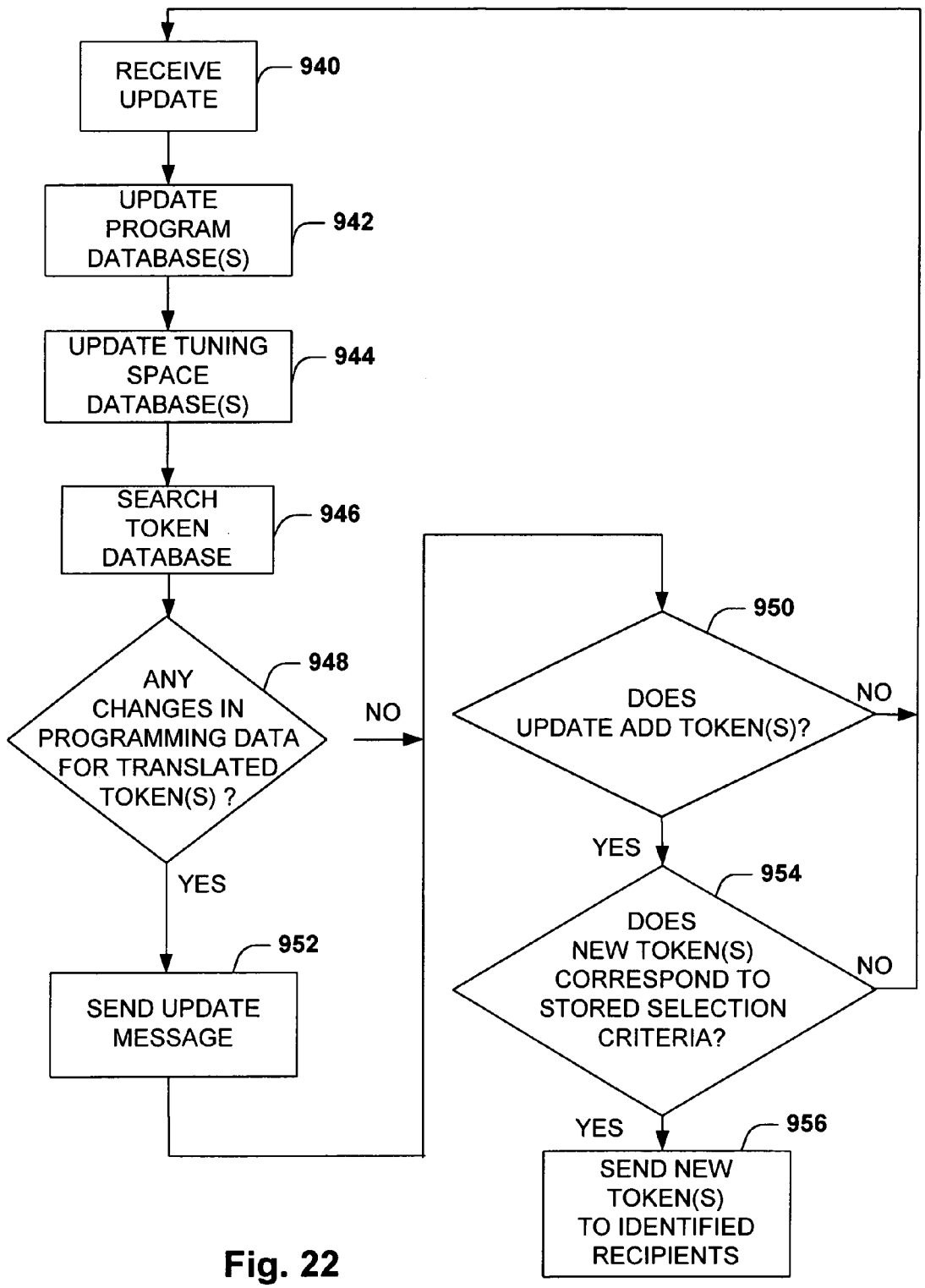
FIG. 22 is flow diagram illustrating a methodology for updating data at a server computer in accordance with the present invention.

FIG. 22 illustrates a methodology that may be implemented by an update function running on a computer (a server or other computer) in accordance with an aspect of the present invention. The process begins at step 940 with update data being received. The update data, for example, may be entered at the computer via an I/O facility or user input device. Alternatively or additionally, the update may be received from a remote computer, such as via a communications device. From step 940, the process proceeds to step 942.

At step 942, the program database is updated to reflect changes and additions to the program data. Next, at step 944, the tuning space database(s) is updated based on the received update data. The update data may be utilized to implement changes in program scheduling information, to add program criteria for programs being newly added to a schedule, to add new channels to a tuning space, etc. Appropriate tuning space filters also may be employed to implement modifications and additions in each local tuning space database in response to national or regional program updates.

From step 944 the process proceeds to step 946, in which the token database is searched to locate tokens for which the update data may relate. The process then proceeds to step 948, in which a determination is made as to whether any local programming data may have been modified by the update data, such as that which was sent by or obtained from the server in response to a translation request. If the determination is negative the process advances to step 950. If the determination is affirmative, however, the process proceeds to step 952. At step 952, an update message is sent (e.g., via email). The update message, for example, may include a token identifying the updated program, a notification about the update, and/or an updated version of the local programming data. The update and/or notification may be sent to each identifiable recipient of the out-of-date data or each individual requesting an update of such information. The address of the program data recipients, for example, may be based a PVR GUID or other user information that may have been provided to the server with a token translation request or otherwise stored at the server. From step 952, the process proceeds to step 950.

At step 950, a determination is made as to whether the update data results in one or more tokens being added to the program database, such as to reflect future programming not previously indicated in the scheduling database of the tuning space database (see FIG. 14). If no new tokens were added to the database, the process returns to step 940. If one or more new tokens have been added, the process proceeds to step 954. At step 954, a determination is made as to whether each newly added token(s) corresponds to selection criteria stored in a stored selection database. If the tokens do not match any of the stored selection criteria, the process returns to step 940 to await another update.

If the determination at step 954 is affirmative, indicating that the new token matches at least one instance of the stored selection criteria, the process proceeds to step 956. At step 766, a message is sent (e.g., via email or other means of data communication) to each individual identified as a proper recipient of the token. The message may include a token corresponding to the stored selection criteria and/or a notification that the program data has been updated. As mentioned above, selection criteria may be stored in response to a user presenting selection criteria to a server that does not result in a satisfactory match to an audio and/or visual program. Identifying information for the user may be stored in association with the selection criteria at the user's request or automatically, such as based on a PVR GUID or other user-identifying information (e.g., a cookie) that may accompany the selection criteria. It is to be appreciated that updated tokens also may be stored at the server and be sent to a user in response to the user contacting the server, such as by calling the server directly or connecting to the server via a network infrastructure.

Figure 23:
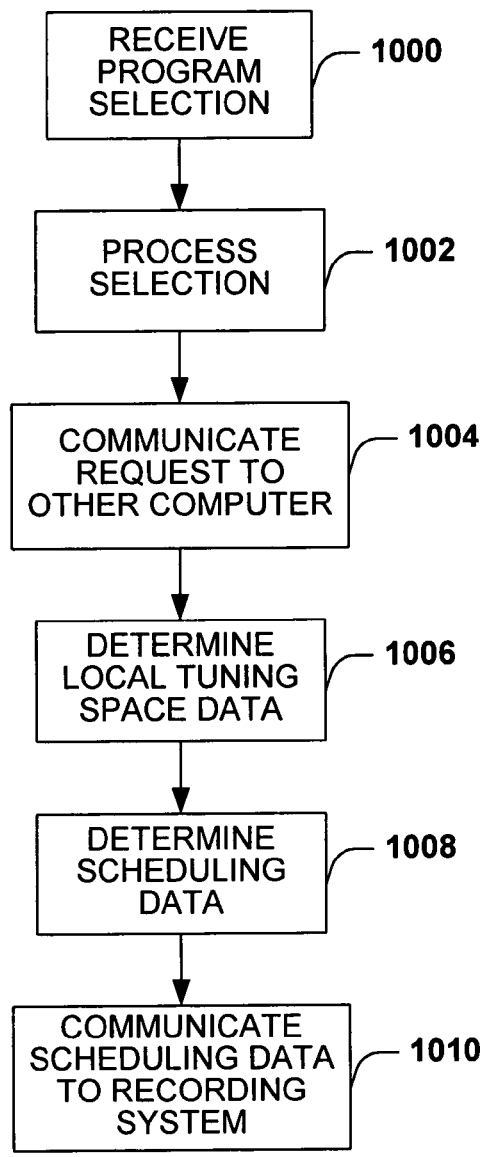
FIG. 23 is a flow diagram illustrating a methodology for processing a program selection in accordance with the present invention.

FIG. 23 illustrates a methodology for processing program selection data in accordance with an aspect of the present invention, such as may be received at a server (e.g., the server 50 of FIG. 1B). The process begins at step 1000 in which program selection data is received. The program selection may be made based on information provided at a Website, such as by browsing the Website with a PDA, a PC, a PVR, etc., or a program selection from a subscription service maintained by a third party service provider.

Next, at step 1002, the received program selection is processed into a suitable request format. The request, for example, may include information identifying an audio and/or visual program (e.g., UPID, GPID) as well as other information identifying one or more users or recording systems. As mentioned above, the other identifying information may include a user ID, a PVR ID or address, and/or other data (e.g., a cookie) for determining more specific identifying information associated with one or more users and/or client systems (e.g., information about the broadcast services—cable, satellite, broadcast television, etc.). By way of example, the user ID information further may include a global identifier that facilitates roaming for a user, similar to the Passport™ and Wallet™ services provided by the Microsoft Corporation of Redmond, Wash.

At step 1004, the request is communicated to another computer, such as another server (e.g., the server 20 of FIG. 1B) through a communications system, such as the Internet. The process proceeds to step 1006 in which local tuning space information is determined in response to the request. The local tuning space information in conjunction with the programming information is then employed (step 1008) to determine corresponding scheduling data for the selected program. The scheduling data, for example, may include the date, time, and channel corresponding to the selected program in an appropriate local tuning space. It is to be appreciated by those skilled in the art that steps 1006 and 1008 may correspond to a token translation process, such as shown and described with respect to FIG. 21. From step 1008, the process proceeds to step 1010.

At step 1010, the scheduling data is communicated to each recording system and/or user identified in the request. By way of example, the scheduling data may be communicated by email, by direct dial-up to the recording system, via TCP/IP, or any other type of communications that may be operable to transport the scheduling data to the identified recording system and/or user.

Figure 24:
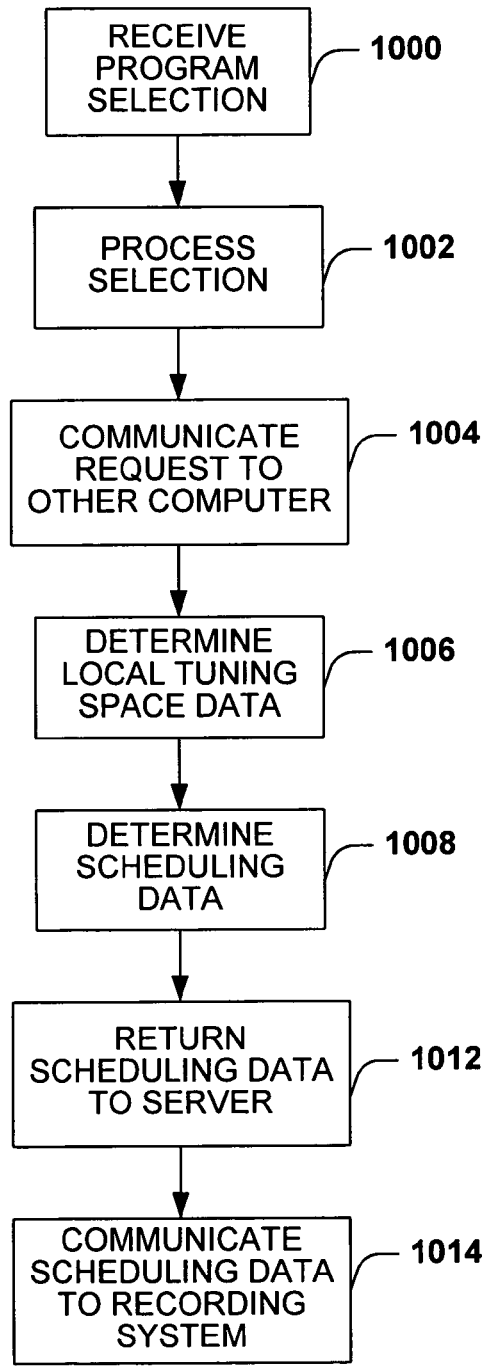
FIG. 24 is a flow diagram illustrating another methodology for processing a program selection in accordance with the present invention.

FIG. 24 illustrates another methodology, similar to the methodology of FIG. 23, for processing a program selection and for providing corresponding scheduling data to a recording system. Steps 1000–1008 may be substantially identical to that described with respect to FIG. 23 and, therefore, reference should be made to the description accompanying FIG. 23 for additional details concerning these steps.

Referring to FIG. 24, from step 1008, the process proceeds to step 1012. At step 1012 the scheduling data is returned to the computer, which provided the program selection request at step 1004. Next, at step 1014, the scheduling data is communicated to each recording system identified in the request. That is, in this example, the scheduling data is not provided directly to each identified recording system and/or user, but instead is first provided to the computer receiving the program selection. The computer receiving the program selection may, in turn, forward the scheduling data to one or more recording systems and/or users as described herein.

What has been described above includes examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising."

What is claimed is:

1. A system to facilitate selection of at least one of an audio and visual program, comprising:
   a first computer operative to connect to a second computer for filtering through a plurality of at least one of audio and visual programs based on selection criteria to provide a filtered representation of programs;
   wherein a program from the filtered representation of programs is selectable at the first computer so as to cause a token indicative of the selected program to be assigned to a recipient, the token comprises an XML formatted packet of data with a schema that identifies the selected program to enable the recipient to program a recording system to record the program represented by the token in response to receiving the token by converting the token into scheduling data based in part on at least one of stored profile data of the recording system and program information, the scheduling data is in a format usable by the recording system.

2. The system of claim 1, wherein the first computer is operative to provide a signal to the second computer for selecting at least one program from the filtered representation of programs, at least one token for the selected at least one program being provided to the recipient in response to initiating a send process at the second computer.

3. The system of claim 2, wherein the token is sent to the recipient as part of a message.

4. The system of claim 3, wherein the message is a text email message, the token being operatively associated with the email message.

5. The system of claim 4, wherein the token is an attachment to the email message.

6. The system of claim 1, wherein a message and the token are provided to the recipient from the second computer.

7. The system of claim 6, wherein the recipient is provided the token from the second computer in response to the recipient connecting to the second computer.

8. The system of claim 1, wherein a message and the token are provided to the recipient from the first computer.

9. The system of claim 8, wherein the recipient is provided the token from the first computer in response to the recipient connecting to the first computer.

10. The system of claim 1, wherein the first computer is a server having an associated database including at least some of the plurality of programs, the server searching providing results including the programs substantially matching the selection criteria.

11. The system of claim 1, wherein the token includes a universal program identifier for the program.

12. The system of claim 1, wherein the selection criteria is provided at the first computer and employed by the second computer to provide the filtered representation of programs.

13. The system of claim 1, wherein the selection criteria is established at the second computer and employed to provide the filtered representation of programs.

14. A system to facilitate selection of at least one of an audio and visual program, comprising:
a first computer programmed to provide a first signal to a second computer for instructing the second computer to sort through information related to a plurality of at least one of audio and visual programs, the first computer receiving a second signal from the second computer indicative of a filtered representation of programs, the first computer being operative to provide a third signal to the second computer for causing a message having an associated token to be assigned to a recipient;
wherein the token is a packet of data with a schema that comprises at least a globally unique identifier that identifies at least one of an audio and visual program of the filtered representation of programs so as to enable the recipient thereof to program a recording system based on the associated token to record the program identified by the token by translating the token into scheduling data based in part on at least one of stored profile data of the recording system and program information with a format usable by the recording system.

15. The system of claim 14, wherein the first computer is further operative to send a fourth signal to the second computer for selecting a program from the filtered representation of programs, the token representing the selected program.

16. The system of claim 14, wherein the message is a text email message, the token being operatively associated with the email message.

17. The system of claim 16, wherein the token is an attachment of the email message.

18. The system of claim 14, wherein the message and associated token are sent to the recipient from the second computer.

19. The system of claim 14, wherein the message and associated token are sent to the recipient from the first computer.

20. The system of claim 14, wherein the second computer is a server having an associated database including at least some of the plurality of programs, the server searching the database in response to the first signal and providing a program results signal to the first computer for displaying selected programs at the first computer.

21. The system of claim 14, wherein the first signal further includes computer executable instructions indicative of program characteristics selected at the first computer, the filtered representation of programs including programs based on program characteristics.

22. The system of claim 14, wherein the first signal further includes computer executable instructions for instructing the second computer to provide the filtered representation of programs based on program criteria stored at the second computer.

23. A computer-readable medium having computer-executable instructions for performing the steps comprising:
filtering through information at a server system in response to a request from a remote computer to provide a filtered representation of at least one of an audio and visual program content; and
assigning a message to a recipient, the message having an associated token based on the filtered representation, the token comprises transportable data with a unique identifier that represents a predetermined program, the token is converted into scheduling data based in part on at least one stored profile data of a recording system and program information in a format utilized to program the recording system based on the token to record the predetermined program.

24. The computer-readable medium of claim 23 having further computer-executable instructions for selecting a program from the filtered representation, the associated token representing the selected program.

25. The computer-readable medium of claim 23 having further computer-executable instructions for searching an associated database in response to the request and providing to the remote computer a signal for displaying the filtered representation at the first computer.

26. The computer-readable medium of claim 23 having further computer-executable instructions for sending the assigned message and associated token to the recipient.

27. The computer-readable medium of claim 26 having further computer-executable instructions for, prior to sending the message, associating the token with an email message addressed to the recipient.

28. The computer-readable medium of claim 26, wherein the recipient is a first recipient, the computer readable medium having further computer-executable instructions for sending to a second recipient a second message having the associated token.

29. A method for facilitating programming of an associated device, the method comprising the steps of:
selecting at a remote computer a program from program information provided by a server system identifying at least one of an audio and visual program; and
assigning a message for receipt by a recipient, the message having a token that comprises an XML formatted packet of data with a schema that identifies the selected program and is converted into scheduling data based in part on at least one of stored profile data of the recording system and program information, the scheduling data is in a format employable by a recording system to program the recording system to record the program represented by the token.

30. The method of claim 29 further including filtering through the program information based on selection criteria provided from the remote computer.

31. The method of claim 30, wherein the selected program is selected from the filtered information.

32. The method of claim 29 further including receiving a message at the remote computer having the requested token in response to the request.

33. The method of claim 29 further including sending the assigned message and associated token to the recipient.

34. A computer-readable medium having computer-executable instructions for performing the steps of claim 29.

* * * * *